July 9, 1957 E. FERMI ET AL 2,798,847
METHOD OF OPERATING A NEUTRONIC REACTOR
Original Filed Dec. 19, 1944 27 Sheets-Sheet 3

Inventors:
Enrico Fermi
Leo Szilard

July 9, 1957 E. FERMI ET AL 2,798,847
METHOD OF OPERATING A NEUTRONIC REACTOR
Original Filed Dec. 19, 1944 27 Sheets-Sheet 8

Inventors:
Enrico Fermi
Leo Szilard

July 9, 1957    E. FERMI ET AL    2,798,847
METHOD OF OPERATING A NEUTRONIC REACTOR
Original Filed Dec. 19, 1944    27 Sheets-Sheet 9

Inventors:
Enrico Fermi
Leo Szilard

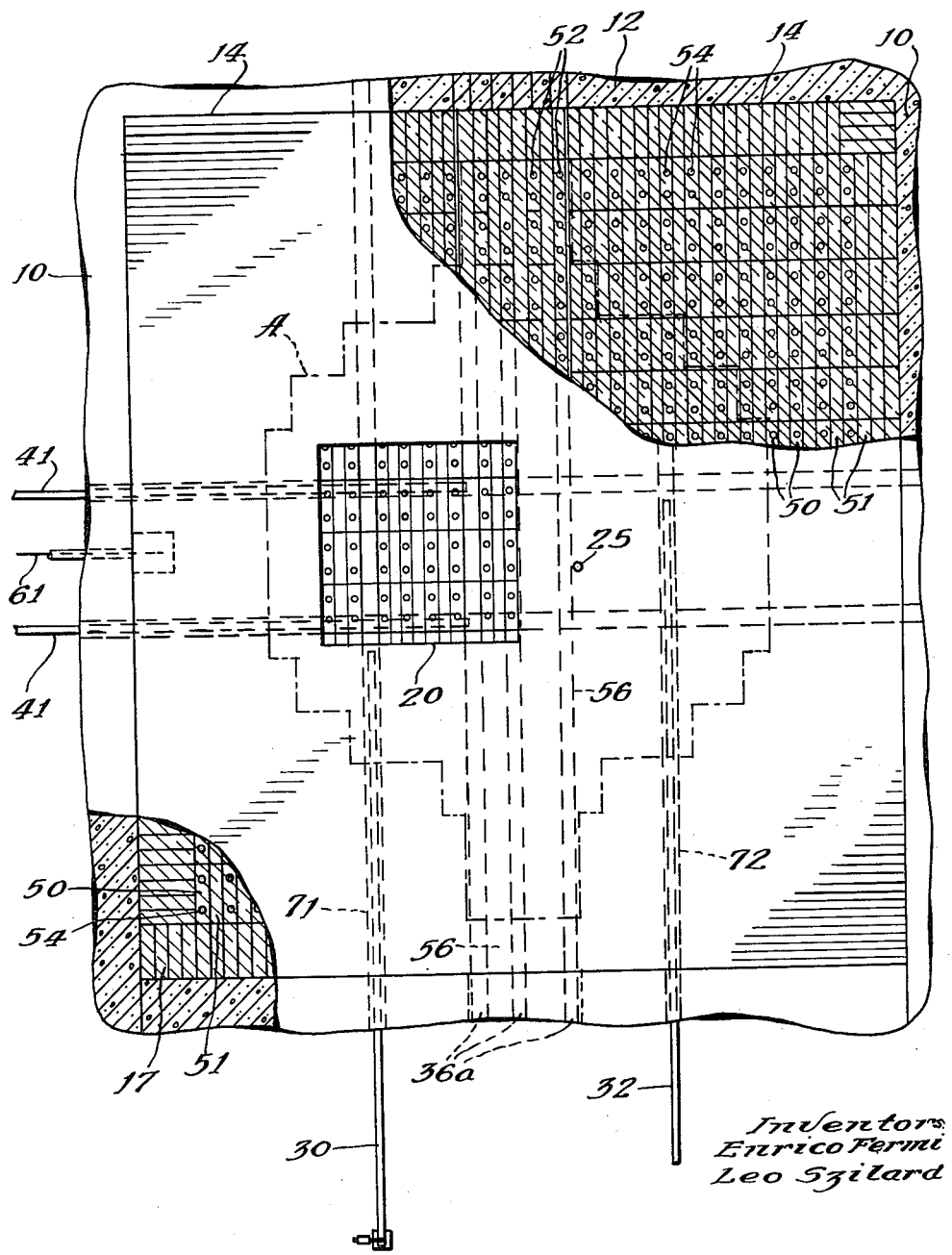

Inventors
Enrico Fermi
Leo Szilard

July 9, 1957  E. FERMI ET AL  2,798,847
METHOD OF OPERATING A NEUTRONIC REACTOR
Original Filed Dec. 19, 1944  27 Sheets-Sheet 12

Inventors:
Enrico Fermi
Leo Szilard

July 9, 1957     E. FERMI ET AL     2,798,847
METHOD OF OPERATING A NEUTRONIC REACTOR
Original Filed Dec. 19, 1944     27 Sheets-Sheet 13
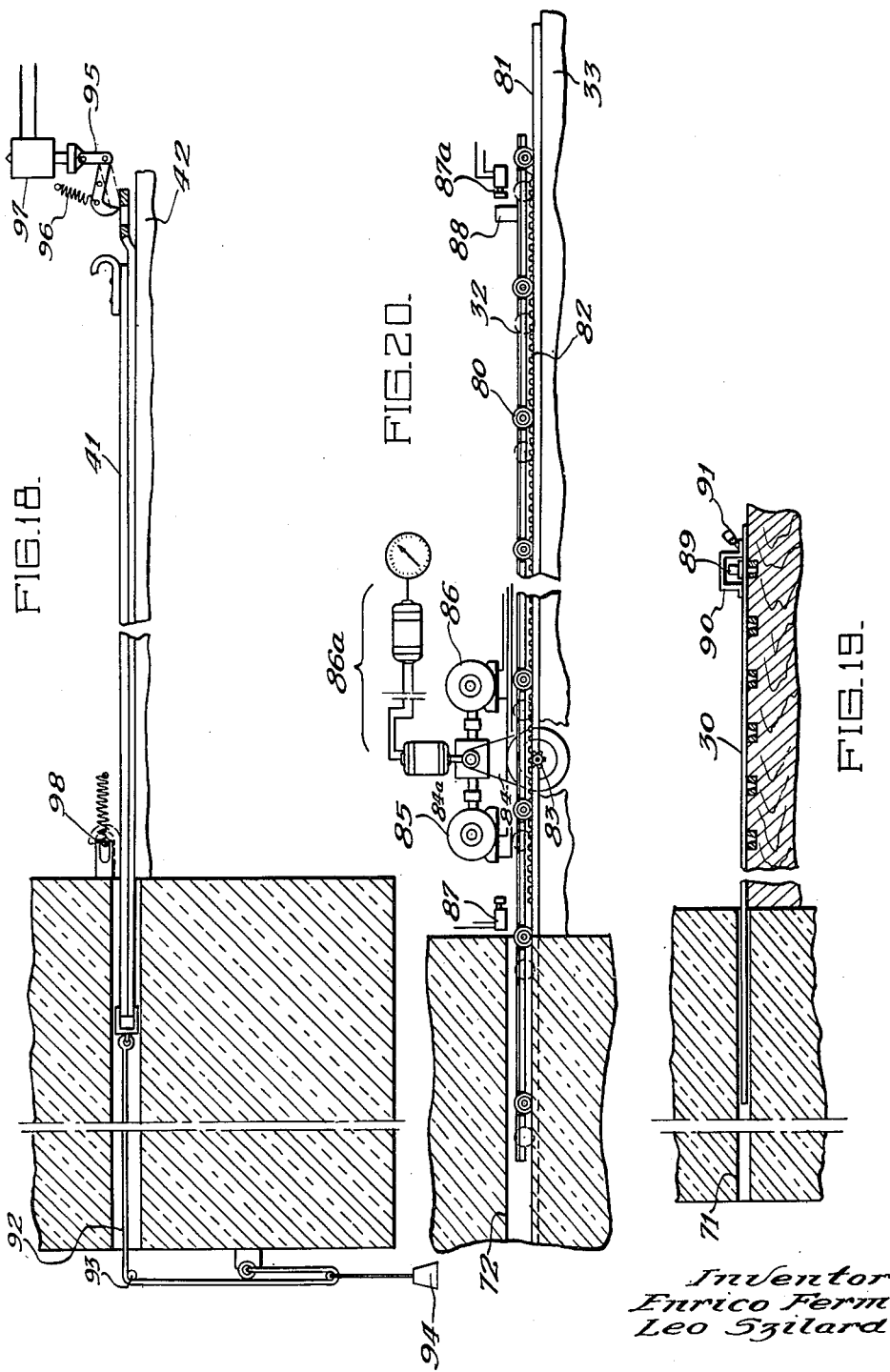
Inventors:
Enrico Fermi
Leo Szilard July 9, 1957    E. FERMI ET AL    2,798,847
METHOD OF OPERATING A NEUTRONIC REACTOR
Original Filed Dec. 19, 1944    27 Sheets-Sheet 14

Inventors:
Enrico Fermi
Leo Szilard

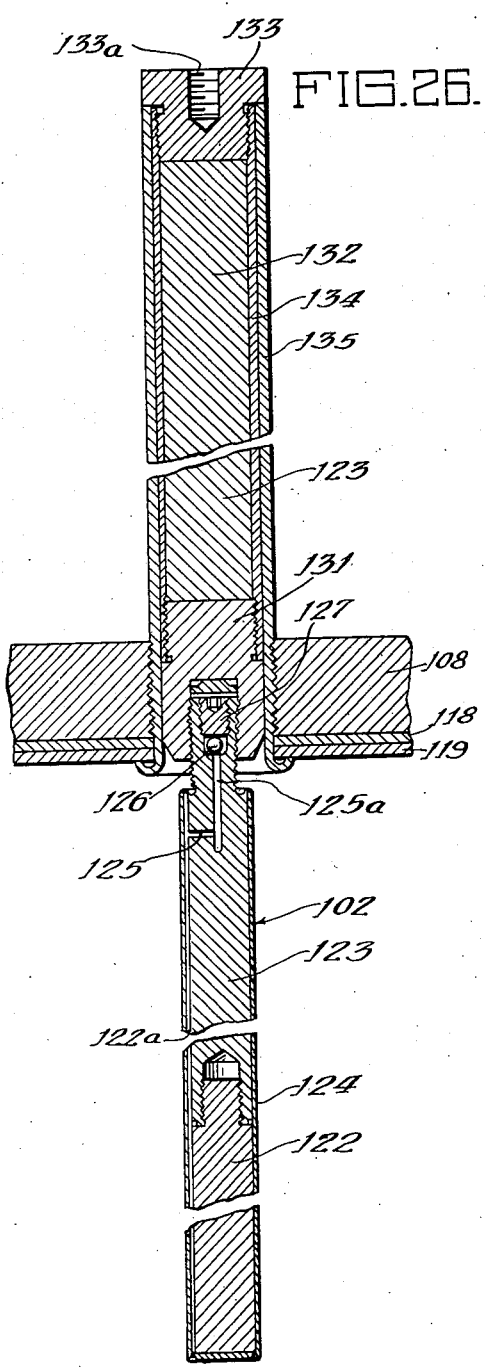
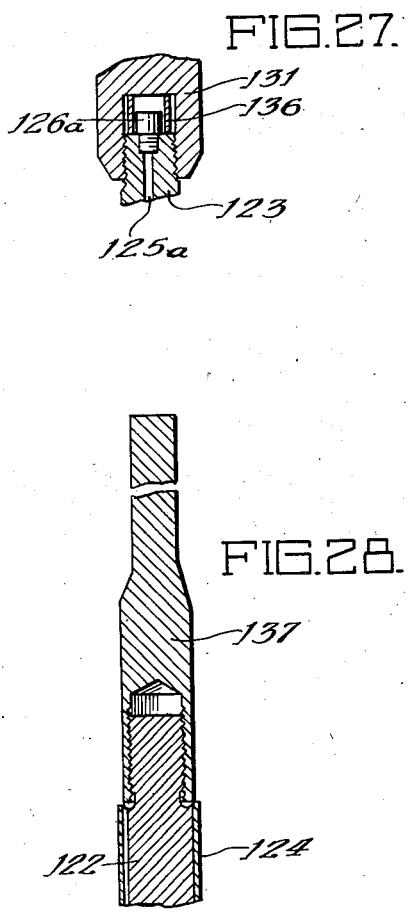

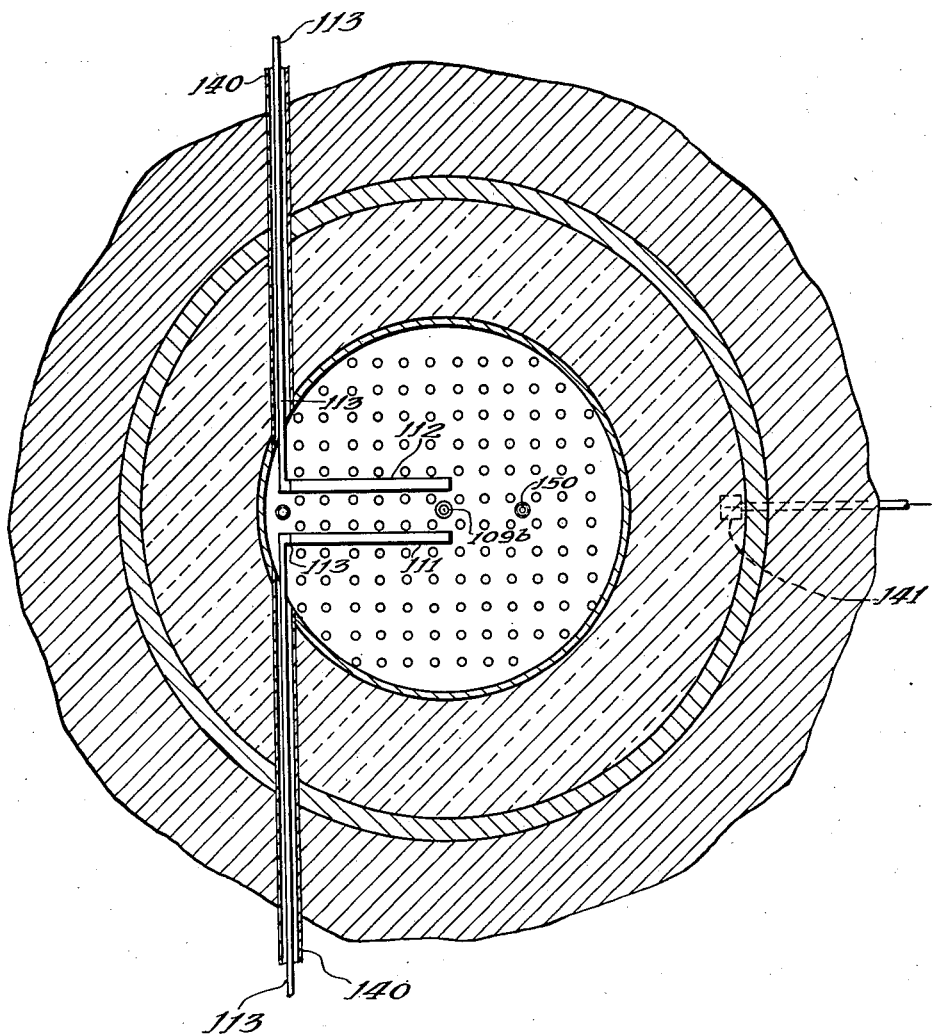

Inventors:
Enrico Fermi
Leo Szilard

July 9, 1957

E. FERMI ET AL 2,798,847

METHOD OF OPERATING A NEUTRONIC REACTOR

Original Filed Dec. 19, 1944

Inventors:
Enrico Fermi
Leo Szilard

July 9, 1957        E. FERMI ET AL        2,798,847
METHOD OF OPERATING A NEUTRONIC REACTOR
Original Filed Dec. 19, 1944        27 Sheets-Sheet 21

Inventors:
Enrico Fermi
Leo Szilard

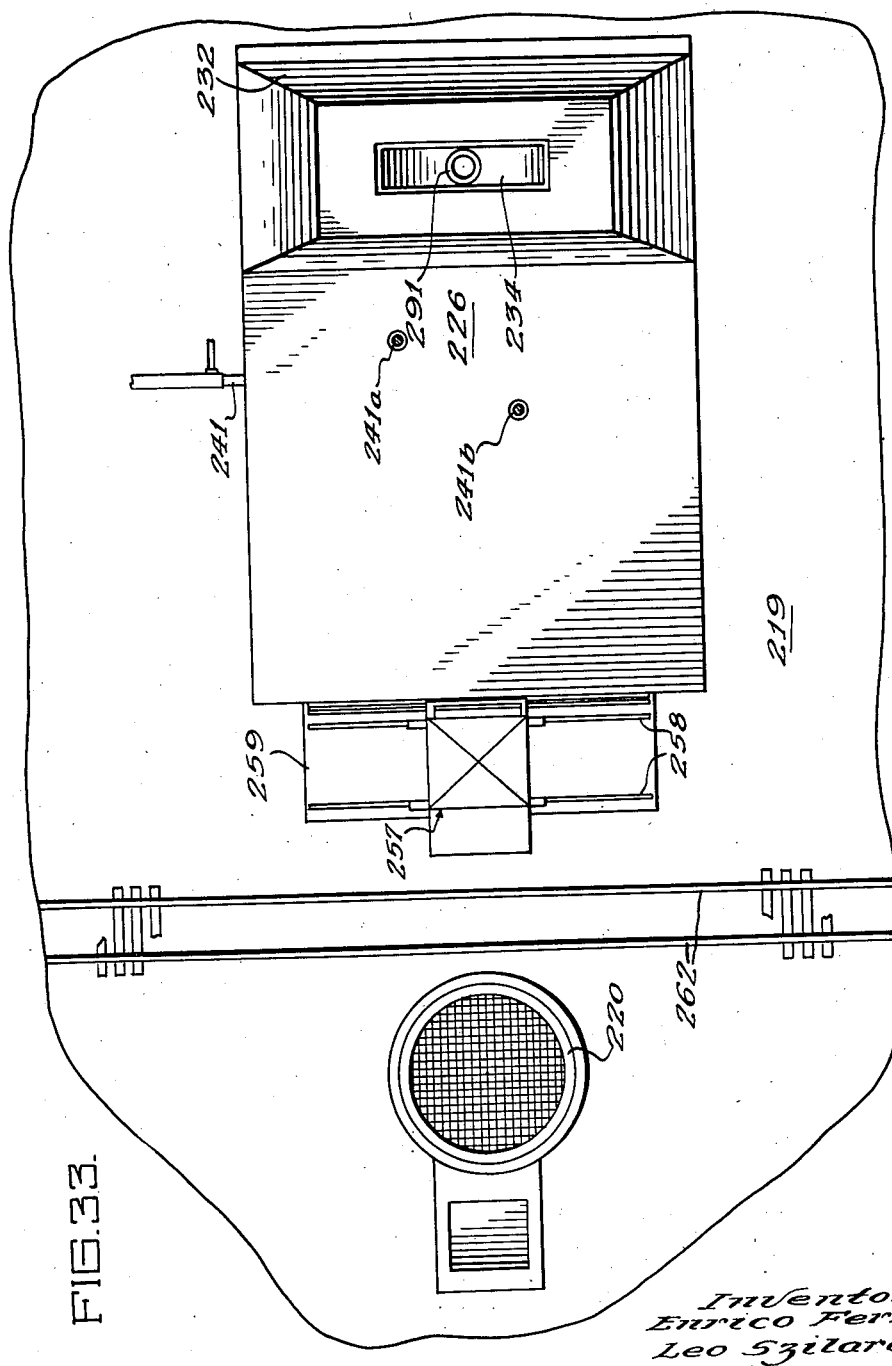

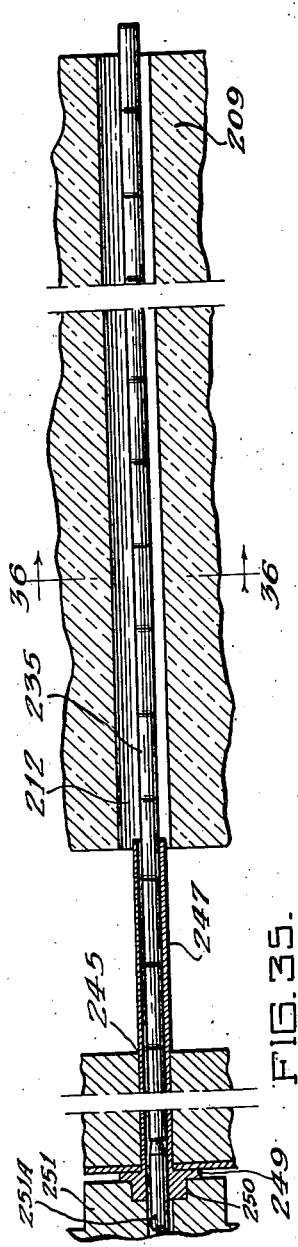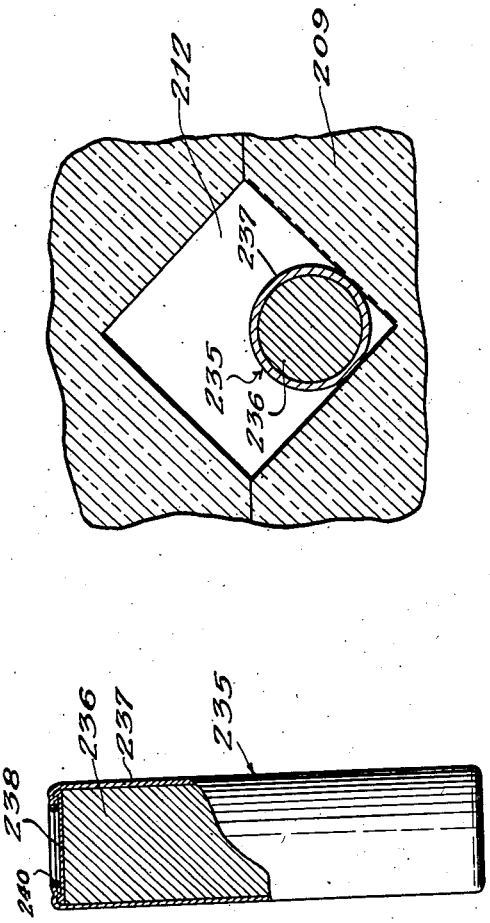

Inventors:
Enrico Fermi
Leo Szilard

July 9, 1957  E. FERMI ET AL  2,798,847
METHOD OF OPERATING A NEUTRONIC REACTOR
Original Filed Dec. 19, 1944  27 Sheets-Sheet 25

Inventors:
Enrico Fermi
Leo Szilard

United States Patent Office 2,798,847
Patented July 9, 1957

2,798,847

METHOD OF OPERATING A NEUTRONIC REACTOR

Enrico Fermi and Leo Szilard, Chicago, Ill., assignors to the United States of America as represented by the United States Atomic Energy Commission Application December 1, 1952, Serial No. 323,452

1 Claim. (Cl. 204—154)

The present invention relates to the general subject of nuclear fission and particularly to the establishment of self-sustaining neutron chain fission reactions in systems embodying uranium having a natural isotopic content.

Experiments by Hahn and Strassman, the results of which were published in Naturwissenshaften, vol. 27, page 11, in January 1939, led to the conclusion that nuclear bombardment of natural uranium by slow neutrons causes explosion or fission of the nucleus, which splits into particles of smaller charge and mass with energy being released in the process. Later it was found that neutrons were emitted during the process and that the fission was principally confined to the uranium isotope $U^{235}$ present as $1/139$ part of the natural uranium.

When it became known that the isotope $U^{235}$ in natural uranium could be split or fissioned by bombardment with thermal neutrons, i. e., neutrons at or near thermal equilibrium with the surrounding medium, many predictions were made as to the possibility of obtaining a self-sustaining chain reacting system operating at high neutron densities. In such a system, the fission neutrons produced give rise to new fission neutrons in sufficiently large numbers to overcome the neutron losses in the system. Since the result of the fission of the uranium nucleus is the production of two lighter elements with great kinetic energy, plus approximately 2 fast neutrons on the average for each fission along with beta and gamma radiation, a large amount of power could be made available if a self-sustaining system could be built.

In order to attain such a self-sustaining chain reaction in a system of practical size, the ratio of the number of neutrons produced in one generation by the fissions, to the original number of neutrons initiating the fissions, must be known to be greater than unity after all neutron losses are deducted, and this ratio is, of course, dependent upon the values of the pertinent constants.

In the co-pending application of Enrico Fermi, Serial No. 534,129, filed May 4, 1944, now Patent No. 2,780,595, dated February 5, 1957, and entitled "Nuclear Chain Reacting Systems," there is described and claimed a means and method of determining the neutron reproduction ratio for any type of uranium containing structure, directly as a result of a simple measurement which can be performed with precision. Accurate values for all of the pertinent nuclear constants need not be known.

We have discovered certain essential principles required for the successful construction and operation of self-sustaining neutron chain reacting systems (known as neutronic reactors) with the production of power in the form of heat. These principles have been confirmed with the aid of measurements made in accordance with the means and method set forth in the above-identified application, and neutronic reactors have been constructed and operated at various power outputs, in accordance with these principles, as will be more fully brought out hereinafter.

In a self-sustaining chain reaction of uranium with slow neutrons, as presently understood, $92^{238}$ is converted by neutron capture to the isotope $92^{239}$. The latter is converted by beta decay to $93^{239}$ and this $93^{239}$ in turn is converted by beta decay to $94^{239}$. Other isotopes of 93 and 94 may be formed in small quantities. By slow or thermal neutron capture, $92^{235}$ on the other hand, can undergo nuclear fission to release energy appearing as heat, gamma and beta radiation, together with the formation of fission fragments appearing as radioactive isotopes of elements of lower mass numbers, and with the release of secondary neutrons.

The secondary neutrons thus produced by the fissioning of the $92^{235}$ nuclei have a high average energy, and must be slowed down to thermal energies in order to be in condition to cause slow neutron fission in other $92^{235}$ nuclei. This slowing down, or moderation of the neutron energy, is accomplished by passing the neutrons through a material where the neutrons are slowed by collision. Such a material is known as a moderator. While some of the secondary neutrons are absorbed by the uranium isotope $92^{238}$ leading to the production of element 94, and by other materials such as the moderator, enough neutrons can remain to sustain the chain reaction, when proper conditions are maintained.

Under these proper conditions, the chain reaction will supply not only the neutrons necessary for maintaining the neutronic reaction, but also will supply the neutrons for capture by the isotope $92^{238}$ leading to the production of 94, and excess neutrons for use as desired.

As 94 is a transuranic element, it can be separated from the unconverted uranium by chemical methods, and as it is fissionable by slow neutrons in a manner similar to the isotope $92^{235}$, it is valuable, for example, for enriching natural uranium for use in other chain reacting systems of smaller overall size. The fission fragments are also valuable as sources of radioactivity.

The ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size therefore, differs from K by the external neutron leakage factor, and by a factor due to the neutron absorption by localized neutron absorber, and the reproduction ratio must still be sufficiently greater than unity to permit the neutron density to rise exponentially with time in the system as built.

Progressive empirical enlargement of any proposed system for which the factor K is not accurately known, in an attempt to attain the overall size of a structure of finite size above which the rate of loss of neutrons by diffusion through the periphery of the structure is less than the rate of production of neutrons in the system leads only to an expensive gamble with no assurance of success. The fact that K is greater than unity and the fact that the critical size is within practical limits must be known rather accurately in advance, as otherwise a proposed structure having a K factor less than unity, or even a K factor greater than but close to unity, might not sustain a chain reaction even if all of the uranium in the world were included.

The earliest attempts to predict a structure capable of sustaining a chain reaction, using natural uranium, involved the use of fine uranium particles such as uranium oxide powder, dispersed in hydrogen in combined form as the slowing agent. However, these attempts were not successful, and analysis of experiments made has indicated that the neutron losses in such a system when natural uranium is used, will prevent a chain reaction from being sustained, irrespective of the size of the system.

However, in considering such experiments, it was found that even when hydrogen was used as a moderator, as for example, as water, that resonance losses in uranium could be very substantially reduced by aggregating the uranium into bodies of substantial dimensions as compared to the uranium powder-hydrogen mixture previously suggested. It was also found that such aggregation will reduce resonance losses when a moderator such as graphite is used. This gain in neutrons, saved for use in the chain, has proved to be one of the major factors in obtaining a sufficiently low over-all neutron loss as to make possible the attainment of a self-sustaining chain reaction in various moderators when other losses are also controlled.

During the interchange of neutrons in a system of finite size, comprising bodies of any size disposed in a neutron moderator, neutrons may be lost to the chain reaction in four ways:

1. By absorption or capture in the uranium content of the bodies without producing fission,
2. By absorption or capture in the moderator material itself,
3. By absorption or capture by the impurities present in both the uranium bodies and the moderator,
4. By leakage out of the system through the periphery thereof.

THE CHAIN FISSION REACTION

To illustrate the importance of the various factors entering into a chain reaction, we next describe the chain reaction process for example, as it is presently understood to occur in any system of finite size utilizing natural uranium bodies dispersed in a graphite moderator at some position in the reactor where the neutron density is substantially constant. For better explanation, reference is here made to the diagram constituting Fig. 1 of the accompanying drawings; description of the remaining figures being more conveniently set forth in a subsequent part of this specification.

In Fig. 1, the letter

A represents a uranium body of any size from which fast neutrons are set free as a result of the fission process.

B represents a fast neutron loss due to leakage out of the system.

C represents a uranium body of any size in which both volume and surface resonance absorption of neutrons by $U^{238}$ takes place, at resonance energies above thermal energy, leading to the formation of element 94.

D represents the number of neutrons reaching thermal energy.

E represents a thermal neutron loss by diffusion of thermal neutrons out of the system.

F represents a neutron loss caused by capture of neutrons by impurities in uranium, graphite, and controls.

G represents a neutron loss due to capture of thermal neutrons by the graphite as the thermal neutrons diffuse therethrough before entering uranium.

H represents the number of thermal neutrons entering uranium body.

I represents a uranium body of any size in which part of the thermal neutrons entering the body are absorbed by $U^{238}$ leading to the formation of $94^{239}$, the remaining thermal neutrons causing new fissions in $U^{235}$ thereby producing fast neutrons, a few of which produce additional fast neutrons by fission of $U^{238}$ atoms in the same body.

We will first consider the condition obtaining where thermal neutrons enter uranium body A. Some of these thermal neutrons will cause fission in the $U^{235}$ content of the uranium body A to produce fast neutrons, the yield being at an average rate of about 2 neutrons per fission. As a result of this fission, fission fragments are released together with beta and gamma rays, thereby producing energy which, in the system, is manifested mostly by the heating of the uranium bodies with only a slight release of heat in the graphite. The actual average yield of fast neutrons by fission of $U^{235}$ is slightly higher, e. g., by a few percent, than the average of 2 mentioned above. Some of the fast neutrons released in the fission of $U^{235}$ by the thermal neutrons of this example almost immediately produce fast fission of $U^{238}$ in the same uranium body, with the production of additional fast neutrons.

The fast neutrons leaving the uranium body, for example $100n$ neutrons, enter the mass of moderator, travel therethrough, and through the uranium bodies over paths long in comparison with the spacing of the uranium bodies, to undergo successive collisions that slow them down. A substantial proportion of the fast neutrons are thus destined to be reduced, by about 100 elastic collisions apiece in the case of graphite and mostly in the moderator, to thermal energy. During this travel, before the neutrons arrive at thermal energies, a small percentage of the higher energy neutrons on the average may leak out of the system because of the finite size of the reactor, and be lost to the chain reaction. Furthermore, during the extremely irregular path of the neutrons while they are being slowed down by elastic collisions in the graphite, some of the neutrons will reach a uranium resonance absorption energy as they are about to enter a uranium body, such as C, and are absorbed immediately on or close to the surface of the uranium body. In addition some neutrons are reduced to resonance energy after entering the uranium body by an elastic collision with the uranium, and are therefore immediately absorbed within the uranium body. Irrespective of whether the neutron resonance absorption in $U^{238}$ is on the surface, or in the volume of the uranium body, element 94 is produced by the resonance absorption according to the following process:

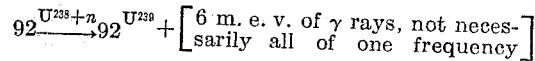

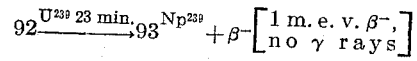

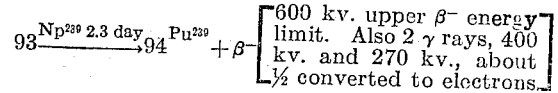

A small amount of $94^{240}$ may also be found, formed by addition of a neutron to $94^{239}$. Capture of thermal neutrons by $U^{238}$, as indicated in bodies A and C of Fig. 1, also results in production of element 94 by the same process.

The predominant isotope produced, $94^{239}$, is a long lived radioactive product with a half life of about 20,000 years.

A large percentage of the original fast neutrons escape resonance capture and fast neutron leakage, and are reduced to thermal energy within the system. Of these thermal neutrons, a small number on the average may leak by diffusion out of the system and be lost from the chain reaction, leaving the remainder of the thermal neutrons diffusing through the moderator in condition to produce fission if they promptly enter $U^{235}$ or element 94 without being captured by any other material.

The fission reaction is as follows:

$$_{92}U^{235} + \text{neutron} = A + B + n \text{ neutrons (average)}$$

A = "Light fission fragment, e. g., Br, Kr, Rb, Sr, Y, Zr, Cb, Mo, 43, Ru, Rh. Atomic mass, 83–99, inclusive. Atomic number, 35–45, inclusive B = "Heavy fission fragment, e. g., Sb, Te, I, Xe, Cs, Ba, La, Ce, Pr, Nd. Atomic mass, 127–141 inclusive. Atomic number, 51–60 inclusive.

In any practical system, impurities will be present in both the moderator and the uranium. In the chain described, a small fraction of the neutrons can be captured and absorbed by impurities in the system without the reproduction factor of the system falling below unity. Thus for example in Fig. 1, if impurities necessarily present in the materials do not consume too many neutrons, some excess neutrons are available to be captured by "impurities" intentionally introduced for control purposes, i. e., by a control rod, later to be described. Furthermore, since many of the thermal neutrons diffusing through the moderator are not in a position to promptly enter a uranium mass when they reach thermal energy, these thermal neutrons must continue to diffuse through the moderator until they do reach a uranium body. During this diffusion, a small percentage of the neutrons are absorbed by the moderator, leaving sufficient thermal neutrons to enter a uranium body to produce new fast neutrons by fission, to repeat the cycle. In the uranium-graphite system about $72n$ thermal neutrons enter the uranium body to produce $100n$ new fast neutrons, i. e., a survival of about 72 percent of the original $100n$ fast neutrons during the slowing process.

The four neutron losses from the chain reaction referred to above are represented in Fig. 1, where the fraction of resonance absorption at C and the fraction of thermal neutrons absorbed by $U^{238}$ at I represent the uranium absorption losses. Losses due to impurities are represented at F, those due to absorption in the moderator at G, and the leakage losses due to the finite size of the system at B and E.

These losses will be considered in detail in the order named, as any one of these losses, or their total if too high, can prevent a self-sustaining chain reaction from being attained in a system of any size.

1. Neutron loss by absorption in uranium

It is possible by proper physical arrangement of the materials substantially to reduce uranium resonance absorption, as will be shown later. By the use of light elements for moderators, fewer collisions are required to slow the neutrons to thermal energies with large increments of energy loss per collision, thus decreasing the probability of a neutron being at a resonance energy as it enters a uranium atom. During the moderation, however, neutrons are moving through the slowing medium over random paths and distances so that the uranium is not only exposed to thermal neutrons but also to neutrons of energies varying between the energy of fission and thermal energy. Neutrons at uranium resonance energies will, if they enter uranium at these energies, be absorbed on the surface of a uranium body whatever its size, giving rise to surface absorption. Any substantial reduction of overall surface of the same amount of uranium will reduce surface absorption, and any such reduction in surface absorption will release neutrons to enter directly into the chain reaction.

For a given ratio of moderator to uranium, surface resonance absorption losses of neutrons in the uranium can be substantially reduced by a large factor when the uranium is aggregated into substantial masses in which the mean spatial diameter is at least about 0.5 centimeter for natural uranium metal and somewhat larger when the bodies are of a uranium compound, as hereinafter more fully discussed. For example with $UO_2$ the minimum radius is larger and with other uranium compounds a similar variation from metallic uranium may be observed. The degree of this variation is dependent upon the density of the uranium compound, its bulk density, and the absorption coefficient of other elements therein for neutrons. In any event the uranium may be placed in the system in the form of geometrically spaced uranium masses or bodies of substantial size, preferably either of metal, oxide, carbide, or combinations thereof. The term geometric is used to mean any pattern or arrangement wherein the uranium bodies are distributed in the moderator with at least a roughly uniform spacing and are roughly uniform in size and shape, or are systematic in variations of size, shape or spacing to produce a volume pattern conforming to a generally symmetrical system. If the pattern is a repeating or rather exactly regular one, the structure may be conveniently described as a lattice. The uranium bodies can be in the form of layers, rods, or cylinders, cubes or spheres, or approximate shapes, dispersed throughout the moderator. Optimum conditions are obtained with natural uranium by using metal spheres.

The resonance losses in uranium constitute one of the critical factors in coordinating the total losses permissible in a neutronic reactor. Proper sizes and shapes of the uranium bodies and volume ratios of uranium to moderator must be fairly accurately known in order that optimum geometry be approached, or if the use of near-optimum geometry is not desirable, then the permissible ranges of departure from the optimum should be determined, so that a reproduction ratio greater than unity can be maintained in a reactor of practical size.

The K constant of a mixture of fine uranium oxide particles in a light element such as graphite, found to be satisfactory as a neutron moderator, assuming both of them to be theoretically pure, would only be about .785. Actual K constants as high as about 1.04 have been obtained using aggregation of natural uranium oxide in graphite, and with as pure materials as is presently possible to obtain showing a substantial gain due solely to reduction of resonance loss.

Assuming theoretically pure graphite, and theoretically pure natural uranium metal, with the presently obtainable densities of 1.65 and 18 gms./cm.$^3$, respectively, the maximum possible K constant theoretically obtainable is about 1.1 when the uranium metal of density 18 gms./cm.$^3$ is aggregated with optimum geometry in the moderator. When heavy water ($D_2O$) is used as a moderator, higher K constants approaching 1.3 are obtainable. Still higher K constants can be obtained in uranium having more than the naturally occurring content of fissionable elements. Adding such fissionable material is termed enrichment of the uranium.

2. Neutron loss by absorption in the moderator

Neutrons are also subject to capture by the moderator. While carbon and beryllium have very small capture cross sections for thermal neutrons, and deuterium still smaller, a fraction of the thermal neutrons present in the system under best conditions is lost by capture in the moderator during diffusion therethrough. It is therefore desirable to have the neutrons reaching thermal energy enter uranium as promptly as possible. This may be taken care of by using optimum or near optimum geometry where the resonance absorption is substantially equal to absorption in the moderator.

Moderators differ in their ability to slow down neutrons and in their capacity to absorb neutrons. The ability to slow down neutrons may be expressed by what is known as the scattering cross section of the nucleus, whereas the ability to absorb or capture neutrons is expressed by what is known as the capture cross section of the nucleus. The ratios of absorption cross section to scattering cross section for moderators discussed herein are approximately as follows:

| | |
|---|---|
| Light water (H₂O) | .00478 |
| Diphenyl | .00453 |
| Beryllium | .00127 |
| Graphite | .000726 |
| Heavy water (D₂O) | .00017 |

The choice of moderators therefore will depend on many considerations, as will be apparent from further discussions herein.

*3. Neutron loss by absorption by impurities in the system*

However, even when resonance and moderator losses are reduced to a practical minimum, no self-sustaining chain reaction can be obtained in any system unless impurities in the materials used for the reaction are reduced to such an extent that the loss by parasitic capture by such impurities will not, in combination with the other losses, prevent the reaction from becoming self-sustaining. Impurities present in both the uranium and the moderator consequently constitute a very important neutron loss factor in the chain. The effectiveness of various elements as neutron absorbers varies tremendously.

Certain elements such as boron, cadmium, samarium, gadolinium, and some others, for example, if present even in a few parts per million, could very likely prevent a self-sustaining chain reaction from taking place. It is highly important, therefore, to remove as far as possible all impurities capturing neutrons to the detriment of the chain reaction from both the slowing material and the uranium. If these impurities are present in too great quantity, the self-sustaining chain reaction cannot be attained. The permissible amounts of impurities will vary for each specific geometry, depending upon such considerations as the form in which the uranium is used—that is, whether natural or enriched, whether as metal or oxide. The type of slowing down material used also influences the effect of impurities, as do the weight ratios between the uranium and the slowing down material. Elements such as oxygen may be present, and the uranium may be in the form of oxide, such as $UO_2$ or $U_3O_8$, a carbide, or fluoride, but the metal is preferred. Nitrogen may be present in the reactor in fairly large amounts, and its effect on the chain reaction is such that the neutron reproduction ratio of the system may be changed by changes in atmospheric pressure. This latter effect may be eliminated by excluding nitrogen from the system, or by sealing the system from the effects of changes of atmospheric pressure.

The effect of impurities on the optimum reproduction factor K may be conveniently evaluated by means of certain constants known as "danger coefficients" which are assigned to the various elements. These danger coefficients for the impurities are each multiplied by the percent by weight of the corresponding impurity, with respect to the weight of uranium in the system, and the total sum of these coefficients gives a value known as the total danger sum. This total danger sum is subtracted from the reproduction constant K as calculated for theoretically pure materials and for the specific geometry under consideration.

The danger coefficients are defined in terms of the ratio of the weight of impurity per unit mass of uranium and are based on the cross section for absorption of thermal neutrons of the various elements. These values may be obtained from physics textbooks on the subject, and by direct measurement, and the danger coefficient computed by the formula $$\frac{T_i}{T_u} \frac{A_u}{A_i}$$

wherein $T_i$ and $T_u$ represent the cross sections for the impurity and the uranium respectively, $A_i$ the atomic weight of the impurity and $A_u$ the atomic weight for uranium. Regardless whether the impurities are in the moderator or in the uranium, they are computed as their percent by weight, of the uranium in the system.

Danger coefficients for some elements are given in the following table, wherein the elements are listed in order of their atomic number:

| Element | Danger Coefficient | Element | Danger Coefficient |
|---|---|---|---|
| H | 10 | Co | 17 |
| D | 0.1 | Ni | 3 |
| He | 0 | Cu | 1.8 |
| Li | 310 | Zn | 0.61 |
| Be | 0.04 | Ga | ~1 |
| B | 2,150 | As | ~2 |
| C | 0.012 | Se | 6.3 |
| N | 4 | Br | 2.5 |
| O | 0.002 | Rh | 50 |
| F | 0.02 | Ag | 18 |
| Na | 0.65 | Cd | 870 |
| Mg | 0.48 | In | 54.2 |
| Al | 0.30 | Sn | 0.18 |
| Si | 0.26 | Sb | 1.6 |
| P | 0.3 | I | 1.6 |
| S | 0.46 | Ba | 0.30 |
| Cl | 31 | Sm | ~1,430 |
| K | 2.1 | Eu | 435 |
| Ca | 0.37 | Gd | ~6,320 |
| Ti | 3.8 | Pb | 0.03 |
| V | 4 | Bi | 0.0025 |
| Cr | 2 | Th | 1.1 |
| Mn | 7.5 | | |
| Fe | 1.5 | | |

The sum of the danger coefficients of the impurities in any given composition entering into a reactor as multiplied by the percent by weight of the uranium in the reactor, is known as total danger sum of the composition. This figure is a dimensionless constant like K and accordingly can be directly subtracted from K. It will be noted that the danger coefficients given are related to the neutron absorption value of unity for uranium.

As a specific example, of the use of danger coefficients, if the materials of a system under consideration has 0.01 percent by weight of each of the elements H, Co, and Ag with respect to the weight of the uranium in the system, the total danger sum in K units for such an analysis would be:

$$.0001 \times 10 + .0001 \times 17 + .0001 \times 18 = .0045$$

This figure can then be subtracted from the K calculated for a particular geometry of theoretically pure materials to give the actual K constant for the materials used. This would be a rather unimportant reduction in the reproduction factor K unless the reproduction factor K for a given geometry and materials without considering impurities, is very nearly unity. If, on the other hand, the impurities in the uranium are Li, Co, and Rh in the same percentage, the total danger sum would be:

$$.0310 + .0017 + .0050 = .0377$$

reduction in K due to impurities. This latter reduction in the reproduction factor for a given system would be serious and might well reduce the reproduction factor below unity for certain geometries.

The maximum possible K constants for neutronic reaction systems when natural uranium aggregates in optimum geometry (i. e., best apportionment of resonance and moderator losses) are used, and where the materials used are assumed to be theoretically pure, have been calculated as follows:

Materials:                                    K for pure materials
    U metal—graphite moderator _____ 1.1.
    U oxide—graphite moderator _____ 1.07.
    U metal—beryllium metal moderator _____ 1.11.
    U metal—beryllium oxide moderator _____ 1.1.
    U metal—heavy water moderator _____ About 1.3.
    U metal—light water moderator _____ About 1.

In reactors operating at high neutron densities an equilibrium poisoning factor up to .024 K can develop and must be taken into consideration, as will be brought out later.

It can readily be seen from the above tabulation that the total danger sum for impurities in both the uranium and moderator must be less than about .3 in order that the K factor remain equal to or greater than unity with a deuterium moderator, about .11 for a beryllium moderator, and about .1 for a graphite moderator. Light water can be used as a moderator, at least in part of a reactor, as will be pointed out later.

In the chain reaction outlined in Fig. 1 for a natural uranium reactor of practical size, a small percentage of neutrons can be absorbed by impurities without reducing the neutron reproduction ratio below unity. Not all of these neutrons, however, should be absorbed by the residual impurities in the uranium and the moderator, because if this were so the system would always just be self-sustaining and no exponential rise in neutron density could be obtained. Some means must be provided to release additional neutrons to enter the chain.

For example, in Fig. 1, it may be considered that only half of the neutrons that can be absorbed by impurities are absorbed by materials actually present as impurities in the uranium and the moderator, and that the other half of the neutrons are absorbed by a strong neutron absorbing material, such as cadmium, for example, that is wholly or partially removable from the system. Under these conditions, with the chain reaction in balance, if the amount of cadmium or other neutron absorbing material is reduced in the system by removal therefrom to a point where less than the number of neutrons that can be spared for impurity absorption are absorbed by both the impurities in the materials and by the remaining cadmium, for example, then the neutron density in the system will rise exponentially when the system is large enough, because the neutron reproduction in each cycle then will exceed $100n$ fast neutrons for each original $100n$ fast neutrons.

In order to stabilize the reaction at any desired neutron density within the system, the neutron density is measured as it is rising. When a predetermined neutron density is reached within the system, the cadmium or other neutron absorbing material is reinserted into the system to a point where the total permissible number of neutrons is again absorbed by the total impurities within the system. The chain reaction will again be in balance at the new neutron density. To reduce the neutron density, still more absorbing material is introduced into the system sufficient, for example, to increase the total impurity absorption to the point where less than $100n$ new fast neutrons are produced per cycle. The neutron density will then decay. The system can then be stabilized when a new desired lower neutron density is reached by decreasing the amount of the absorbing material in the system until only the number of neutrons permissible for balance are again absorbed, and the system will then be balanced at the lower neutron density. The reaction is completely stopped by leaving sufficient absorbers in the system to prevent the reaction from building up or remaining in balance. The neutron density will then drop to a low natural neutron background value, and remain there until the absorbers are again removed to raise the reproduction ratio above unity.

4. *Exterior neutron loss in a neutronic reactor of practical size*

In any chain reacting system, it is only when the system has infinite size that there will be no exterior leakage of neutrons from the system. For any reactor of finite size exterior neutron losses will occur, and these losses will increase as the size of the reactor decreases.

Losses will occur both of fast neutrons, which during their slowing down by scattering collisions by the nuclei of the moderator may become directed outwardly when near the periphery of the reactor and thus escape before they reach thermal energy, and of slow neutrons. The latter may escape when they are diffusing through the moderator near the periphery of the reactor.

Thus while a system of infinite size can have a reproduction constant K of, for example 1.1, the identical construction made smaller than infinite size, because of this exterior leakage, can no longer have $110n$ new neutrons produced for each $100n$ initiating a cycle. The number will be less by the leakage factor and will, as the size of the reactor is decreased reach the point where only $100n$ new neutrons are produced for each $100n$ neutrons starting each generation. This size is known as the critical size of the reactor and is, of course, dependent on the K constant of the system, when moderator characteristics are known, or, upon a factor known as the Laplacian $(\Delta)$, as found directly in a lattice of small volume as will be shortly brought out. For each value for the reproduction factor K greater than unity as modified by moderator characteristics, there is thus a minimum overall size of the reactor known as the critical size wherein the neutron reproduction ratio is unity. However, if the reproduction ratio is exactly unity no rise in neutron density will occur. The reactor, to be operative at any desired power output, must be capable of providing a reproduction ratio of slightly over unity, and therefore must be made slightly larger than critical size so that the required reproduction ratio can be attained. Once the desired operating power output is established, the reproduction ratio can be reduced to unity by insertion of control absorbers and the reaction maintained thereafter at the desired power output. Critical size and operating size can be determined mathematically when losses are known and coordinated, as brought out later.

Some of the exterior losses however, can be reduced by surrounding the reactor with what is known as a reflector, of a material preferably having a low absorption to scattering cross section ratio. The effect of the reflector on operating size will be shown later.

MEASUREMENT OF NEUTRON LOSSES

In using the exponential pile to test for neutron losses, a pile structure with a specific geometry of uranium and graphite blocks, for example, is built which is known to be of non-operating dimensions. In other words, it is of sufficiently small size that the exterior leakage from the system would prevent a self-sustaining neutronic chain reaction even if the K constant were to be above unity. In such a small pile, uranium compositions can be arranged in any desired geometry and by placing a neutron source, such as a radium-beryllium source, at the bottom of the pile, a neutron density distribution specific to the geometry and materials used will be created through the pile. By measuring the neutron density in various parts of the pile, it is found that the neutron density declines exponentially with the distance away from the source. This characteristic gives the pile its name of exponential pile. Different types of geometries can be tested in such a pile to determine optimum conditions, for example, or range of conditions for which K is greater than unity.

If, instead of varying the geometry, the geometry and the moderator is maintained constant and uranium compositions of different neutronic purities are substituted, the change in slope of the curve showing the decay in neutron density through the structure away from the source will give an accurate measure of the neutronic purity of the uranium composition, in terms of the K constant if desired. In this way, different uranium compositions can be compared with one another and the effect on the K constant determined. The departure of the K constant as found for a particular composition from the K constant calculated for theoretically pure uranium will thus give the danger sum for neutron absorbing impurities in the uranium, when the K reduction due to moderator impurities is known.

As the structure is customarily built up or piled from moderator blocks when solid moderators are used and having the uranium lumps geometrically arranged therein, the structure is commonly called a "pile," and the geometrical arrangement of the uranium lumps in the moderator called a lattice.

Briefly, the theory of exponential pile measurements is as follows:

Considering a uranium-graphite lattice structure or column of square cross section with sides equal to $a$, and semi-infinite height, with a source of fast neutrons at the center of the base of the column, then, at points sufficiently far removed from the source, the neutron density due to any chain reaction present will be given by an equation of the following form where $x$, $y$, and $z$ are the axes of the structure:

$$n = \sum_{ij} A_{ij} e^{\frac{-x}{b_{ij}}} \cos \frac{i\pi y}{a} \cos \frac{j\pi z}{a} \quad (1)$$

where the symbols $ij$ represent the orders and arguments of the Bessel function series, $A$ is a constant which varies with the Bessel functions included in the summation and $b$ is a constant associated with the exponentials in the summation.

The $x$ axis is taken along the vertical axis of the structure, and the $x=0$ plane coincides with the base of the pile. Thus, for points close to the vertical axis, each harmonic of the neutron density decreases exponentially as follows:

$$n_{ij} = A_{ij} e^{\frac{-x}{b_{ij}}} \quad (2)$$

with a relaxation distance or length equal to $b_{ij}$, the relaxation distance or length being the distance in which the neutron flux is reduced to a fraction of $1/e$ of its original value. At a sufficiently large distance from the source the first harmonic only is important. The relaxation length can then be taken as $b$, and $b$ taken alone is related to the reproduction factor K through the following equation:

$$K = 1 - \frac{\lambda \Lambda}{3}\left(\frac{1}{b^2} - \frac{2\pi^2}{a^2}\right) - \frac{r_0^2}{4}\left(\frac{1}{b^2} + \frac{2\pi^2}{a^2}\right) \quad (3)$$

where $a =$ length of side of the structure
$b =$ relaxation distance
$\lambda =$ mean free path of thermal neutrons in graphite
$\Lambda =$ mean free path for absorption collision
$r_0^2/4 =$ the age of nascent thermal neutrons The quantity $$\frac{1}{b^2} - \frac{2\pi^2}{a^2} = \Delta$$

$\Delta$ signifies a number given by the ratio of $\Delta n$ to $n$ where $n$ is the number of thermal neutrons per cubic centimeter at the point $x$, $y$, $z$. $\Delta n$ is an abbreviation for the sum of the three second derivatives of $n$ with respect to the three variables $x$, $y$, $z$. $\Delta$ is found to be constant throughout any structure utilizing given geometries and materials. For the cases where K is close to unity, $\Delta$ is small, so that the equation can be written $$K = 1 - \left(\frac{\lambda \Lambda}{3} + \frac{r_0^2}{4}\right)\left(\frac{1}{b^2} - \frac{2\pi^2}{a^2}\right) \quad (4)$$

By defining $$M^2 = \left(\frac{\lambda \Lambda}{3} + \frac{r_0^2}{4}\right)$$

then M is the migration length of thermal neutrons in the structure, and is roughly proportional to the average distance between the place of birth of a neutron as a fission neutron and its place of death by thermal absorption.

Substituting in (4) the quantity $\Delta$ for the quantity $$\frac{1}{b^2} - \frac{2\pi^2}{a^2}$$

and $$M^2 \text{ for } \frac{\lambda \Lambda}{3} + \frac{r_0^2}{4}$$

the equation can be written $$K = 1 - M^2 \Delta \quad (5)$$

The final equation for K can then be written to include $M^2$, $a$ and $b$ as follows:

$$K = 1 - M^2\left(\frac{1}{b^2} - \frac{2\pi^2}{a^2}\right) \quad (6)$$

$M^2$ has been found to be from about 650 cm.$^2$ to 750 cm.$^2$ for chain reacting structures of uranium and graphite, formed by building up or piling graphite moderator blocks with uranium lumps geometrically arranged therein, and can be used in Equation 6 to find K for such structures.

The length of a side, $a$, to be used in calculating K from Equation 6 must be that value for which the neutron intensity actually becomes equal to 0. Because of the finite length of the mean free path $\lambda$, compared to the dimensions of the pile, the effective side is larger than the physical side. From neutron density measurements made at the outer surface of the pile, the effective value of $a$ can be estimated, for various $x$ planes. Using the quantities found for M and $a$, a measurement of the relaxation distance $b$, associated with the first harmonic of the neutron density will then determine, from Equation 6, the reproduction factor corresponding to a lattice of infinite dimensions similar in geometry and materials to the structure being tested. This reproduction factor must be modified when used in conjunction with reactors attaining high neutron densities for prolonged time periods, by an operational poisoning factor. This factor can be added into the exponential pile by adding equivalent absorbers to each cell and then finding $\Delta$ or K. When K is found without such absorbers this factor can be directly deducted.

To determine the relaxation distance $b$, thin indium foils (.0924 gm./cm.$^2$), are placed at positions along the axis of the pile for a predetermined time for example and the 54 minute radioactivity induced by neutron bombardment is measured on Geiger-Mueller counters for a predetermined time. For these measurements the indium foil is held in a nickel holder. Thus the activation of the foil ($A_{nI}$) is due to the absorption of both thermal and indium resonance neutrons. All measurements are corrected to give the foil activity values for infinite times of irradiation. The emission of neutrons by spontaneous fissions of the uranium in the pile produces a small neutron background which must be subtracted from the density measurements.

Because of the finite height of an exponential pile, two corrections may be applied to neutron density measurements. First, a harmonic correction due to the presence of higher harmonics in the neutron density curve in horizontal planes near the source; and second, an end-correction due to the proximity of the top of any practical column to the measuring positions.

Finally after making the harmonic and end-corrections, $b$ is calculated from the relation $$b = \ln \frac{D}{\frac{(A_{nI})_2}{(A_{nI})_1}} \quad (7)$$

where $d$ is the distance between the two positions $x_1$ and $x_2$ along the vertical axis at which $(A_{nI})_1$, and $(A_{nI})_2$ are measured and $ln$ the mean logarithm to the base $e$.

For measurements near the top of the pile the harmonic correction may be ignored. For measurements away from the top the end-correction may be ignored.

Thus the best values are obtained from measurements in $x$ planes intermediate between the sources and top.

Two neutron density measurements made in adjacent positions along the vertical axis of the exponential pile will, therefore, give $b$ and $a$ value $\Delta$ or a value for K when the value of $M^2$ is known. It is customary to average the values obtained by using measurements made in several adjacent and equally spaced positions along the vertical axis to obtain the average $\Delta$ or K constant for the entire pile.

The same procedure can be used when liquid moderators are involved by placing the liquid in a tank and suspending the uranium, in the form of rods, for example, so that it enters the moderator. Measurements are made as set forth herein for solid moderators.

The migration length has been described as roughly proportional to the average displacement of a neutron from the point of its origin as a fast neutron in a uranium lump to the point of its disappearance in the pile. More precisely, we define the square of the migration length by the formula $$M^2 = \frac{r_0^2}{4} + \frac{\lambda \Lambda}{3} \qquad (8)$$

where $r_0^2$ is the mean square distance between production and disappearance of neutrons in the lattice.

In principle, an experiment for the actual measurement of the migration length could be performed as follows: A lattice of a given type is set up, as for the exponential pile. For best results it would be desirable to suppress neutron multiplication in this lattice, which could be done, for example, by using instead of normal uranium, uranium completely depleted in the fissionable isotope, and readjusting the neutron absorption to equal that of normal uranium by the addition, say, of boron as a neutron absorber. Into this prepared lattice introduce a point source of fission neutrons, which might be a lump of spontaneously fissioning material. Then, by the usual foil techniques we could measure the distribution of thermal neutrons through the lattice, and compute the mean square distance by known methods. In principle one would thus obtain the correct value of $M^2$.

Such experiments have not to date been performed, because the preparation of the material is very expensive, and no proper fission source is presently available. Actually the best existing knowledge of $M^2$ for the present lattices is obtained by measurements made in an exponential pile using the formula:

$$\frac{K-1}{M^2} = -\Delta \qquad (9)$$

which is Formula 5 above. The Laplacian $\Delta$ can be measured directly in the exponential pile as follows using the formula:

$$\Delta = \frac{1}{b^2} - \frac{2\pi^2}{a^2} \qquad (10)$$

and by finding the values of $a$ and $b$ as outlined above, the value of $\Delta$ may be determined. A neutron absorber of known neutron capture cross section is then introduced into the exponential pile in known amounts, the change in the Laplacian measured, and $M^2$ calculated from the measurements.

In one specific instance an exponential pile having uranium rods arranged in graphite in such a manner that liquid could be passed over the uranium bodies, borated water in various concentrations of boron was passed through the lattice. It was found that there was a change in $\Delta$ of $$.0584 \times \frac{10^{-6}}{cm.^2}$$

for one part per million of boron in the water. From this change the value of $M^2$ was calculated to be about 590 cm.$^2$, accurate within about 10 percent of error. It is to be noted however that $M^2$ enters into K−1 only so that the error in K would then be only about 1 percent at the most. $M^2$ in this case is slightly lower than in a reactor without a cooling system and for a uranium metal sphere-graphite lattice $M^2$ has been found to be about 700 cm.$^2$.

The practical calculations for pile design do not even depend upon this procedure but upon a more theoretical one still. $M^2$ can be written:

$$M^2 = \tau + L_0^2(1-f) \qquad (11)$$

where the symbol $\tau$ designates the age of nascent neutrons and is essentially the mean square distance that fission neutrons may travel before becoming thermal. This can be directly measured in the moderator used, since the metal has a very small effect on slowing down. The second term ($L_0^2$) is the diffusion length squared for thermal neutrons in the lattice in question, which is equal simply to the diffusion length in the moderator. $L_0$ can also be directly measured in the moderator used, and is multiplied by the fraction of neutrons absorbed in the moderator, which is $(1-f)$, where $f$ is the thermal utilization defined as the fraction of the thermal neutrons absorbed by the uranium (both by simple capture and to produce fission) rather than by the moderator. Such calculations find many objections but are adequate to 10 to 15 percent and are suitable, therefore, for design purposes in finding K−1.

The following values of $M^2$ have been found by measurements and calculation to be indicative for preliminary design purposes in building reactors.

For water: $M^2 = 40$ cm.$^2$
For D$_2$O: $M^2 - 230$ cm.$^2$
For beryllium: $M^2 =$ on the order of 300 cm.$^2$
For graphite: $M^2 = 600$ cm.$^2$–700 cm.$^2$ By the use of the exponential pile, various sizes and shapes of uranium bodies have been tested and the related K factors found for various moderators.

By testing uranium compositions in the exponential pile, the neutronic purity can be determined in terms of K when the same moderator is used or when the effect of the moderator impurities is known, with geometry unchanged. The test is equally reliable for uranium compounds such as the uranium oxides U$_3$O$_8$ and UO$_2$, uranium carbide, uranium tetrafluoride, uranium hexafluoride, etc., compounds which contain, in addition to traces of elements having high neutron capture cross sections, large amounts of elements such as O, C, and F, all of which have relatively low neutron capture cross section. The test can evaluate the total effect of both types of impurities in terms of K reduction, as well as the effect of changing geometries on K.

When $M^2$ is known, this factor can be used to determine critical size of the structure for various moderators.

Thus the determination of the (1) proper size, shape and disposition of the uranium bodies in the moderator to reduce resonance losses; the determination of the (2) amounts of neutron absorbing impurities that can be tolerated in addition to other losses before a self-sustaining chain reaction will become impossible in a system of practical size; and determination of (3) the nuclear characteristics of the moderator with respect to requirements of critical size and tolerable exterior losses; has enabled us to provide a means and method of building neutronic reactors capable of sustaining a chain neutron reaction by virtue of nuclear fission, even when individual values for constants entering into the nuclear processes are only imperfectly known.

It is, therefore, the main object of the present invention to provide a means and method of designing and building and operating neutronic reactors capable of sustaining a chain nuclear reaction by virtue of nuclear fission, and to outline the variations that can be tolerated before the reaction will become impossible of attainment in structures of practical size.

Other objects and advantages of my invention will be apparent from a description of several operative reactors as shown in the attached drawings, wherein:

Fig. 10 is a top plan view of the reactor a portion of which is shown in central horizontal section;

Fig. 18 is a diagrammatic side view of a safety rod;

Fig. 19 is a diagrammatic side view of a shim or limiting rod;

Fig. 20 is a diagrammatic side view of a control rod;

Fig. 26 is an enlarged fragmentary vertical sectional view through a portion of the reactor showing in particular a uranium rod used in the reactor shown in Fig. 25;

Fig. 27 is a fragmentary detail sectional view corresponding to Fig. 26 but showing only a modification of the ball valve seal shown in Fig. 26;

Fig. 28 is an enlarged vertical sectional view of a portion of a uranium rod equipped with an attached adapter for removing the uranium rod from the reactor;

Fig. 29 is a horizontal sectional view shown partially in elevation, the section being taken on the line 29—29 of Fig. 25;

Fig. 33 is a plan view of the system shown in Figs. 31 and 32;

Fig. 34 is a longitudinal sectional view partly in elevation, of a jacketed slug;

Fig. 35 is a longitudinal sectional view, partly in elevation of a horizontal channel during a loading and unloading operation;

Fig. 36 is a cross sectional view taken as indicated by the line 36—36 in Fig. 35;

AN ILLUSTRATIVE NEUTRONIC REACTOR HAVING A SOLID MODERATOR

One of the simplest ways to accomplish a self-sustaining chain reaction operating by virtue of nuclear fission is to utilize either uranium metal, uranium oxide, or both, aggregated into bodies of substantial size and spaced in a solid moderator such as graphite to form a lattice, and built without the introduction of a cooling system into the reactor. Such a neutronic reactor is shown in Figs. 7 to 21, inclusive.

Figure 7:
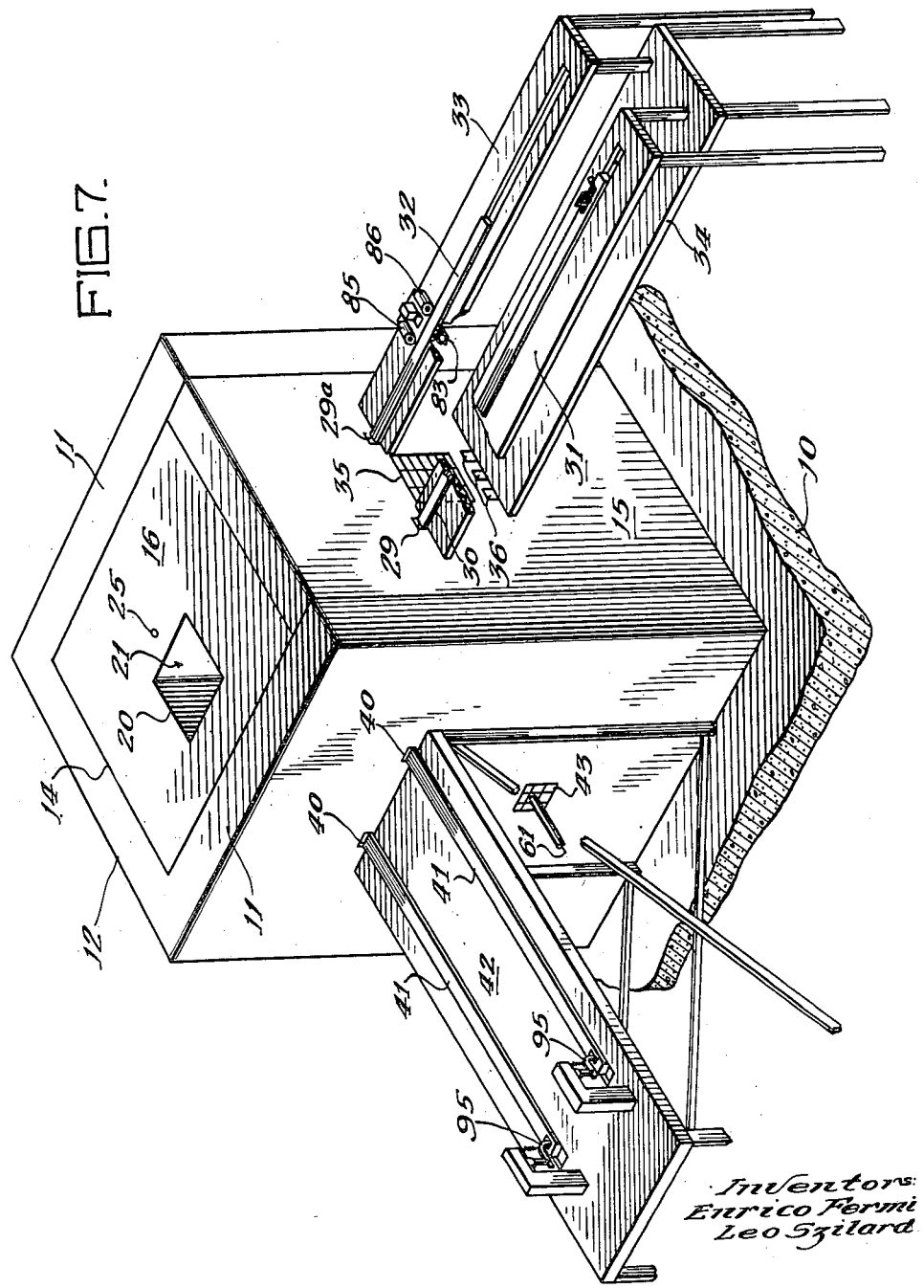
Fig. 7 is a perspective view of a uranium-graphite reactor completely enclosed in a radiation shield.

Fig. 7 shows the neutronic reactor system diagrammatically in perspective and will be first referred to. As the active portion of the reactor loses large quantities of neutrons during operation, and the fission reaction creates gamma radiation, it is desirable to protect operating personnel from the radiations resulting from the chain reaction. In this instance protection is provided by surrounding substantially all of the reactor with concrete or equivalent shielding.

A heavy concrete foundation 10 is first poured and side walls 11 and connecting backwall 12 are then erected. This provides a vault space 14 (Figs. 8, 9 and 10) in which the chain reacting lattice of uranium and graphite is erected until the vault is filled within about five feet of the top and five feet of the front, as will be later described. The front of the vault is then closed by a front wall 15 formed of concrete, and the top is closed by a top wall 16 which may be of wood and lead layers. The top wall 16 is pierced by a large opening 20, leading to a well 21 extending inwardly to the peripheral layer of uranium bodies in the internal lattice. A smaller adjacent aperture 25 is the exterior opening of a shaft 26 (Fig. 8) extending into the central portion of the reactor.

Front wall 15 is pierced by shim and regulating rod apertures 29 and 29a respectively, positioned on each side of and slightly above the center of front wall 15. A "shim" or limiting rod 30 is positioned on a limiting rod platform 31 and is movable to enter aperture 29 in a horizontal plane; and a regulating or control rod 32 is positioned on a control rod platform 33 to enter aperture 29a in a horizontal plane. Below the plane of these two rod platforms is a removal platform 34 positioned to receive lattice portions that may be removed from the reactor through a removable section channel 35 and from removable stringer channels 36. Details of the rod mechanisms and use of the platforms will later be described.

One side of the reactor side wall 11 is also pierced by a pair of spaced safety rod apertures 40 through which a two safety rods 41 can be horizontally inserted into the reactor from safety rod platform 42. Just below the safety rod apertures is an ionization chamber channel 43. This completes the description of the exterior of the reactor.

The self-sustaining chain reacting unit to be built up within vault space 14 is designed to so reduce total neutron losses as to make a self-sustaining chain reaction possible, as has been previously outlined, using specific types and sizes of uranium masses, both of metal and oxide in graphite, all of obtainable purity, and spaced with a specific geometry. As will be shown later, an all metal structure can be built, i. e., wherein all of the uranium bodies are of metallic uranium, but the combination of metal and oxide in the present example is utilized for economy.

The basic construction unit used to fill vault space 14 is a graphite block 4⅛ inches by 4⅛ inches in cross section, used in a number of lengths. The blocks are carefully planed by woodworking machinery to have smooth rectangular sides and end faces, so that they may be readily piled or stacked to fill the vault space 14 without substantial air spaces. Such construction has led the device to be termed a "pile," but the more generic term "reactor" is preferred.

Figure 14:
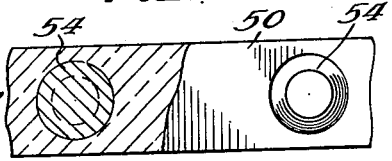
Fig. 14 is a plan view of a graphite block loaded with pseudospheres of uranium oxide, with a portion of the block broken away to show a pseudosphere in a section taken as indicated by line 14—14 in Fig. 13.
Figure 12:
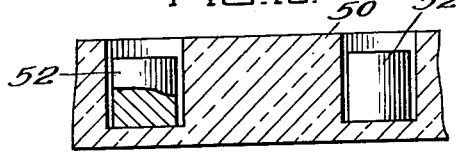
Fig. 12 is a longitudinal sectional view taken on the line 12—12 of Fig. 11.
Figure 15:
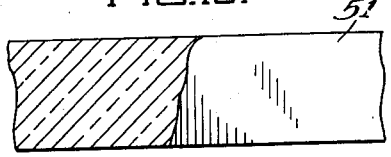
Fig. 15 is a plan view of a dead graphite brick with a portion broken away and shown in section.

Vault space 14 is dimensioned, in this instance, to receive horizontal graphite block layers. Two main types of graphite blocks are used as shown in Figs. 11–15, inclusive. Certain of the blocks 50 are drilled with cylindrical holes spaced 8¼ inches center to center to receive the uranium bodies which are placed therein. The uranium bearing graphite blocks 50 are termed live graphite. Other blocks 51, as shown in Fig. 15, contain no uranium and may be termed dead graphite.

Figure 13:
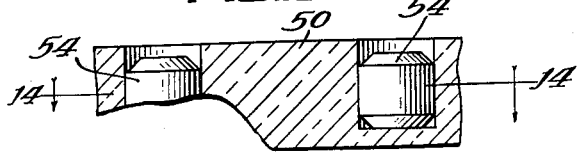
Fig. 13 is a longitudinal sectional view of a graphite block and showing pseudospheres of uranium oxide in place of the uranium metal.

The uranium bodies are in two main forms, one form being cast uranium metal cylinders 52 having a metal density of slightly over 18 grams per cubic centimeter, of several weights as later listed. Other uranium bodies 54 are in the form of pseudospheres of uranium oxide $UO_2$, similar to the metal cylinders with the exception of a beveling on top and bottom to approximate spherical contours as shown in Figs. 13 and 14. A few $U_3O_8$ cylinders are also used. The oxides are compressed to a density of about 6 grams/cm.³ and all of the uranium is purified as herein later described.

In any event, the uranium bodies are placed in the holes in blocks 50, and these live graphite blocks 50, in conjunction with dead graphite blocks 51 are used to build up the chain reacting system in vault space 14 by assembling the blocks into a uranium lump lattice arrangement to provide an active portion of substantially cubical form, surrounded by several layers of dead graphite to act as a reflector 17.

To start the building of the reactor in vault space 14, three bottom layers of dead graphite are laid down on the foundation 22 feet deep and 20 feet wide to start a reflector 17. For more uniform distribution of weight, alternate layers may have the graphite blocks crossed at right angles. The blocks are closely piled to minimize air spaces.

After three layers of dead graphite are piled, the uranium bearing layers are started with adjacent rows of live graphite cut in length so that the uranium bodies are spaced along the row 8¼" x 8¼" center to center, each live graphite row spaced by a row of dead graphite, with the uranium bodies aligned both across and in depth in the vault space. The uranium bearing rows do not begin until 12 inches of dead graphite is laid down next to the concrete walls of the vault and at the open front, and three sides have 16 inches of dead graphite. Thus the foundation of an active portion having a substantially square base is set up, with the base surrounded on all sides by at least 12 inches of graphite, with the uranium bearing portion of the layer being about 17½ feet wide by 19½ feet deep.

A layer of dead graphite is then laid over the first uranium bearing layer, and the next uranium bearing layer is laid with the uranium bodies substantially aligned vertically. Thus as the reactor is built up, layer by layer of alternate graphite and uranium-graphite layers, the uranium lumps form a cubic lattice with the uranium bodies aligned with the rectangular co-ordinates of the vault space 14.

Figure 8:
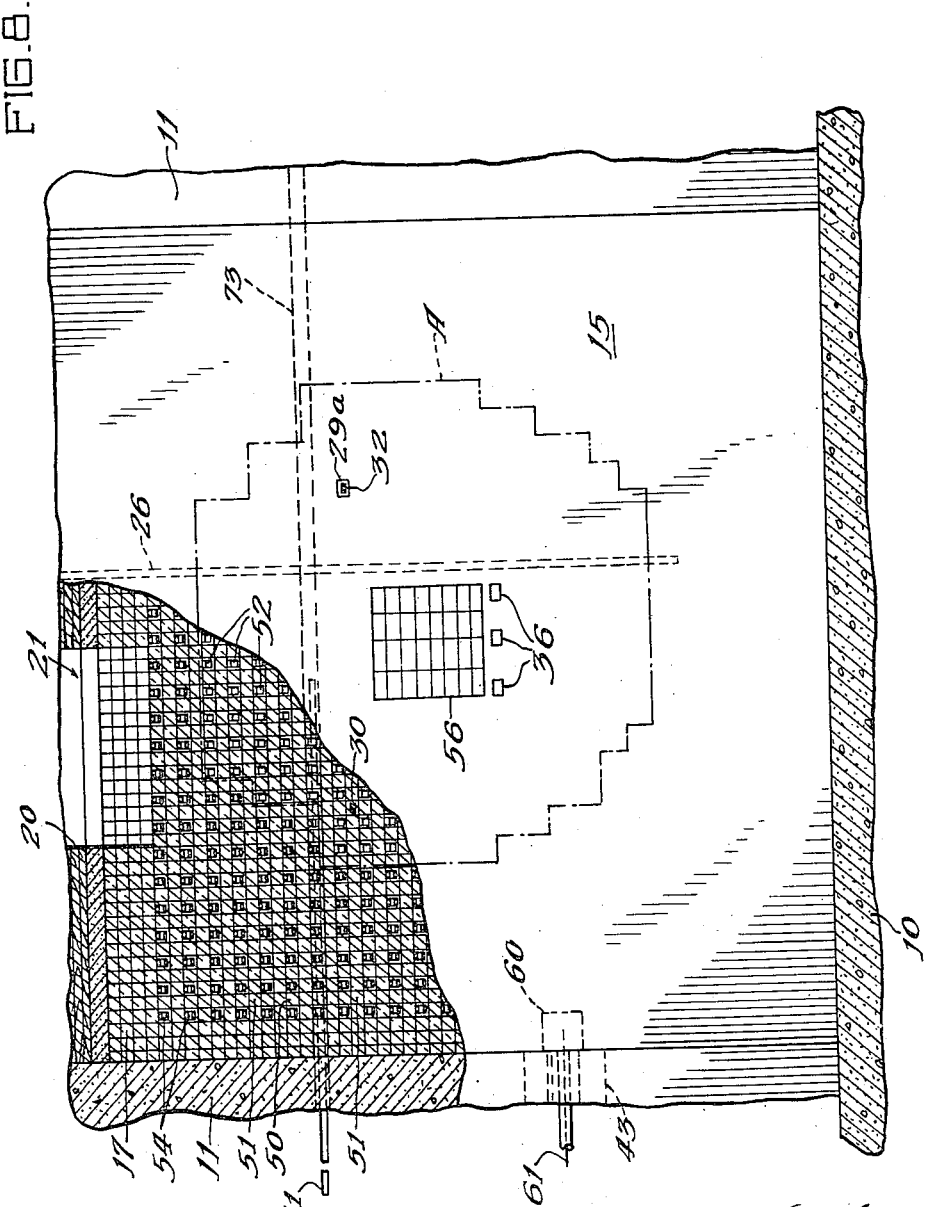
Fig. 8 is a front end plan view of the reactor shown in Fig. 7, a portion of which is shown in central vertical section.
Figure 9:
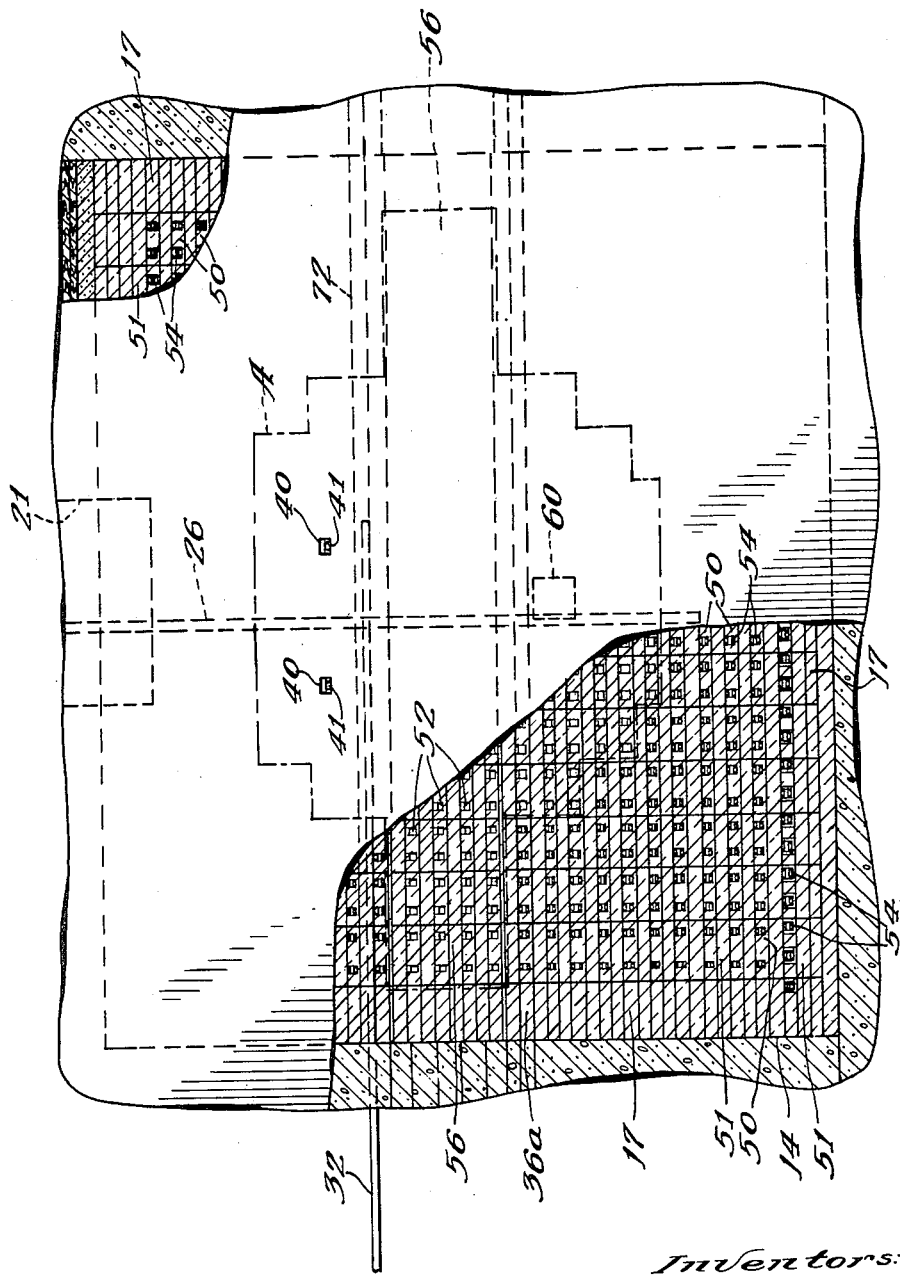
Fig. 9 is a side plan view of the reactor a portion of which is shown in central vertical section.

As the presently designed reactor is designed to have a central portion where the lumps are of uranium metal, the metal lumps are positioned in stepped relation in the various layers to form a mass about 13 feet wide, 10 feet high and 10 feet deep positioned between the 16th and 48th layer centrally of the reactor as indicated by broken line A in Figs. 8, 9 and 10.

Along lines passing close to the center of the reactor, removable stringers, such as indicated by numeral 36a in Figs. 9 and 10, of live carbon blocks, are preferably provided so that one or more complete rows of uranium bodies can be removed from close to a central diameter of the system, as may be desired for test purposes, as will later be described. Such stringers are easily provided by making the row of live graphite blocks it is desired to remove, slightly smaller in cross section than the surrounding blocks so that the row can readily be pushed out of the pile from outside the shield and reinserted when desired without disturbing the remainder of the structure.

As it may be desirable to be able to remove a larger amount of the uranium from the central portion of the reactor, a horizontal removable section 56 is provided, extending from front to rear of the reactor and through the central portion containing metal. This removable section contains metal uranium bodies extending all the way to the front and back of the active portion of the reactor and is 8 rows wide and 8 rows high.

Matching blocks bored with a vertical 2⅝" hole between the uranium bodies in the live blocks, and in proper position in the dead blocks, are aligned as layers are added, to provide internal continuity of the shaft 26.

Figure 16:
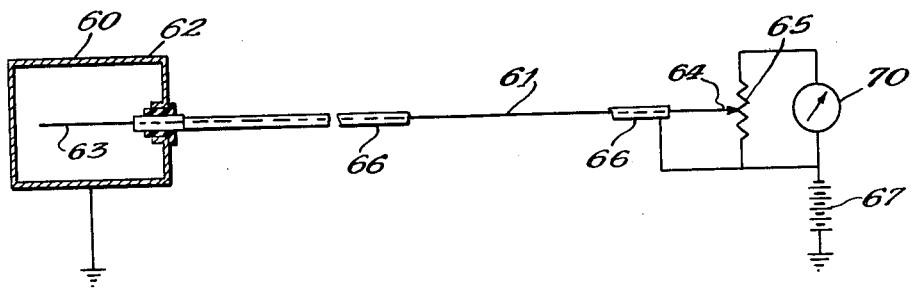
Fig. 16 is a schematic wiring diagram of a neutron density monitoring circuit.

As the reactor is being built the ionization chamber 60 is installed in channel 43 just inside wall 11. Wire line 61 is led to the outside and connected to a monitoring circuit, as shown in Fig. 16. The opening through the concrete shield is closed with concrete bricks.

Ionization chamber 60 comprises a sealed metal casing 62 containing approximately 18 liters of boron fluoride at one atmosphere pressure into which projects a central electrode 63. The central electrode is connected through central wire 61 to a contact 64 adjustable across resistor 65. One end of resistor 64 is connected to an outer wire shield 66 and to a battery 67 of about 450 volts potential, the other end of which is grounded, as is casing 62. The other end of resistor 65 is connected through galvanometer 70 to the wire shield side of battery 67. Neutron absorption by the boron in the chamber releases alpha particles by nuclear reaction and causes alpha ray ionization in the chamber, the amount thereof being measured by valvanometer 70. Only the ionization chamber need be exposed to the neutrons developed in the reactor, with the valvanometer positioned up to 300 feet away. The galvanometer deflection preferably positioned adjacent the control rod control is only approximately linear with neutron density, but is reproducible, and readily calibrated in terms of neutron density or power if desired.

As the reactor is built up layer by layer, slots 71 and 72 are provided in a dead graphite layer for entrance of the shim and regulating rods respectively, and at right angles thereto, on a higher level, safety rod slots 73 are provided in a dead graphite layer. All of these slots pass entirely through the reactor with the safety rod slots at right angles to the shim and control rod slots.

Construction is continued with the shim rod, control rod and safety rods fully inserted into the reactor.

Preferably, at least from the halfway point of construction, the natural neutron density in the pile is monitored as layers are added. That is, the relatively constant though small "natural" neutron contribution by spontaneous fission and from other natural sources, causes fission and initiates short chains of fission reaction in the partly built pile. Until the critical size of the pile is reached, such chain reactions are convergent, i. e., are not self-sustaining, but the fissions provide a measurable increase of neutron density in the pile, over that provided by the natural neutrons which traverse the structure. Thus it has been found that by plotting the neutron density within the pile as layers are added thereto, with the control rod and safety rods withdrawn, a prediction can be made in advance as to the size at which the chain reaction in the structure will become just self-sustaining. The personnel building the pile can thus be warned that the critical size is being approached.

Figure 17:
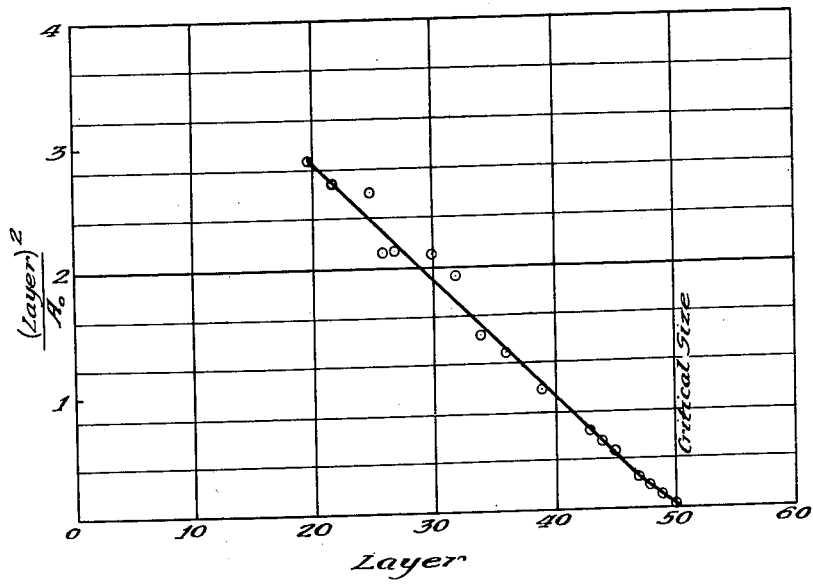
Fig. 17 is a graph showing neutron density values plotted with relation to the number of layers as a cubical reactor is built.
Figure 11:
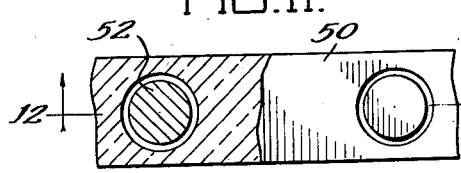
Fig. 11 is a plan view of one of the graphite blocks containing uranium metal with a portion broken away to show in section one of the uranium metal cylinders.

In Fig. 17 the results of indium foil measurements in the reactor are shown plotted against the number of layers placed on the pile during construction of the reactor, the foil measurements being obtained in the following manner.

$A_0$ is the so-called saturation radioactivity expressed in counts per minute of a standard indium foil activated by the neutrons at the approximate center of the structure as far as constructed.

The indium foils are held, for example, between aluminum trays and exposed to neutron bombardment at the approximate center of the pile for a predetermined period of time, to produce in the indium foil a condition of partial radioactive saturation. Various slots (not shown) extending into the lattice may be provided for insertion of the indium foil as construction proceeds, i. e., so that such access can be had to localities which successively constitute the approximate center of the existing structure.

After the predetermined period of exposure to the neutrons, the indium foil is removed from the pile and is allowed to stand for exactly three minutes to permit the short-lived radioactivity produced by the exposure to the neutrons to decay substantially to zero. The remaining induced radioactivity of the indium foil is then determined by utilizing a suitable and previously standardized Geiger counter to count the beta rays emanating from the foil over a predetermined time period. The results thus obtained are then converted into values which would have been obtained if the indium foil had been exposed to the neutrons sufficiently long to produce a state of saturation.

However, a given exposure time may be too long in regions of high neutron density, yielding too many counts per minute for the counter to handle accurately, or may be too short in very low density regions yielding too few counts for accurate representation, in which event the time schedules may be changed to compensate. The activity of the indium foil may then be expressed in terms of counts per minute at saturation for the foil used, although in the latter case and for long or short exposure times, the saturation activity in counts per minute may be determined from the equation $$A_0 = \frac{fc}{e^{-ft_x}(1-e^{-ft_w})(1-e^{-ft_c})} \quad (12)$$

where $c$ is the observed number of counts in time $t_c$, and in minutes, $t_w$, $t_x$ and $t_c$ are respectively the periods of irradiation, waiting and counting, and where $f$ is the fraction of the excited (radioactive) atoms that disintegrate in a unit time, and for indium equals 0.012836 per minute. The indium foils are preferably 4 cm. x 6.4 cm. and have and have a thickness corresponding to 0.094 gram/cm.$^2$ The values of layers/$A_0$ are plotted against the number of layers, i. e., for measurements of $A_0$ and computations of layers made as the illustrated pile was built, each measurement of $A_0$ being made for, and thus corresponding to, the steady state value of neutron density reached at the particular number of layers to which such measurement corresponds. It should be noted that as the critical size is approached, the steady state values of $A_0$ approach infinity, and when the critical size is exceeded, $A_0$ no longer has a steady state value. In place of a horizontal line as would be obtained if K were exactly unity, the curve slopes downwardly, indicating that K is greater than unity, i. e., that the neutron density is increasing more rapidly than $R^2_{eff}$, and that at some value of $R_{eff}$, and consequently at some determinable number of layers, indicated by the intercept with the axis, the density becomes or can become infinite. Thus as the plotted points approach the axis a simple extension of the curve clearly indicates in advance the layer at which the system will become chain reacting, with the ability to maintain the reaction, which in this case was slightly above the 50th layer.

With the safety, shim, and control rods fully inserted into the structure, the active portion and the reflector 17 are completed to the final size and shape desired, with layers of dead carbon blocks being positioned over the top thereof to complete the reflector 17, except for the well 21 and the shaft 26. The front of the vault was then closed. Except for the upward extension of well 21 the top was closed by adding 40 inches of wood and 6 inches of lead in order that personnel could be present on top of the reactor while it was operating. A structure is thus obtained having a substantially cubical active portion therein, surrounded by a carbon reflector 17, and enclosed in a shield on all sides.

While the critical size was reached at slightly above the 50th layer, the reactor to be operative must have a size larger than critical size so that the reproduction ratio is greater than unity, and so that a rise in neutron density can occur. In this case, the effective operating size for low, intermittent power was reached by the addition of four additional dead graphite layers, which completed the reflector across the top of the reactor and thus increased the effective size. The effect of the reflecting layer is given below in terms of the time for doubling the neutron density inside the reactor, with all control absorbers removed.

| Layer | Time for Doubling in Seconds |
|---|---|
| 50.09 | ∞ (critical size). |
| 51 | 90. |
| 52 | 32.9. |
| 53 | 19.0. |
| 54 | 12.5 (operating size). |

The shielding around the reactor was found to have a neutron reflecting capability equal to about 10 centimeters of dead graphite.

The concrete walls also serve as the main shield to prevent gamma radiation escaping outside the structure, as carbon, being a light material, absorbs gamma rays only to a relatively small extent. The water in the concrete also serves to slow down and absorb escaping neutrons.

More detailed specifications of the cubical reactor just described are given below:

URANIUM

| | |
|---|---|
| Total No. of U lumps in reactor | 17,640 |
| Total number of U metal lumps mostly 6, 7, and 8 lbs. each | 3,202. 20,368 lbs. |
| Total number of U oxide lumps mostly UO₂, about 6 lbs. each. About 5% U₃O₈ averaging 5 pounds each positioned in outer layers only | 14,438. |
| Total weight of U oxide in reactor | 84,000 lbs. |
| Total weight of uranium and uranium oxide in reactor | 104,000 lbs. |
| Total weight of graphite (including reflector) | 472 tons. |
| K of metal section | 1.07. |
| K of oxide section | 1.035. |
| Average K | About 1.055. |
| Fastest doubling time | 12.5 seconds. |

The graphite used was made from raw materials specially selected for minimum neutron absorption.

The various rods entering the reactor will next be described, as shown diagrammatically in Figs. 18, 19, and 20.

Referring first to Fig. 20 showing the control rod 32 the rod proper is a sheet of 5/16" steel 3½ inches wide and 15 feet long, to which are attached ¼" blocks of 15 percent boron steel in 4 inch lengths. The rod is mounted on lateral wheels 80 operating on tracks 81 on platform 33 outside of the reactor and on the bottom of slot 72 inside the reactor. The composite rod is provided with a rack 82 engaged by pinion 83. This pinion is driven by belt 84 from a differential gear box 84a in opposite directions by in motor 85 and out motor 86. Limit switches 87 and 87a are positioned to break the common motor lead at either end of the rod travel by contract of stop 88. The motors 85 and 86 are under control of the operator, and the action of the control rod is fully described in a subsequent section of this specification. A "selsyn" indicator system 86a is used with the indicator in view of the control rod operator to tell the operator the exact position of the control rod at all times. The indicator may be calibrated as discussed later.

The "shim" or limiting rod 30 is shown in Fig. 19. This rod may be simply a cadmium sheet 1/16" by 3½" by 15 feet riveted to a fiber backing, movable by hand into and out of the reactor, held in place by pin 89 and locked by pin guard 90 and padlock 91. This rod is so positioned in the reactor that when the control rod is completely out of the reactor the maximum reproduction ratio cannot exceed a value dependent upon the position of the shim rod.

The two safety rods 41 are alike and one is shown in Fig. 18. They are formed from 1/16" cadmium sheet 3½" wide backed by fiber, and long enough to completely cross the reactor. They are drawn into the reactor from platform 42 by cable 92 passing over pulley 93, the cable also carrying weight 94. The safety rods are normally held out of the reactor by latch 95 opened by spring 96 and held in latched position by current passing through solenoid 97. Accidental or deliberate interruption of current in solenoid 97 will cause the latch to open and the safety rods will be pulled into reactor by gravity to stop the reaction. Spring bumper 98 cushions the rod at the end of its travel. Normally when the reactor is left unattended, all rods are inserted fully into the reactor. The above described reactor is capable of being operated at an output as high as 10,000 kilowatts for short periods. Since the reactor is only conductively cooled, only small powers can be continuously maintained without an appreciable internal temperature rise. However, the reactor is valuable for the manufacture of radioactive elements and 94²³⁹ and subsequent removal of the irradiated uranium by use of the removable section, for use as an intense source of neutrons available in well 21 and shaft 26 (Fig. 8), as a generator of high energy gamma rays, and as a means for testing materials by use of the removable stringers. These uses are more fully described later in the section on uses of neutronic reactors.

The power produced by the reactor at any attained neutron density may also be calculated from measurements on standard indium foils in locations spaced across the reactor. Again using a symbol $A_0$ for the saturation radioactivity value computed from the counts per minute obtained in a Geiger counter from the standard indium foils distributed across the pile, and assuming the total energy produced per fission is 200 million electron volts (Mev.), equivalent to $3.2 \times 10^{-4}$ ergs, the power of the pile at the measurement location is given by the following formula:

Power = $2.3 A_0$ ergs/sec. = $2.3 \times 10^{-7} \times A_0$ watts. Such indium foil measurements can be used to accurately calibrate galvanometer 70 in terms of watts, if desired. The power can be removed as heat from neutronic reactors by the use of suitable circulating media if desired, as will be taken up later.

A prototype of the reactor as above described was built in a slightly non-spherical shape, and successfully operated to create a self-sustaining chain reaction at about 200 watts power. This reactor was then torn down and a large portion thereof incorporated in the reactor just previously described.

Figure 42:
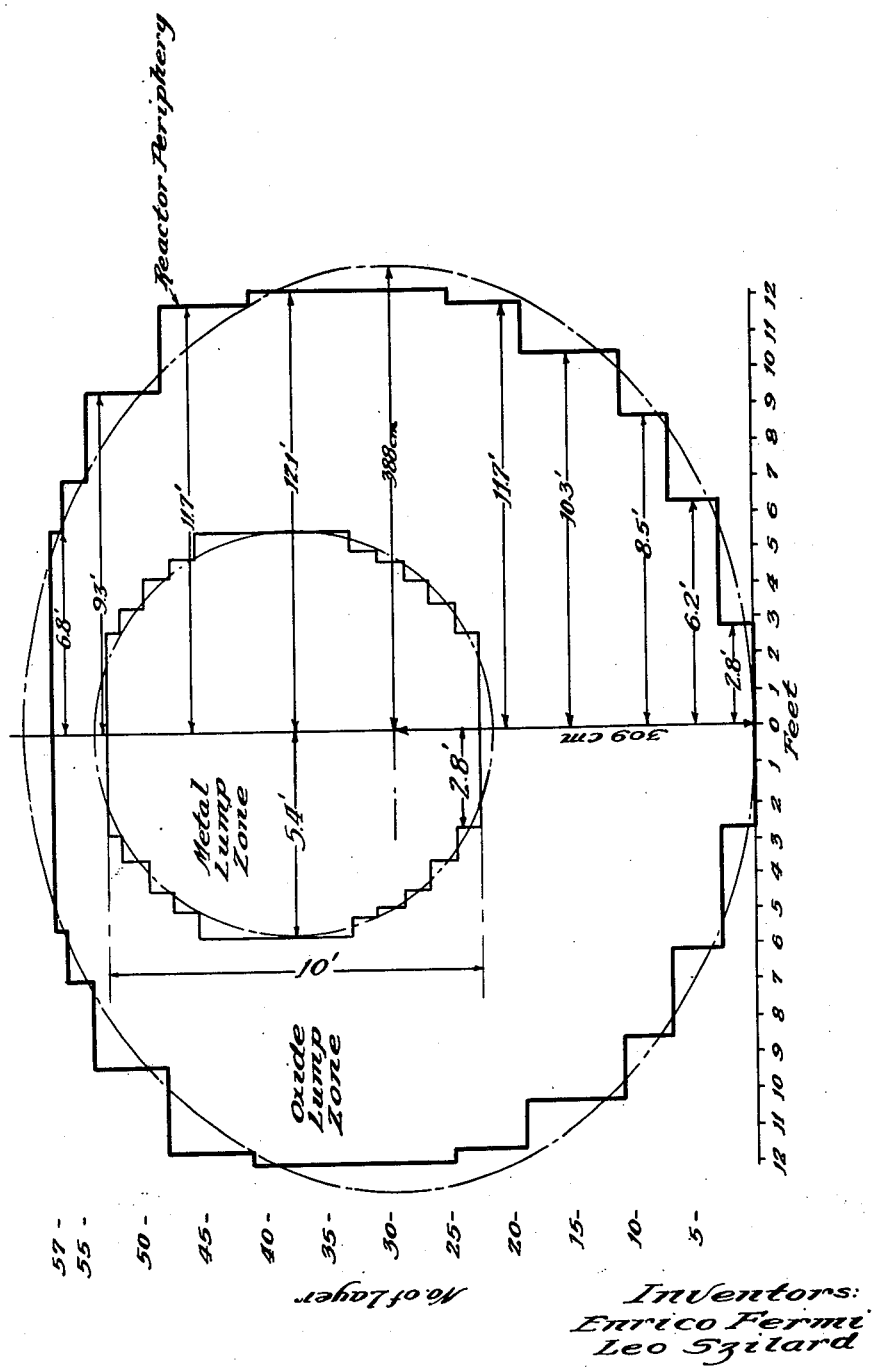
Fig. 42 is a diagram showing the outline of a reactor in the shape, roughly, of an ellipsoid.

As originally operated, the active portion of the reactor was not cubical but was substantially in the shape of a flattened rotational ellipsoid with a polar semi-axis of 309 centimeters and an equitorial semi-axis of 388 centimeters as shown diagrammatically in Fig. 42. The effective radius was about 355 centimeters (12.7 feet) and the average K constant was about 1.054. It was surrounded by about 12 inches of graphite and supported by a wooden framework.

The uranium in the reactor was as follows:

| Geometrical Shape | Compound | Weight, lbs. | Density, gm./cm.³ | Number | Total Weight in Reactor, lbs. |
|---|---|---|---|---|---|
| 2¼" cylinder | Metal | 6.0 | 18 | 2,060 | 12,400 |
| 3¼" pseudosphere | UO₂ | 4.72 | 6.10 | 14,840 | 70,000 |
| 3¼" pseudosphere | U₃O₈ | 3.99 | 5.17 | 1,200 | 4,790 |
| 3" cylinder | UO₂ | 4.56 | 6.14 | 540 | 2,460 |
| 3" cylinder | U₃O₈ | 3.97 | 5.20 | 840 | 3,340 |
| | | | | 19,480 | ¹ 92,990 |

¹ Equals 46.5 tons.

Various grades and makes of graphite were used in the reactor, the reflector and a pier extending upwardly for use as a thermal neutron source. The graphite was made from raw materials selected to give a K reduction which averaged about .02.

GRAPHITE IN THE REACTOR

As this reactor was built up the neutron activity was also monitored with indium foil exposures as above described. However, in this case, the changing shape of the reactor must be taken into account.

In this reactor, $R_{\text{eff}}$ is the effective radius of the structure at various stages during construction. It is given by the formula $$\frac{3}{R_{\text{eff}}^2} = \frac{1}{a^2} + \frac{1}{b^2} + \frac{1}{c^2} \tag{13}$$

where $a$, $b$, $c$ are the sides of a rectangular parallelepiped which is drawn to conform as closely as possible to the actual shape of the structure in its various stages of construction. If a structure employing a geometry giving K exactly unity is built up gradually maintaining a true spherical shape, then $A_0$ increases approximately as $R^2$, where R is the radius of the sphere at any time.

If it is built with an ellipsoidal shape, then $A_0$ increases approximately as $R^2_{eff}$, and in the actual structure that is built, approximate values of $a$, $b$, $c$, to agree with the actual shape at any stage can be estimated, and $R^2_{eff}$ calculated.

Figure 21:
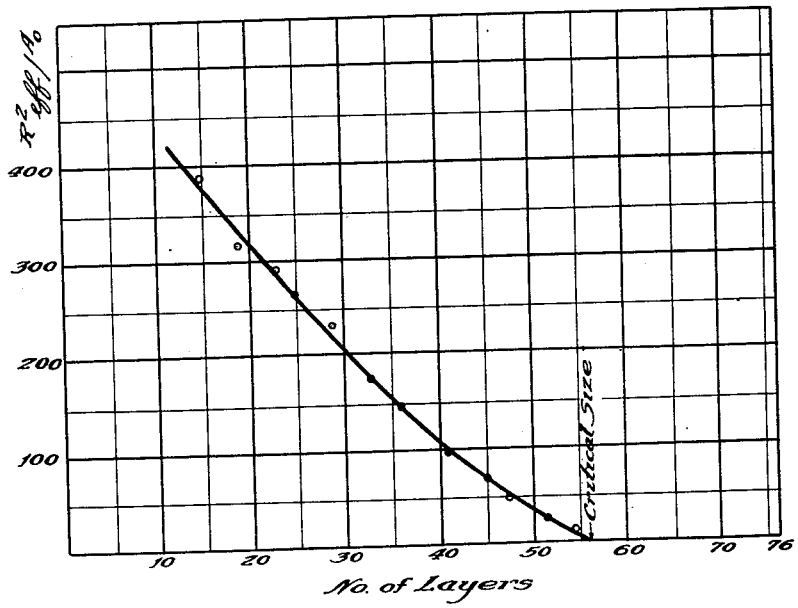
Fig. 21 is a graph on which are plotted neutron density value relations found in the active portion of the system plotted against number of layers of graphite bricks for an ellipsoidal reactor.

The values of $R^2_{eff}$ are then used to plot $$\frac{R^2_{eff}}{A_0}$$

against layers to predict the critical layer as shown in Fig. 21.

This reactor became chain reacting after the 57th layer was added, this being about one layer beyond critical size. With 57 layers in position, the time for doubling the reaction was found to be about 1 minute. The reactor construction was started to provide a spherical shape. While the K factor of the bulk of the metal and the graphite, and the oxide and graphite, was known from exponential pile measurement, a substantial amount of untested graphite was used in the outer portions of the reactor. This graphite proved to have a lower danger sum than that predicted, giving an average K factor higher than expected. In consequence, measurements showed that the reactor would reach $r = 1$ sooner than expected, and therefore it was finished off without completing the sphere. When the cubical reactor previously described was built the K factors were better known for the various combinations of uranium and graphite and the structure more closely approached the calculated critical size and symmetry.

Figure 24:
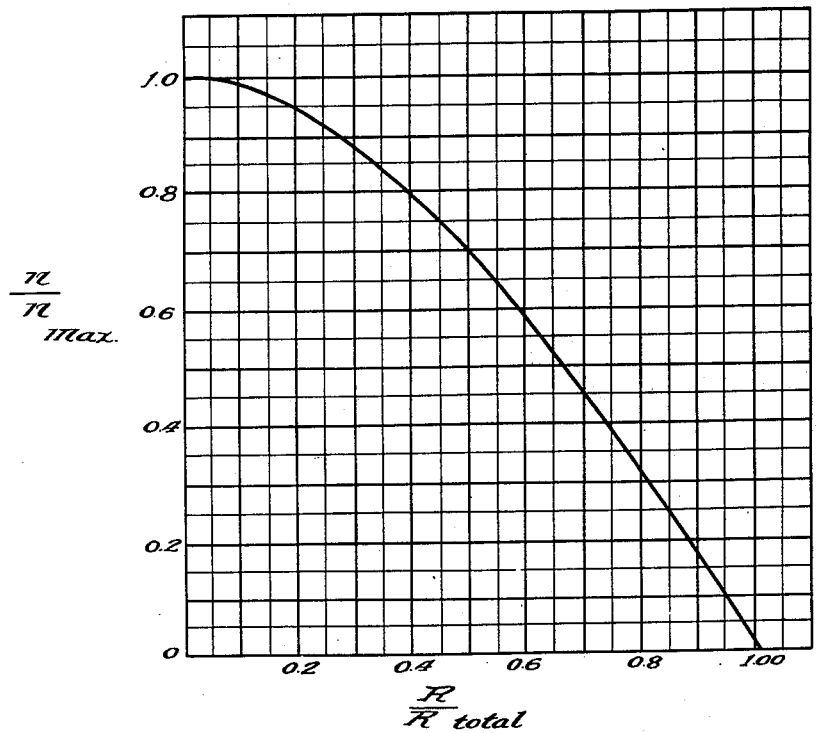
Fig. 24 is a diagram illustrating the distribution of neutron density in a spherical reactor.

The neutron density distribution in a spherical reactor is shown in Fig. 24 where the ratio of the neutron density to the maximum neutron density in the pile is given for points within the reactor set forth as the ratio of the partial radius at those points, to the total radius. The maximum neutron density occurs at the center of the reactor, falling off rapidly as the periphery is approached with approximately a cosine curve. The curve shows only a very small relative density at the periphery of the reactor, but this density represents a flux of about 4 percent (in graphite) of the total neutrons generated that are continuously leaking out of the reactor. The density, however, of the neutrons leaking from the reactor is low compared to those diffusing through the reactor and thus causes only a slight displacement of the curve shown in Fig. 24 past the 1.0 radius line. As the heat released in the reactor is caused by the fissions, the heat distribution curve across the reactor will be similar in shape to the neutron density distribution curve. The neutron density curve across reactors of other shapes is also substantially a cosine curve.

Figure 22:
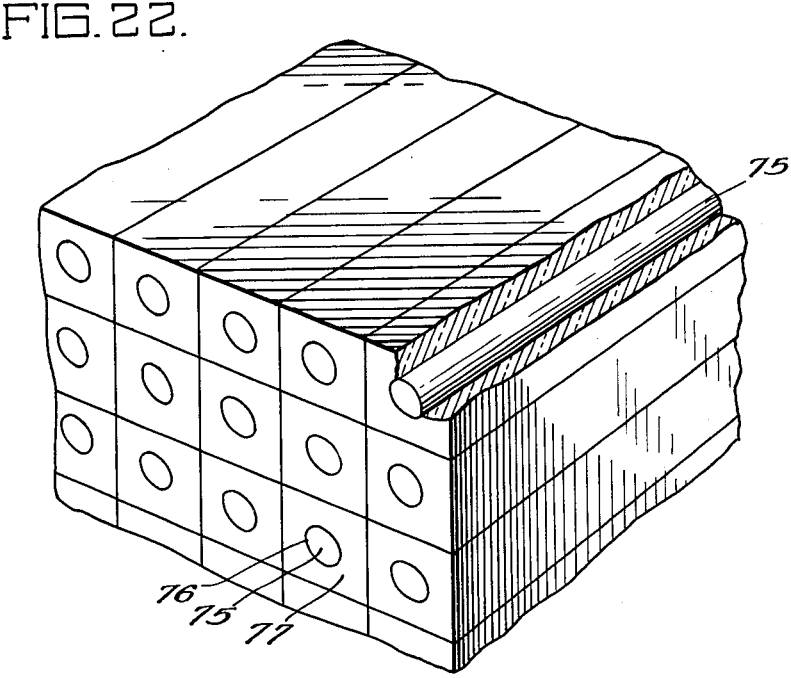
Fig. 22 is an enlarged, fragmentary, perspective view of a modified active portion in which the overall shape is in the form of a cube or parallelepiped and the uranium is arranged horizontally in cylinders or rods.
Figure 23:
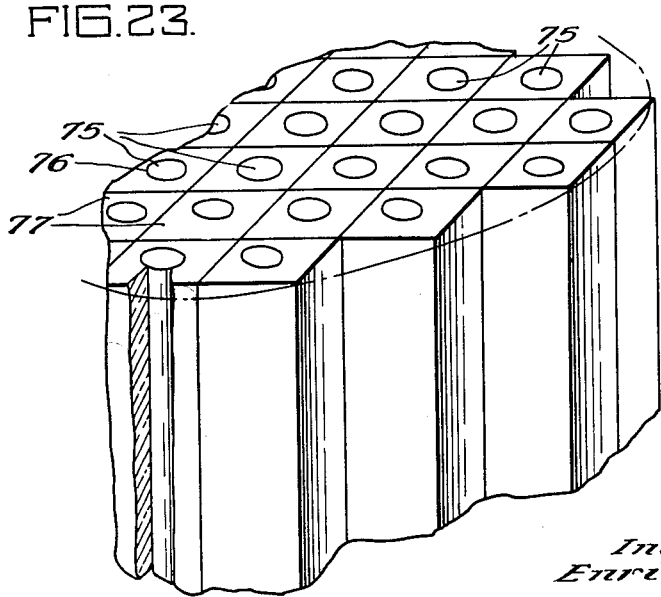
Fig. 23 is a second modification of the active portion of the system wherein the overall shape is cylindrical and the uranium is disposed vertically in the form of cylinders or rods.

Reactors of the above types can also be built with rod geometry as shown in Figs. 22 and 23. In Fig. 22 uranium rods 75 are horizontally positioned in bores 76 in live graphite blocks 77 and piled side by side to make for example, a cubical active portion. Similarly as drawn in Fig. 23 the uranium rods 75 and the live graphite blocks 77 can be stacked vertically to form a cylindrical active portion. Either shape of active portion can be used in either of the geometries.

A description of a liquid moderated reactor with the uranium in the form of rods vertically positioned will next be taken up.

AN ILLUSTRATIVE NEUTRONIC REACTOR HAVING A LIQUID MODERATOR

Figure 25:
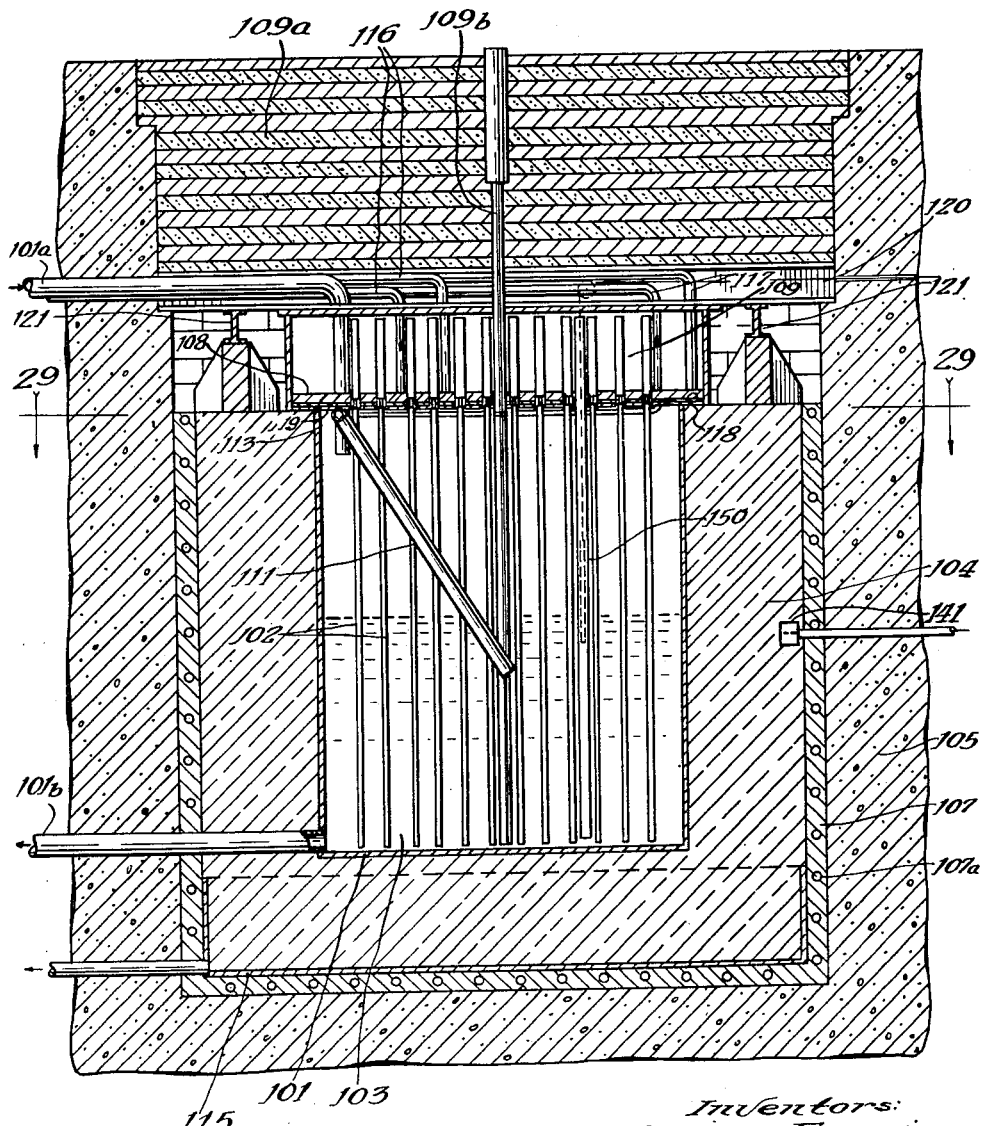
Fig. 25 is a vertical sectional view of a neutronic reactor employing deuterium oxide as the moderator.

A chain reaction can also be maintained in a uranium-$D_2O$ reactor as shown herein, certain details of which are more fully described and claimed in the U. S. Patent No. 2,714,577 to Fermi and Zinn. Referring first to Fig. 25 of the drawings, numeral 101 denotes a neutronic reactor tank or container of cylindrical shape and of a material that is relatively non-corrosive at low temperatures and that is relatively non-absorbent with respect to neutrons, such as, for example, aluminum or stainless steel. A suitable size of such tank for a self-sustaining chain reaction when $D_2O$ is used as a moderator is one that is 6 feet in diameter and 7 feet 4 inches high, although other sizes may be used as well. Suspended in tank 101 are 136 rods 102 of uranium metal 1.1 inches diameter sheathed by aluminum about .035 inch thick, to prevent extreme radioactivity and contamination of the $D_2O$ moderator by fission products emanating from the uranium. Such coating also prevents corrosion of the uranium by the heavy water. Rods 102, that will be described in detail hereinafter, extend to about ¼ inch of the tank bottom. Sufficient deuterium oxide is introduced into tank 101 to obtain a volume of uranium and heavy water slightly over the critical size. Such critical size may be predicted well in advance of attainment thereof. This is done by taking measurements of the neutron density, preferably adjacent to the perimeter of the tank, for example, in the reflector 104 described hereinafter, as the tank is being filled, and by plotting, for instance, the reciprocals of such neutron densities as ordinates against some measure of the overall size of the filled portion of the tank (e. g., the volume of $D_2O$) as abscissas, as the size is being increased by raising the level of heavy water in the tank in a manner similar to that described for the construction of the uranium-graphite reactor. This will give a curve that, when extrapolated, will indicate or forecast the critical size at the point where the curve crosses the axis of abscissae. When the critical size has been exceeded a self-sustaining nuclear reaction is initiated as described hereinbefore. In the reactor described, the critical size was obtained when the tank 101 was filled to a $D_2O$ level of 122.4 centimeters from the bottom, and an operating size giving a neutron density doubling time of 37.6 seconds was obtained at a $D_2O$ level of 123.1 centimeters. At a level of 124.7 the doubling time was 6.52 seconds.

Immediately surrounding tank 101 is a neutron reflector 104 of graphite, for example, having substantially a cup shape. Reflector 104 and tank 101, together with its contents, are referred to as the neutronic reactor. The moderator, together with the uranium immersed in the moderator, constitutes what may be termed the active portion of the reactor. The thickness of the reflector may be of the order of two or three feet or more depending on the size of the active portion and the degree of neutron scattering required. By using this peripheral layer of scattering or reflecting material, the overall size of the active portion of the reactor may be made somewhat smaller than in a case where no scattering layer is employed, since neutron losses to the exterior are effectively reduced. Tank 101 and its contents may be built slightly below the diameter that would be required without a reflector so that the addition of reflector 104 with its neutron reflecting action will convert the reactor from one that is not self-sustaining to one that is self-sustaining.

A concrete shield 105 surrounds the graphite reflector 104 and serves to prevent neutrons and gamma radiations from escaping to the outside of the structure. The carbon in reflector 104, being a relatively light element, absorbs gamma rays only to a relatively small extent. The concrete shield may be of the order of 5 or 10 feet in thickness. The water of crystallization in the concrete absorbs escaping neutrons.

Generally speaking, the higher the atomic weight of an element, the better it serves as a shield to prevent escape of penetrating radiations, such as gamma radiations. Lead, therefore, is an excellent material for a shield for certain purposes while water of the same thickness is only fair. However, thick water shields are sometimes convenient and satisfactory, as will be shown later. Interposed between the concrete shield 105 and graphite reflector 104 is a cooled metal shield 107, preferably of a lead-cadmium alloy, having cooling tubes 107a passing therethrough, through which light water, that is, ordinary water, or other coolant may be circulated. Shield 107 is especially adapted not only to cool the outside of the neutronic reactor but to minimize the escape of gamma and other penetrating radiations. A suitable thickness may be 4 inches or more.

A cover plate 108, for example, of stainless steel, is provided at the top of tank 101 and serves as a thermal shield as well as a support for rods 102 and for control and safety rods pivotally mounted thereunder, as will be described later. Above the cover plate 108 is a space 109 into which the upper ends of rods 102 project, and through which piping can be conducted. Above space 109 is a shield 109a having alternate layers of iron and Masonite (compressed wood fiber) for preventing the escape of neutrons, gamma rays, and other penetrating radiations from the top of tank 101 to the outside.

A tube or well 109b of any suitable diameter, for example 4 inches, extends through shields 109a, space 109, and plate 108 into the tank 101, preferably axially of the tank. Objects may be introduced from the exterior through the tube and into the center of the tank so that they may be bombarded by high intensity neutron radiations for the production of radioactive isotopes or for other purposes desired. Aluminum is suitable for tube 109b.

A pan 115 of stainless steel or other suitable material is located at the bottom of reflector 104 for collecting any heavy water that may leak from tank 101, inasmuch as heavy water, at present, is relatively expensive. The collected heavy water is drained as indicated by the arrow.

Helium at substantially atmospheric pressure is introduced through pipes 116 into the top of reactor tank 101, that is, above the level of the heavy water, and thence is circulated to the exterior of the tank 101 through pipes 117. As the result of high neutron densities and heat developed during the operation of the chain reaction in tank 101 some of the deuterium oxide will decompose into $D_2$ and $O_2$. These uncombined gases will collect at the top of tank 101. In order to remove such uncombined gases, recombine and recondense them without explosive effect, a gas circulating system of any well-known type (not shown) may be used for circulating the helium together with the uncombined gases into a recombiner of any well-known type (not shown) such as a hot grid or platinum-charcoal catalyst, or both, for effecting recombination of the $D_2$ and $O_2$ into heavy water, and for returning the condensed $D_2O$ into tank 101. Helium may be circulated, for example, at the rate of 3 cubic feet per minute. A suitable ratio of $D_2$ to helium may be 1 to 150 although other dilutions may be used instead.

Space 109 also carries $D_2O$ inlet pipe 101a by which $D_2O$ can be supplied to the top of reactor tank 101. Outlet pipe 101b is positioned at the bottom of tank 101. If desired, the $D_2O$ can be circulated through external heat exchangers through pipes 101a and 101b to cool the moderator and thereby cool rods 102.

Immediately below coverplate 108 there is provided a cadmium sheet 118 to act as a shield for minimizing the escape of slow neutrons. Immediately below cadmium sheet 118 there is provided an aluminum sheet 119 which is useful primarily to prevent electrolytic action between otherwise dissimilar metals (cadmium and aluminum) in the interior of tank 101.

Shield 109a is supported by two pairs of crossed I beams 120 and 121. Both pairs of I beams have their extremities supported by the concrete shield 105.

Referring to Fig. 26 numeral 102 denotes one of the composite uranium containing rods that is suspended in the deuterium oxide moderator as shown in Fig. 25. Rod 102 comprises a cylindrical rod of uranium or uranium containing material 122 6 feet long that is screw-threaded into a supporting rod 123 of non-fissionable material such as, for example, aluminum. A thin tubing of aluminum 124 is drawn on to the outer surface of uranium rod 122 and supporting rod 123 by any well-known drawing process by screwing on an attachment 137 (see Fig. 28) that is subsequently removed. Thereafter, the joints formed at the top of supporting member 123 and at the bottom of rod 122 are welded so as to form an airtight seal in tubing 124, thus protecting the uranium rod 122 from the effects of the $D_2O$. A narrow longitudinal groove 122a is provided between the connected elements 122—123 and tubing 124. An axial groove 125 and communicating radial groove 125a are provided at the top of supporting rod 123 that communicates with space 122a thereby making it possible to evacuate the air space and thereby test for possible leaks in the top and bottom welded joints in tubing 124 by noting the pressure change interiorly of the air space after a predetermined evacuation.

A ball valve 126 is provided to seal the space 122a from the atmosphere. A set screw 127 is screwed downwardly of supporting rod 123 so as to firmly seat the ball valve 126. A shank 131 is provided and supporting member 123 are screw-threaded thereto. An upwardly extending aluminum sleeve 134 is screwed to shank 131 and closed by an upper flanged member 133. A lead rod 132 is positioned between the lower shank 131 and upper flanged member 133 for the purpose of reducing gamma ray escape axially of rods 102. The flanges of member 133 are supported on the top of a tube 135 screwed to cover plate 108. Flanged member 133 is provided with an internal thread 133a by which the rod assembly can be attached to a lifting crane, for example, for installation and removal.

Fig. 27 shows an alternate form of seal which may be used in place of the ball valve 126 shown in Fig. 26. The seal comprises a stud 126a screw-threaded into bore 125a in supporting member 123. A compression gasket or sealing ring 136 of lead, for example, is then provided between elements 123 and 131 so that as the latter-mentioned elements are screw-threaded together, gasket 136 is compressed thereby forming an airtight seal between supporting rod 123 and shank 131.

The neutron chain reaction may be prevented merely by immersing into the heavy water one or more rods, such as hollow rods 111 and 112 (Fig. 25 and Fig. 29), 4 inches in diameter, containing a $\frac{1}{16}$ inch layer of cadmium sandwiched between aluminum walls, and pivotally supported by the cover plate 108. Rod 111, for example, may be operated as a control or regulating rod, being immersed to greater or less extent in the body of heavy water, as desired. Rod 112 may be considered as a safety rod which normally is held out of contact with the body of heavy water in tank 101 and is immersed into the heavy water only for emergency purposes, that is, when control rod 111 per se, is insufficient for immediate stoppage of the chain reaction. Rod 111 may be pivotally mounted and rigidly secured to a shaft 113, extending through the tank 101 through sealed bearings 140. A method of automatic control is to make rotation of shaft 113 responsive to the neutron density at a peripheral portion of reflector 104, for example, as indicated by ionization chambers such as chamber 141 having suitable amplifiers (not shown) so as to be effective to control the neutron density of the reactor and keep it substantially constant. Such means of automatic control, however, forms no part of the present invention when manual control is used the response of ionization chamber 141 is used to monitor reactor power when operating.

In utilizing the output of the reactor, well 109b plays an important role. It extends through the center of the reactor where the highest neutron density exists, and intense neutron bombardment of materials inserted into this well will take place, even at relatively low reactor powers.

From the above description it will be seen that U–D₂O reactors are, in general, smaller than U-graphite reactors. This means that both the neutron leakage and the central neutron density are higher than in U-graphite reactors for a given total power output. Such a reactor as just described has been operated continuously at 250 kilowatts when filled to higher levels and properly shimmed by shim rod 150 to compensate for operational poisoning, later discussed.

NEUTRONIC REACTORS WITH OTHER MODERATORS

While we have illustrated our invention as including moderators of graphite and D₂O, other moderators can also be used. Beryllium, for example, either as metal or oxide, can also be used. When Be or BeO is used, the constructional details can be substantially as described, for example, for the uranium-graphite reactor, using the moderator in the form of bricks.

The following table sets forth constants for representative beryllium-uranium reactors, as presently known.

[Be metal density 1.85 gm./cm.³]

|  | U Sphere | U Rod | U Slab |
| --- | --- | --- | --- |
| Radius of uranium bodies | 5.0 cm | 3.5 cm | 1.5 cm. (thickness). |
| Critical cylinder | 168 x 309.1 cm. | 165.7 x 304.9 cm. | 179 x 343.8 cm. |
| Amount Be | 51.5 tons | 48.9 tons | 63.7 tons. |
| Amount U | 43.9 tons | 47.3 tons | 69.2 tons. |
| K constant | 1.0968 | 1.0982 | 1.0842. |

[Be oxide density 2 gms./cm.³]

|  | U Sphere | U Rod |
| --- | --- | --- |
| Radius of uranium bodies | 3.0 cm | 1.5 cm. |
| Critical cylinder | 194.2 x 358 cm | 199.3 x 368 cm. |
| Amount BeO | 134 tons | 145 tons. |
| Amount U (tons) | 40.4 | 35.8. |
| K | 1.0670 | 1.0628. |

With an efficient reflector, critical amounts of Be and U can be reduced a few percent.

Sphere and rod geometry as shown herein can be used with light water to give K factors around unity even with natural uranium. For example, a K constant of slightly over 1 has been obtained by the use of uranium rods of 1.5 centimeters diameter placed parallel in light water with a volume ratio of water to U metal of 1.65. Diphenyl can also be used as a moderator and closely resembles light water giving a gain of from .2 to .4 percent in K. With either, a slight enrichment of the uranium with one of the fissionable isotopes such as, for example $U^{233}$, $U^{235}$, $94^{239}$ will provide a K sufficiently greater than unity, to enable the construction of operating reactors.

However, the water or diphenyl lattice can also be used as part of a reactor, with for example a seed, or portion having a higher K, in the center of the reactor so that the average K will be sufficiently above unity to provide a reactor of practical size. A heavy water lattice, for example, can be made to provide the higher K factor for the center of the composite device and the average K, and hence the critical size computed as set forth elsewhere herein. Water lattices are also useful as reflectors around other reactors, and as neutron reproduction takes place therein, they are very efficient.

REDUCTION OF LOSSES DUE TO RESONANCE CAPTURE

Having described several specific embodiments of operative reactors, limit curves for theoretically pure natural uranium metal spheres and rods and oxide spheres and rods will next be described as shown in Figs. 2, 3, 4, 5 and 6, respectively, when used in various moderators.

The shapes and extents of the curves are based on the fact that K is proportional to the product of three factors: $p$, $f$ and $\epsilon$ where $p$ is the probability of a fast fission neutron escaping resonance capture and becoming a thermal neutron; $f$ is the fraction of the thermal neutrons absorbed by uranium (both by simple capture and to produce fisssion) rather than by the carbon; and $\epsilon$ is the factor by which the number of neutrons is increased because of the additional neutrons due to fission produced by the fast fission neutrons before leaving the lump of uranium. Each of these factors may be computed separately by methods known to physicists, using experimentally determined constants appropriate to these phenomena. The proportionality factor required to obtain the values of K for these curves from the product of these three factors however has been determined from the measured values of K in certain actual measurements of lattice arrangements, such as, for example, the results obtained by the measurement of pile structures too small to support a self-sustaining chain reaction, as set forth herein and in the Fermi application referred to previously, together with results obtained by measurements made in operating reactors. The K values are therefore accurate within the limits of error of this type of measurement. However, if structures are built well within the limits of the curves shown, using materials giving favorable danger sums and the proper critical sizes, a self-sustaining chain reacting system will result.

Though K contour lines for natural uranium metal spheres, uranium oxide (UO₂) spheres, U metal and UO₂ cylindrical rods only have been shown for graphite moderators and U metal rods for a heavy water moderator, it is to be realized that similar curves can be made for other geometrical shapes of the uranium bodies and for other uranium compounds with proper allowance for the nature of the compound, the uranium content, bulk density and neutron absorption of the moderator.

The highest values for the reproduction factor K are obtained where both the neutron resonance absorption in the uranium and the neutron absorption in the moderator are about equal. As the uranium bodies are enlarged, for any given volume ratio, surface resonance absorption will decrease but moderator absorption will increase. The increase in moderator absorption in this case is due to the fact that the larger the uranium bodies are, for any given volume ratio, the greater will be the distance between the bodies. The neutrons reduced to thermal energies will then have to diffuse in the moderator over a longer path, thus increasing the probability of capture by the moderator before entering the uranium. Likewise, as the size of the uranium bodies is decreased, uranium resonance absorption increases, and in fact, increase faster than the decrease of moderator absorption. Consequently, with all other factors remaining constant, as the size of the uranium bodies and the ratio of the volumes of graphite to uranium depart from the optimum, the reproduction constant K will decrease in value.

Figure 2:
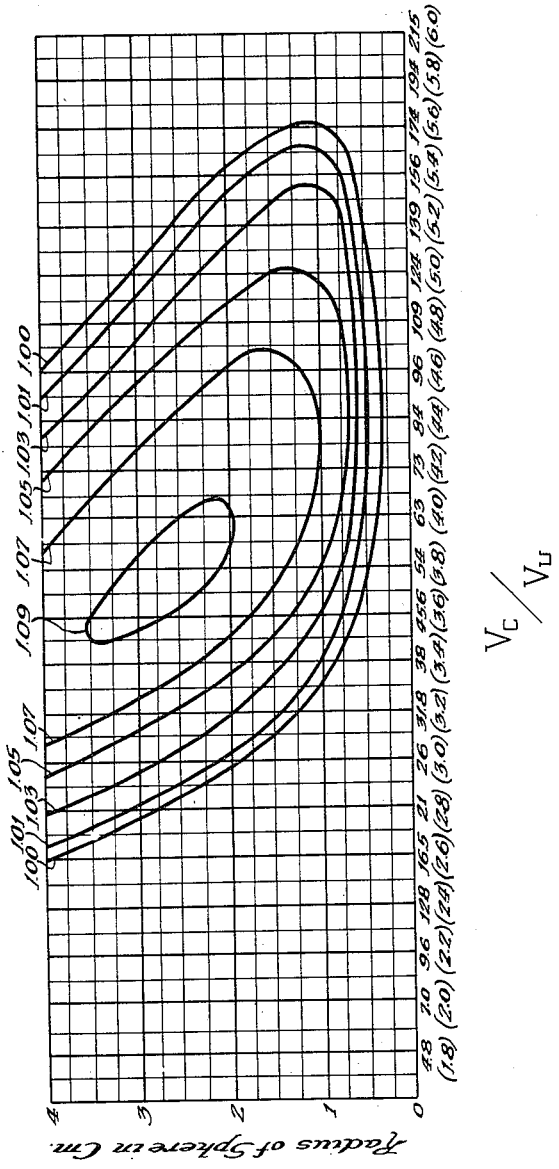
Fig. 2 is a graph on which are plotted contour lines representing various reproduction constants K for systems employing uranium metal spheres and graphite.
Figure 3:
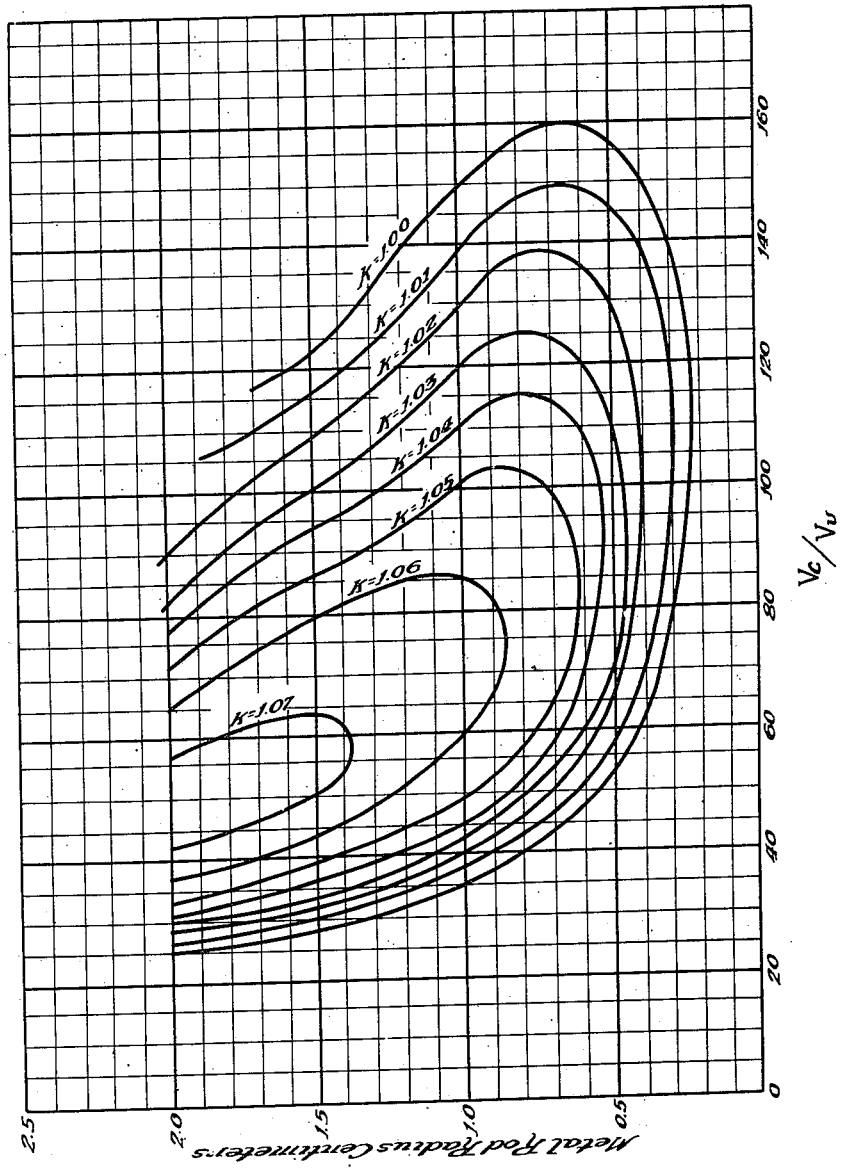
Fig. 3 is a graph similar to that of Fig. 2 for cylindrical rods of uranium metal.
Figure 4:
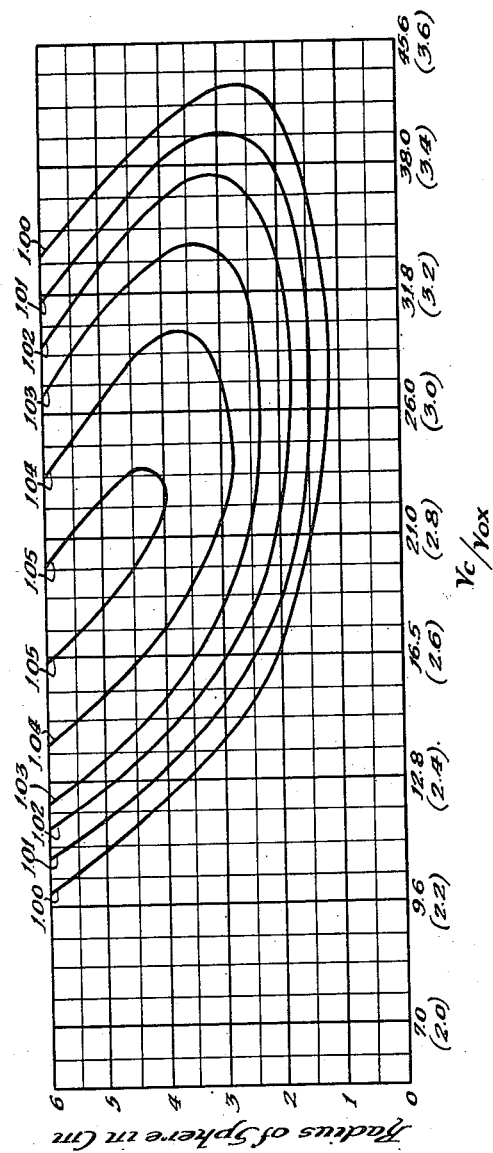
Fig. 4 is a graph on which are plotted contour lines representing various values for the reproduction constants K for a uranium oxide ($UO_2$)-graphite system wherein the oxide is in the form of spheres.
Figure 5:
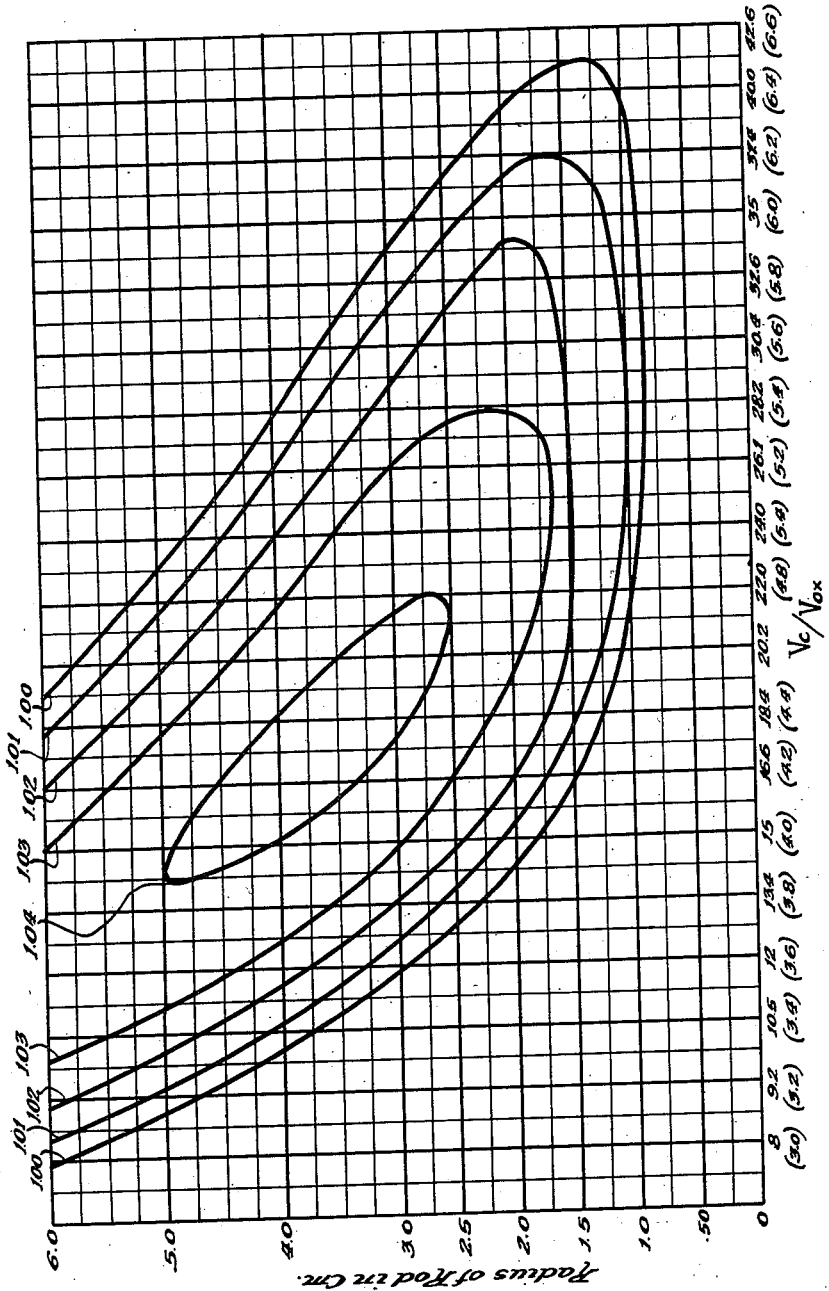
Fig. 5 is a graph on which are plotted contour lines representing various reproduction constants K for systems employing uranium oxide ($UO_2$) and graphite wherein the oxide is in the form of cylindrical rods.

In Fig. 2 contour lines have been plotted for theoretically pure spherical uranium metal of density at least about 18 gms./cm.³, imbedded in graphite. In Fig. 4 contour lines have been plotted for spherical lumps of UO₂ of density 6 gms./cm.³ imbedded in graphite. In Figs. 3 and 5, K contour lines have been plotted for cylindrical rods of metallic uranium, and rods of uranium oxide (UO₂) of density 6 gms./cm.³, respectively, extending through the reactor. Along the ordinates of the graphs are plotted the radii of the spheres or rods. Along the abscissae of Figs. 2 and 3 are plotted volume ratios of graphite to uranium. Beneath the volume ratio numerals are numerals in the parentheses representing the linear divisions of the graph in terms of the cube roots of the ratios of the total volume of the graphite and the uranium to the volume of the uranium. These parenthetical values represent the ratio of the radius of the unit cell to that of the uranium body, both the unit cell (carbon and uranium) and the uranium being considered as spheres. The values not in parentheses give the volume ratio of carbon to uranium for the cell and for the structure, as the lattice is a mere repetition of cells.

In Figs. 3 and 5 the unit cell is expressed in cylindrical terms, and along the abscissae are plotted volume ratios. In Fig. 5 the parenthetical numerals represent the ratio of the radius of the unit cell (carbon and uranium) and the uranium, both being considered as cylinders.

Referring first to Fig. 2, it can be seen that if the radii of the metallic uranium spheres are less than about 0.3 centimeter, the value of hte reproduction constant K is less than unity for all volume ratios, so that for sphere sizes of natural uranium metal much less than this value it would be impossible to build a self-sustaining chain reacting system irrespective of the overall size of the structure. For spheres of greater size than 0.3 centimeter, it is possible to obtain values for the reproduction factor K greater than unity, providing the ratio between graphite volume and the volume of the uranium is within certain limits as shown on the graph. From a consideration of Fig. 3 it will be apparent that the limiting radius may be somewhat smaller where the uranium metal aggregates are rod-like in shape and as shown, a K of unity may be secured when the radius of the rods is as low as about 0.25 centimeter. The innermost closed contour shown in Fig. 2 represents a value for the reproduction constant K of about 1.09. At approximately the center of this contour the highest possible reproduction factor K of about 1.10 would be found. This highest value is for optimum conditions with theoretically pure spherical uranium lumps of about 2.75 centimeters in radius, and a volume ratio of about 54 carbon to 1 uranium. Similarly in Fig. 4 it will be seen that if the radii of the uranium oxide spheres are less than about 1.2 centimeters no chain reaction will take place with any volume ratio or size. For oxide spheres of greater than 1.2 centimeters radius, K factors greater than unity are possible within wide limits of volume ratio, with the optimum K of about 1.06 at the center of the innermost contour line obtained by using oxide spheres of about 5.75 centimeters radius and a volume ratio of 18.7 carbon to 1 uranium.

As shown in Fig. 5, the minimum oxide rod radius for K greater than unity is about .75 centimeter. The optimum K factor of over 1.04 is obtained within the innermost contour at around 3.75 centimeters radius, and with a volume ratio of about 17.5 carbon to 1 uranium. It will thus be seen that while rod geometry gives somewhat smaller values of K than sphere geometry, the neutron saving due to aggregation is still large enough to provide a self-sustaining chain reaction in a system of practical size even when uranium oxide is used.

While the optimum conditions are found in a system of lumped uranium and graphite when uranium metal spheres are used, it will be obvious that in many cases other shapes of uranium bodies, such as rods will be preferable. For example, if $94^{239}$ and various fission products are to be recovered from the uranium after operation, any large numbers of spheres or short cylinders are not easily removed without tearing down the reactor. The metal or oxide bodies from the removable reactor stringers described as extending through the reactor can be removed, but such procedure will only remove a small portion of the total material. Rods, or rods made up of short slugs in end to end relation, however, are easily removed, leaving the moderator undisturbed, as will be shown later.

Rod geometry also assumes practical importance when reactors of large power output are built, as rods lend themselves readily to incorporation in fluid heat absorbing systems, as will be taken up in conjunction with methods of cooling the reactors.

Figure 6:
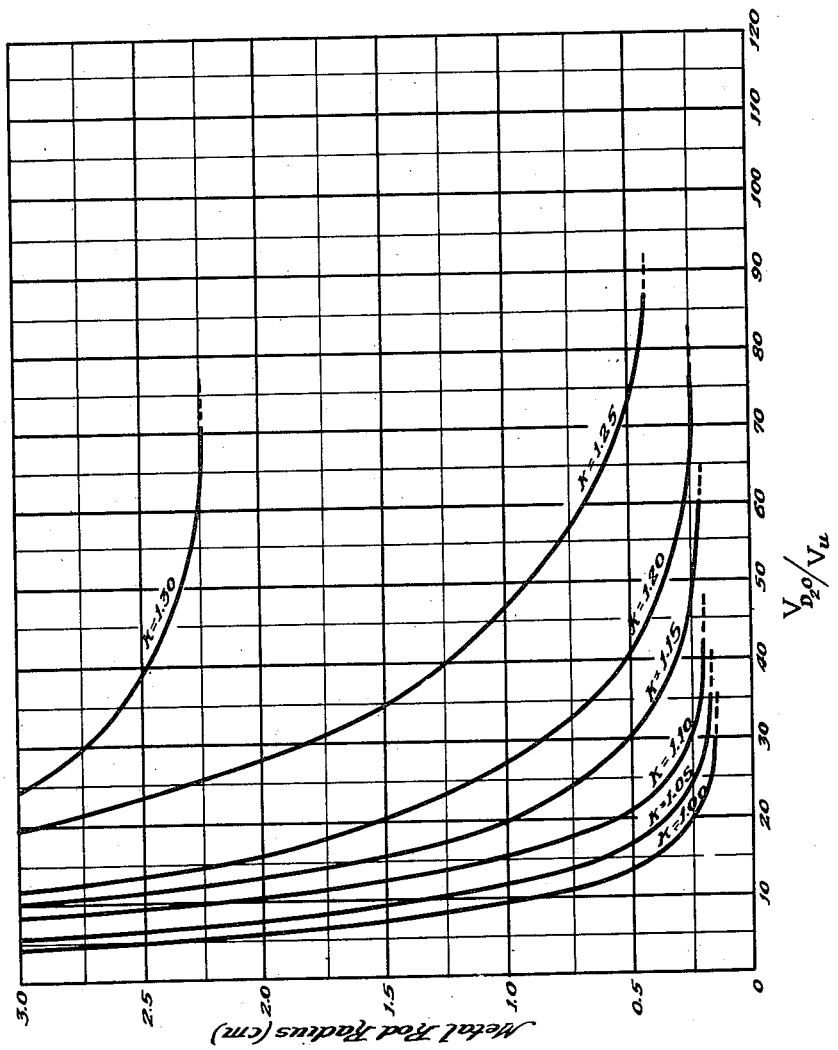
Fig. 6 is a graph showing K contour lines for uranium metal rods immersed in $D_2O$.

K curves for uranium metal rods in a $D_2O$ moderator have also been made and are shown in Fig. 6, where the ordinates are given as rod radii and the abscissae as volume ratios of $D_2O$ to U. It will be noted that the curves resemble the graphite curves, except that K constants are higher and only the lower volume ratios are shown. These are the volume ratios where the amount of element 94 produced will be the greatest and where the relative amount of $D_2O$ will be the smallest, as $D_2O$ is presently more expensive than uranium. The curves clearly indicate that optimum K constants of about 1.3 can be obtained with rods of about 2.25 to 2.5 centimeters radius immersed in $D_2O$ at volume ratios of from 40 to 80 $D_2O$ to 1 uranium. The ability to obtain such high K factors by properly aggregating the uranium in $D_2O$, together with the favorable ratio of scattering cross section to absorption cross section, and with $M^2$ being considerably less than that of carbon, leads to an operating reactor considerably smaller than can be obtained with graphite or beryllium. In addition the range of volume ratios at which K factors will be greater than unity is very wide, and the upper limits of the curves are not presently well-known. However, for optimum and near optimum geometries at the lower volume ratios the curves shown are sufficiently accurate for use in designing practical $D_2O$ reactors, such as that described herein in detail.

It can be observed from Figs. 2, 3, 4, 5 and 6 that for a given size of the uranium lumps, either spheres or rods, the value of K will diminish from the maximum, representing optimum conditions, as the volume ratio either increases of decreases. The same effect is produced by increasing or decreasing the size of the uranium bodies from that representing optimum conditions. It is evident, therefore, that for every value of K there is a range of uranium body sizes and volume ratios which can be selected as desired. From the standpoint of economics, the more costly material, when it is uranium, can be saved by selecting the uranium body size and volume ratio at the most extreme righthand position on the contour line representing the K factor required for the system. This saving in proportion of uranium may counterbalance in cost, the increased overall size required.

On the other hand, if one desires to obtain the greatest possible yield of $94^{239}$ or to reduce the amount of moderator when $D_2O$ is used, rather than reduce the initial cost of the uranium, one should select a point near the lefthand extreme of the contour in question, and furthermore should choose the lowest value of K consistent with purity of available materials and limitations on the overall size of the structure. The geometry of the system desired, therefore, can be selected in accordance with the desired balance of economic and engineering factors.

The curves shown in Figs. 2, 3, 4 and 5 have only been carried upwardly to 4 centimeters spheres of metal, 6 centimeters spheres of oxide, 2 centimeters for U metal rods, and 6 centimeters radius for oxide rods. It is only in the regions shown that economical structures can be built with natural uranium because the proportion of uranium required for the same reproduction factor becomes inordinately large as the size of the lumps increases, and cooling difficulties are introduced by using large uranium bodies. However, even using much larger bodies of uranium than those set forth in the curves, the chain reaction will take place with K greater than unity within the areas enclosed by extrapolations of the curves as shown, in systems above critical size. We do not, therefore, desire to be limited to the preferred region shown on the curves where only conditions surrounding and including the optimum as set forth.

It is obvious, from the description given above, that aggregation of the uranium also makes it possible to increase K values obtained when natural uranium is enriched by addition thereof of fissionable material such as $U^{233}$, $U^{235}$, or $94^{239}$. Enrichment and the use of more efficient slowing media provide a greater number of neutrons per cycle, and thus increase K over the values obtained for given geometries and volume ratios using natural uranium and graphite. The increased K constants provided by aggregation in these instances, permit the overall sizes for the systems to be reduced. The shape of the curves shown in Figs. 2, 3, 4, 5 and 6 will not be greatly changed by the use of enriched uranium, but will merely take on a higher value of K in accordance with the neutrons gained for the chain by the enrichment. The $K=1$ curve will then be outside of the curves shown, indicating that enrichment, for example, widens the limits of the volume ratios within which the chain reaction can be sustained, but does not eliminate the need for aggregation of the uranium if maximum K constants are to be obtained.

The curves just described take into account resonance and moderator losses only. To find a true K constant for presently available materials, impurity losses must be taken into account.

REDUCTION OR NEUTRON LOSSES DUE TO IMPURITIES IN THE MATERIALS

Uranium and its compounds can be produced in a condition substantially free from neutron absorbing impurities within the requirements of neutronic reactor operation with various moderators. A composition that is substantially free from neutron absorbing impurities may be said to have a high neutronic purity. It should be noted that neutronic purity has no necessary connection whatever with chemical purity, i. e., a composition having high neutronic purity is one which is substantially free from particular elements having a high danger sum. Such a composition may be far from chemically pure in that it may contain many foreign elements having low danger sums. For example, substantial amounts of oxygen, fluorine, carbon, or beryllium and many others, all of which have low danger coefficients may be present as impurities, and yet the composition still may have high neutronic purity.

In a well-known process of producing uranium oxide from pitch-blende ore, the last step may be a hydrochloric acid leach. This ordinarily produces an almost chemically pure (better than 99.5 percent uranium oxide) but not a neutronically pure uranium composition, as many elements having exceedingly high neutron capture cross sections may still be present in amounts on the order of parts per million. The raw material that is treated as herein described is material which is neither chemically or neutronically pure, but is ordinarily the end product of a uranium recovery process from uranium ore.

Uranium compositions of high neutronic purity, i. e. those having a danger sum in K units of less than .3 and preferably less than 0.01, are suited for use in neutronic reactors. Such compositions can be produced by various purification procedures.

One illustrative procedure involves the steps of forming an ether solution of uranyl nitrate, washing the impurities from the solution with small volumes of water and thereafter recovering the purified uranyl nitrate from which uranium metal or other uranium compositions suitable for use in the neutronic reactor may be prepared.

Neutronically impure uranium oxide may be reacted with nitric acid to obtain a solution containing uranyl nitrate with soluble and insoluble foregin matter. This composition is filtered to obtain a solution of uranyl nitrate and soluble impurities. The solution is heated to boiling to convert the uranyl nitrate to uranyl nitrate hexahydrate, and the water evaporated to obtain a composition consisting essentially of uranyl nitrate hexahydrate and impurities. This composition is then treated with ether to form a solution thereof and the ether solution so obtained is extracted or washed with relatively small quantities of water. In such an extraction procedure the impurities having high neutron absorptive capacity or neutron capture cross section are more readily dissolved in the water than in the ether. Although the uranium compound is also more soluble in water than in ether, the loss of uranium is kept very low by two expedients, namely, by using a quantity of water to extract the impurities small in relation to the amount of ether solution, as for example, from one-half to 5 percent water by volume; and by using as extraction portions water already saturated with uranyl nitrate. The term water extraction as used broadly herein includes the water solutions of uranyl nitrate.

As a result of extraction of the ether solution by successive water portions, a new composition can be produced from the remaining uranyl nitrate having extremely high neutronic purity, although not necessarily of high chemical purity. The remaining purified uranyl nitrate can be recovered in two ways, by evaporation of the ether or by extraction of the uranyl nitrate from the ether solution by pure or substantially pure water which is substantially free from impurities having a high danger sum. The purified uranyl nitrate may then be converted to other uranium compositions suitable for use in a neutronic reactor.

In the large scale production of uranium compositions, it has been found that neutronically pure uranium compositions can be prepared from neutronically impure uranium oxide, for example, by conversion of the oxide to uranyl nitrate hexahydrate, dissolving the uranyl nitrate once in ether, and making several water extractions of the ether solution to remove impurities and then making a water extraction of the ether solution to remove the bulk of the purified uranyl nitrate, or by obtaining the uranium by evaporation of the ether. In such production, generally only one ether solution is required while the number of water extractions may be varied to suit the amount of purification required by the impure oxide. The final water extraction is of substantially pure water to remove the bulk of the uranyl nitrate from the ether. The uranyl nitrate may then be converted to $U_3O_8$, $UO_2$, the tetra or hexafluoride, or to the metal or carbide.

As a preferred method applied for large scale operations, the purification may consist essentially of dissolving the uranium oxide in nitric acid, filtering to remove the insoluble residue, and evaporating the solution in order to crystallize the uranyl nitrate hexahydrate. These crystals are then dissolved in ether to form a saturated solution and the impurities extracted therefrom by permitting several batches of small amounts of saturated aqueous solutions of uranyl nitrate to settle through the ether solution. Following this purification sufficient water of high purity, preferably distilled water, to dissolve the bulk of the purified uranyl nitrate out of the ether solution is added, so as to extract the greater part of the purified uranyl nitrate from the ether. The amount of water required for this purpose is large in comparison to the relatively small portions used for washing and frequently the volume of water exceeds or at least is equal to the volume of ether solution. The ether is then ready for the next charge of uranyl nitrate hexahydrate. The aqueous solution of purified uranyl nitrate is evaporated and the nitrate calcined to the oxide, the nitrous oxide fumes evolved being recovered by appropriate recovery means. In this manner it is not necessary to evaporate the ether to obtain the purified uranyl nitrate.

The efficiency of the ether solution and water extraction process has been shown in a practical manner by applying the process to the treatment of crude uranium oxide derived from ores from three widely geographical sources, namely, Canada, Colorado, and the Belgian Congo. These oxides originally obviously contain widely different impurities. After being subjected to the ether solution process the resultant products are neutronically indistinguishable from each other, and are all of such high neutronic purity so that they can be used in a self-sustaining chain neutron reacting system.

The oxide produced by calcining the purified uranyl nitrate according to the process described above is ordinarily $UO_3$. This may be reduced to $UO_2$ by heating in a furnace in an atmosphere of hydrogen.

The $UO_2$ so produced is sufficiently pure neutronically to be used directly in a self-sustaining neutron reacting system in spite of its high oxygen content. However, the use of such oxide has certain disadvantages in that the effective uranium density is below that of metal. For example, when neutronically pure $UO_2$ is used in a neutron reacting system the critical size is larger than for metal, necessitating the use of larger quantities of uranium and moderator than would be necessary in a neutronic reactor utilizing uranium metal.

It is therefore advantageous to be able to convert the uranium oxide resulting from the purification procedure of the present invention, to massive metal in order that the size of the reactor be reduced, and that the reactor be capable of operating at higher temperatures, as $UO_2$ forms $U_3O_8$ when heated, and $U_3O_8$ is not as efficient as $UO_2$. Uranium carbide, uranium tetrafluoride and uranium hexafluoride will also support a chain reaction when combined with the proper moderator and with appropriate consideration for the changes in bulk density.

It has been found that a convenient method of obtaining neutronically pure uranium metal is by treating the neutronically pure uranium oxide ($UO_2$) with fluorine to convert the oxide to uranium tetrafluoride, without introducing additional impurities other than fluorine. This uranium tetrafluoride, a solid, may then be mixed with finely divided magnesium and placed in a calcium oxide-lined iron bomb where it is subjected to heat. The magnesium reduces the uranium tetrafluoride to uranium metal during an exothermic reaction. This metal collects at the bottom of the bomb, and acquires only neutronically negligible amounts of the magnesium, calcium and oxygen and iron necessarily present during the reaction. Massive billets of neutronically pure uranium can be obtained weighing from 10 to 200 pounds, and these billets can be recast as desired.

In practice it has been found best to recast the massive uranium metal obtained from magnesium reduction, in graphite crucibles in the absence of air. By this recasting a still more complete separation of the uranium metal from any acquired volatile impurities is obtained, as the volatiles boil off during the recasting process. The uranium is thus produced in massive form suitable for use in a chain reacting system, and can be machined or otherwise worked into rods, tubes or other forms that may be desired. By this procedure whatever small quantities of impurities are permanently introduced into the bodies during conversion to metal, are materials having relatively low neutron capture cross sections and accordingly are only those causing a minimum of difficulty in the neutron reacting system.

In order to determine the efficiency of the purifying process and to determine whether a sufficient number of water extractions of the ether solution have been made, it is desirable to have a practical means of determining the neutronic purity of the resulting composition. The method of chemical analysis for various neutron absorbing elements remaining in the product other than the H, N, and O of the solution, in combination with calculation of the K reduction described above for the elements found, can be used, but has practical limitations which make it inconvenient and tedious, as uranium is extremely active chemically and contains many elements in various forms.

The exponential pile described above is one of the best ways to test uranium compositions in terms of purity. Using the same geometry in the exponential pile and the same moderator, or another moderator the characteristics of which are known, the uranium compositions can be substituted one for another and the efficiency thereof determined directly in terms of K. Such a test is particularly valuable after a uranium composition has been determined by simpler procedures to be suitable for use in a neutronic reactor. This test also gives the effect of decreased uranium density when uranium compositions are used.

A somewhat simpler test for neutronic purity is a so-called shot gun test. In this test a thin neutron detector, e. g., a piece of indium foil placed near a neutron source inside a block of paraffin, is made radioactive by an amount proportional to the density of thermal neutrons absorbed thereby. This radio-activity can be measured. A neutron absorbing pellet, such as a standard amount of boron, placed close to the detector foil, decreases the thermal neutron density in the neighborhood of the foil and lowers the induced radioactivity of the detector foil. By replacing the standard boron absorbing pellet, with a corresponding pellet containing the impurities removed from a known amount of uranium composition to be tested by a super-extraction procedure, and again measuring the radioactivity of the neutron detector, a direct comparison is obtained between the absorption caused by the unknown composition and the standard boron absorber. From this comparison the danger sum of the impurities in the uranium composition can be calculated in terms of boron equivalent. From the danger coefficient of boron the K reduction can be calculated.

In order to use the shotgun test so as to determine the efficiency of the ether purification process, a practical procedure is to take a representative sample of material having, for example, 10 kilograms of uranium content after normal ether-water purification. The sample is submitted to an additional extremely exhaustive ether solution purification on a laboratory scale. In this way, practically all of the impurities left in the uranium composition to be tested can be removed and incorporated into the pellet to be tested.

The results of the shot gun test are usually reported as per cent absorption which is equal to $$\frac{\text{Absorption of impurities in pellet expressed in equivalent milligrams of boron}}{\text{Absorption of 10 kilograms of uranium expressed in equivalent milligrams of boron}} \quad (14)$$

The absorption of 10 kilograms of uranium in terms of boron can be readily calculated from the danger coefficients given above as equal to 4,560 milligrams of boron. Thus, by measuring the absorption by impurities in the pellet, and expressing the results in terms of equivalent boron absorption, a close approximation of the decrease in K for the impurities found can be computed.

Therefore, as a close approximation, absorption ratio from shotgun test=change in K.

Following are exhaustive analyses of residual impurities in metallic uranium produced and tested by the above outlined procedure, starting with $UO_2$ neutronically purified by the above-described process, for impurities having higher absorption cross sections.

| Impurity | Average Amount, Parts Per Million | Danger Product (K units) |
|---|---|---|
| Ag | <1 | <0.000023 |
| B | 0.5 | 0.001075 |
| Ca | Trace | 0.000050 |
| Cd | 0.86 | 0.000877 |
| Cl | <20 | <0.000640 |
| Co | 21 | 0.000370 |
| Cu | 3.5 | 0.000909 |
| Fe | 50 | 0.000080 |
| H | 50 | 0.000600 |
| Mg | <50 | <0.000025 |
| Mn | <200 | <0.001340 |
| Na | <50 | <0.000050 |
| N | 30 | 0.000120 |
| Ni | 0.8 | 0.000003 |
| Si | 55 | 0.000040 |
| Total | | 0.003–0.0053 K units |

This result shows that when proper precautions are taken to avoid contamination of neutronically pure uranium oxide by introduction of neutron absorbing materials during conversion to metal, the neutronic advantages of the original ether solution purification process are carried over into the uranium metal. As a result of obtaining such high neutronic purity of uranium metal, combined with the reduction of resonance losses by aggregation of the uranium and by using suitable moderators, it has been possible to construct neutronic chain reacting systems of practical size.

From the above discussion it will be seen that the extreme importance of certain "dangerous" impurities in uranium compositions has been recognized and controlled by proper purification of raw materials and care to avoid contamination during manufacture. These precautions have led to final products of an unusual degree of overall purity.

However, on a weight basis, for example, roughly ten times as much moderator as uranium is used in neutronic reactors such as the uranium-graphite reactor (with reflector), for example. Consequently, the relative effect of the impurities is increased by approximately this weighting factor. The following table gives the result of an analysis of one batch of graphite for the most important impurities therein, the danger coefficients being weighted by the factor of 10.

| Material | Dangerous Impurity | Average Amt., p. p. m. | Weighted Danger Coefficient | loss in K units |
|---|---|---|---|---|
| Graphite | B | 0.55 | 21,500 | .0118 |
| | V | 64 | 50 | .0032 |
| | Ti | 19 | 47 | .0009 |
| | Fe | 45 | 16 | .0007 |
| | Ca | 207 | 5 | .0010 |
| Total | | | | .0176 |

Graphite for use in neutronic reactors is produced by impregnating calcined petroleum coke with pitch and then graphetizing under heat. Several pitch impregnations may be made to increase density of the graphite. However, as petroleum coke and pitch are not readily subject to chemical purification, it is important that such raw materials be chosen with great care as to their impurity content, particularly as to boron and vanadium. The impurity reduction in K for graphite can be limited to from .01 to .015 by careful selection of the raw materials entering into the manufacture of graphite for use in neutronic reactors.

Impurities in $D_2O$ are easier to control. $D_2O$ is produced in quantity with a purity of about 99.8 percent, the main impurity being light water. This small amount of light water does not affect the efficiency of moderation and with some small changes in geometry of the lattice, 95 percent $D_2O$, 5 percent $H_2O$ can be used satisfactorily. However, the main effort in manufacturing $D_2O$ is in the early states of concentration, and no significant saving in cost can be made by stopping at 95 percent purity with respect to $H_2O$. Other impurities in $D_2O$ are small to start with and are relatively unimportant. They come mostly from containers in which the $D_2O$ is handled, and with care such contamination is minimized. Contamination during use due to corrosion of tank walls, uranium rod sheaths, etc., can be removed by distillation of the $D_2O$ if it is found that such impurities are impairing the operation of the reactor. Be and BeO are susceptible to chemical purification.

In any moderator, neutron bombardment during use in a reactor tends to purify the moderator. For example, boron, an element having a high capture cross section is converted to lithium by neutron capture and subsequent alpha emission, and lithium has a much smaller capture cross section than boron. In $D_2O$, light water contamination is reduced by conversion of the light water to heavy water by neutron capture. Thus moderators improve with use, if not re-contaminated.

The introduction of losses due to neutron absorbing materials formed in the uranium during operation at high neutron densities will be later discussed.

EFFECT OF A COOLING SYSTEM IN A NEUTRONIC REACTOR

Reactors conductively cooled by dissipation of the heat of the reaction through the exterior of the structures can only be operated at low powers continuously or at high powers for short periods, for otherwise heat will accumulate in the reactor. In some instances continuous operation at high power outputs is desirable. Under these circumstances, a coolant can be circulated through the reactor provided proper precautions are taken to maintain the proper neutronic conditions therein.

The sources of heat generated in a uranium-graphite reactor, for example, can be summarized as follows, all figures being approximate:

1. Summary by type

| | M. e. v./fission | Percent |
|---|---|---|
| Gamma Radiation | 23 | 11 |
| Beta Radiation | 11 | 6 |
| Kinetic Energy of Fission fragments | 159 | 79 |
| Kinetic Energy of neutrons | 7 | 4 |
| | 200 | 100 |

2. Summary by locale where heat is generated

| | M. e. v./fission | Percent |
|---|---|---|
| In uranium | 184 | 92 |
| In Carbon | 12 | 6 |
| Outside Pile | 4 | 2 |
| | 200 | 100 |

3. Summary by type and locale

| | M. e. v per fission | Percent in U | Percent in C | Percent Outside |
|---|---|---|---|---|
| Kinetic energy of fission fragments | 159 | 100 | | |
| Kinetic energy of neutrons | 7 | | 90 | 10 |
| Gamma radiation from fission fragments | 5 | 70 | 25 | 5 |
| Beta radiation from fission fragments | 11 | 100 | | |
| Nuclear affinity of neutrons (gamma radiation) | 18 | 60 | 25 | 15 |

In $D_2O$ reactors, the operating sizes are smaller and exterior neutron losses are larger. Consequently, more heat is developed outside the reactor. At first glance, it might appear obvious to circulate a cooling fluid through a neutronic reactor to remove heat therefrom. However, it must be kept in mind that the coolant itself, with few exceptions, will be a neutron absorber, and that tubes or pipes, if used for coolant direction in the active portion of the reactor, will also be neutron absorbing.

The coolant and tubes, if used, can be passed through the reactor in heat exchange relation to the moderator, to the uranium bodies, or to both. A number of methods of cooling are available. One of the simplest is to run aluminum tubes through the moderator and then pass water through the tubes. However, most of the heat generated by the reaction is released in the uranium, and as most moderators are relatively poor heat conductors, cooling the moderator alone, for example, is limited to reactors operating around 1000 kv. For higher power reactors, cooling of the uranium directly may be desirable.

However, uranium is chemically very active, and it is usually desirable to protect the uranium itself from direct contact with the cooling medium. The uranium may need to be protected from chemical reaction with the coolant, and fission fragments from nuclear fissions originating on or near the surfaces of the uranium bodies should, in most cases, be kept from entering the coolant stream, as these fragments are highly radioactive. If the fission fragments should be allowed unrestrained entrance to the coolant, every part of the cooling system exteriorly of the reactor would have to be heavily shielded for protection of operating personnel, and circulating machinery and piping might become inaccessible for repair for long periods of time after reactor shut down.

Air has been used to cool a uranium-graphite reactor operating continuously up to 3000 kw. with a construction as shown in Figs. 31 to 36 inclusive. Such a reactor will next be described.

AN ILLUSTRATIVE GAS-COOLED NEUTRONIC REACTOR

Figure 31:
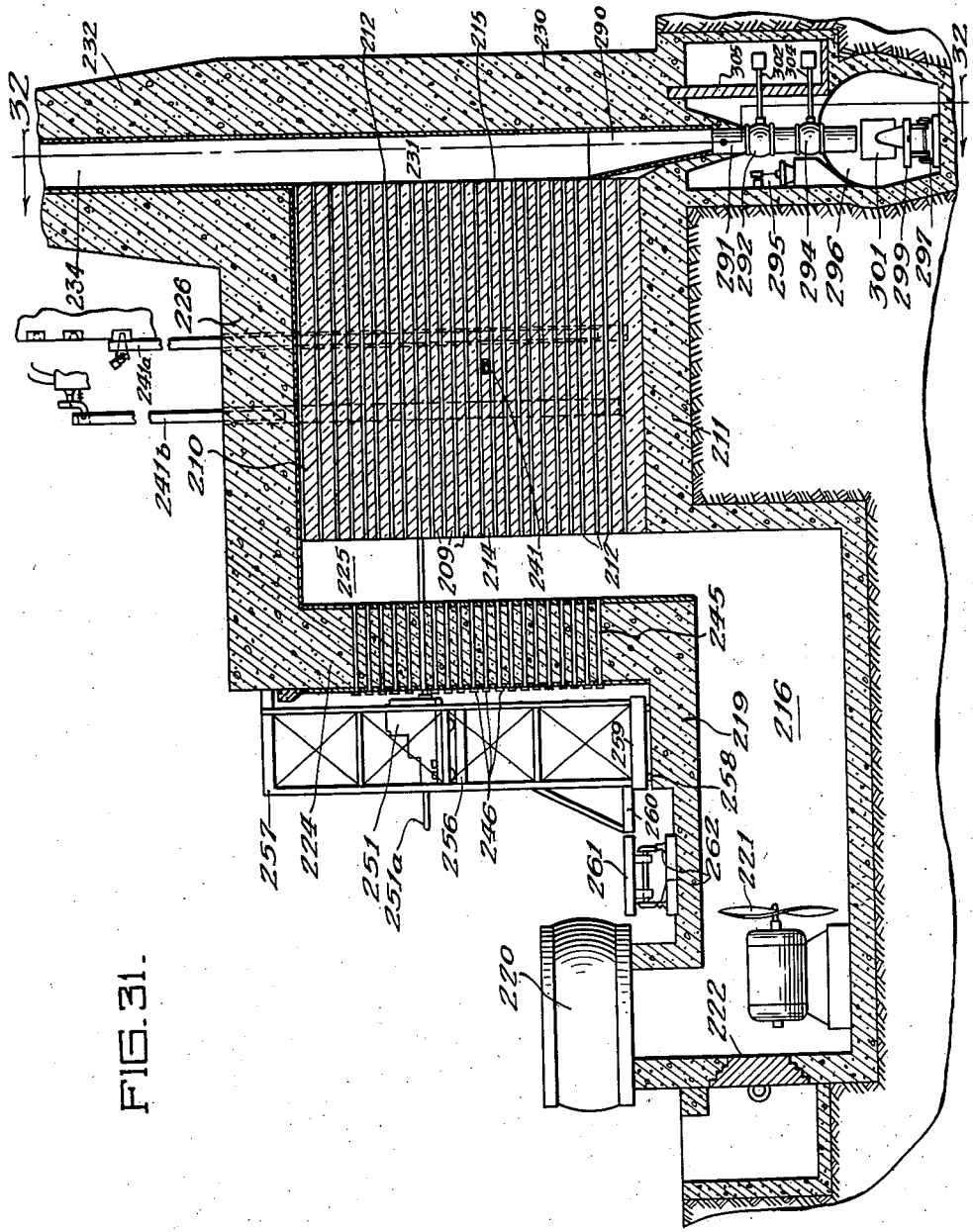
Fig. 31 is a longitudinal view partly in section and partly in elevation of an air cooled neutronic reactor system.
Figure 32:
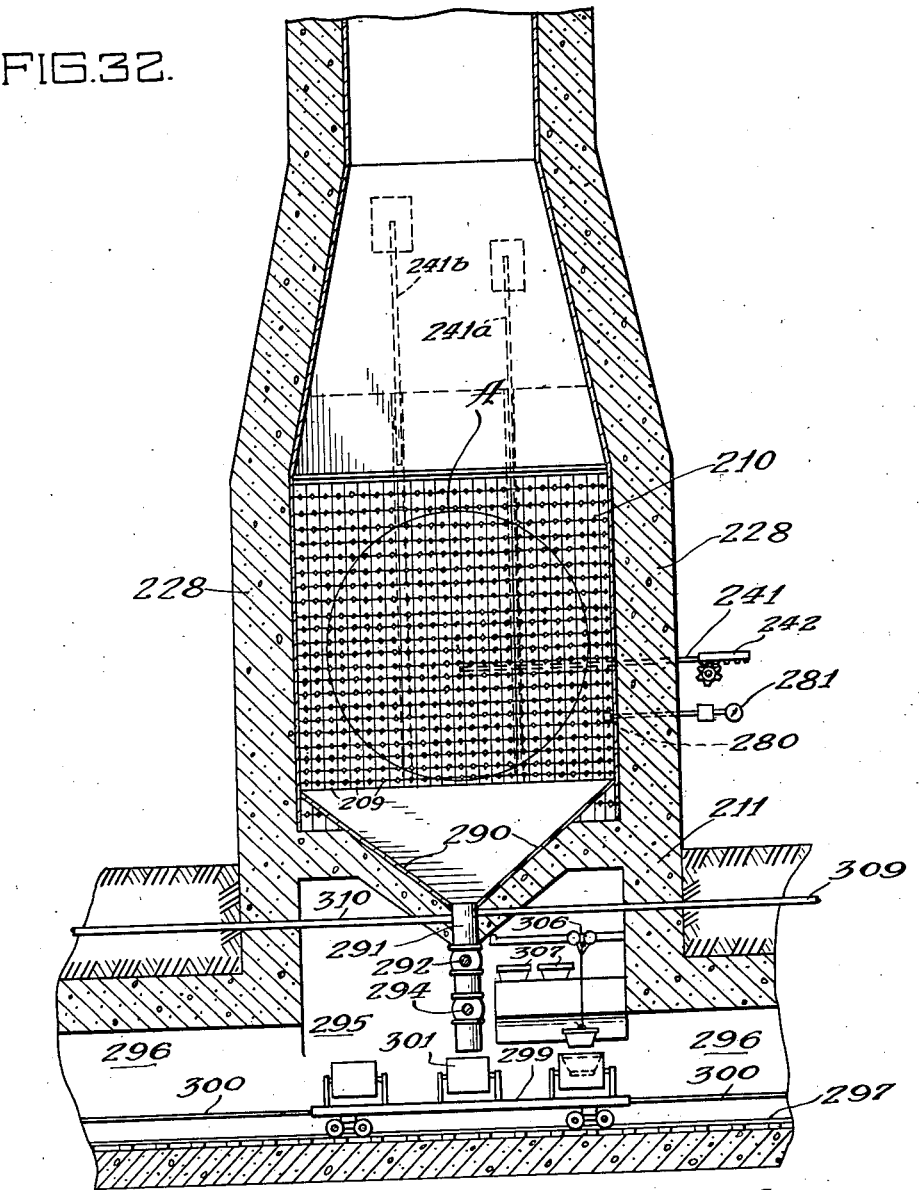
Fig. 32 is a cross sectional view, partly in elevation, taken as indicated by the line 32—32 in Fig. 31.

One such structure broadly comprises a mass of graphite blocks 209 closely piled or stacked into a cube 210 shown in Figs. 31 and 32. This structure is more fully described and claimed in the application of Fermi and Szilard, Serial No. 596,465, filed May 29, 1945, copending. This graphite cube may be, for example, 24 to 26 feet on a side and rest on a concrete foundation 211. The graphite cube 210 is pierced with horizontal air channels 212 of square cross section, with one of the diagonals vertical, as shown in Fig. 36. The channels may be readily made by grooving adjacent blocks. The channels are 1.75 inches on a side and extend completely through the reactor, from an inlet face 214 to an outlet face 215. About 2000 channels may be provided, and as will be later brought out, any unused channels can be plugged. Only a few of the channels are shown in the drawing for the sake of clarity.

Adjacent the inlet face 214 of the cube, the foundation is continued downwardly to form the floor of an inlet air duct 216 extending outwardly. The inlet air duct 216 is completed by concrete side walls and top 219.

At some distance away from the graphite cube 210 the inlet duct is turned upwardly to terminate in an air filter 220, relatively close to the surface of the ground. A fan or blower 221, here illustrated as electrically driven, is installed on the floor of the inlet duct just below the air filter, access to the fan being conveniently obtained through duct door 222, behind the fan.

The concrete top 219 of the inlet air duct is continued upwardly as inlet shield 224 positioned parallel to but spaced away from inlet face 214 of the cube 210 to form an inlet chamber 225 communicating with the air channels 212.

Above the inlet chamber 225 and the cube 210 the concrete is continued horizontally to form a top shield 226, and side shields 228 are built up from the foundation 211 to enclose cube 210. Shields 226 and 228 closely approach the top and side faces of the cube, to minimize air flow around the outside of the cube. A small amount of air circulation, however, may be desirable over the top and side faces to cool these faces.

At the outlet face 215, an outlet end shield 230 of concrete is provided. End shield 230 is parallel to and spaced from the outlet face 215 of the graphite cube to form an outlet chamber 231 communicating above with the base 232 of a stack 234, projecting upwardly and formed as a continuation of the concrete top, side, and outlet end shields. Thus, the cube 210 is completely enclosed by concrete shields, with a duct system operating by virtue of pressure provided by fan 221 to conduct air from close to ground level through channels 212 into the stack and then into the atmosphere well above ground level at the top of the stack. The concrete shields may be from five to twenty feet thick in accordance with the maximum desired operating power of the reactor, and serve as shields to reduce escape of neutrons and gamma radiation.

As a neutronic reaction will take place when uranium bodies are properly spaced in a moderator mass of a certain finite size, the above-described device can be made chain reacting by placing uranium bodies in the horizontal channels in such a manner and in such an amount that a neutron reproduction ratio of slightly over unity is obtained, exclusive of all neutron losses within the reactor and from the exterior of the reactor. The neutron activity is checked during loading, as has been previously described for building other type reactors.

Using the graphite mass 210 as the moderator to slow fast neutrons to energies where they again are able to create fission in $92^{235}$, the device as described will have a reproduction ratio of unity when approximately 700 of the channels 212 in the graphite cube are each loaded with 68 aluminum jacketed uranium slugs 235 lying end to end, with a channel spacing of 7 inches measured center to center, and with the loaded channels roughly defining a cylindrical active portion as indicated by line A in Fig. 32. Both graphite and uranium should be of highest possible purity. Presently obtainable materials have impurities therein reducing K by a total of about .015 to .02 unit from the base K for pure materials and specific geometry.

However, more than a unity reproduction ratio is required, as when the reproduction ratio is exactly unity no rise in neutron density will occur as has been previously brought out. Under such conditions the device will not develop high neutron densities or power in the form of heat. By loading additional channels, i. e., making the active portion greater than critical size, however, the reproduction ratio within the reactor can be brought above unity in order that a rise in density can occur. Then this excess neutron reproduction can be absorbed by neutron absorbing materials deliberately inserted into the reactor in order to hold the reproduction ratio at an average value of unity after a desired power output has been obtained, as a result of the initial rise in density, i. e., by the control rod.

Consequently, in accordance with the amount of excess reproduction ratio desired, about 1000 channels may be loaded with uranium slugs. Most of the channels not loaded with uranium may be closed by inserting plugs, preferably of graphite, in such channels in order to conserve air. Some of the channels, however, in the peripheral portions of the cube may be left open for cooling of the graphite in those portions.

One preferred form of slug construction for rod geometry is shown in Fig. 34. In this case, each uranium metal slug 235 is 1.1 inches in diameter and 4 inches long covered with an aluminum jacket approximately 20 mils thick in good heat conductive relation to the uranium. The slugs weigh about 2½ pounds each.

In forming the slugs 235, the uranium portion 236 is machined to size, cleaned in trisodium phosphate and then washed in water. Aluminum or other non-fissionable metal jacket cans 237 are provided having an inside diameter somewhat larger than the uranium portion. This can 237 with the uranium inside is then passed through a sizing die of 1.134 inches diameter. This die, being of smaller diameter than the 1.1 inch uranium portion plus the two aluminum walls, draws the can in tight thermal contact with the uranium.

A cup-shaped cap 238 is then placed base down inside the projecting portion of the can 237 and is seam welded to the can. The projecting portion is then cut off above the seam weld 240 and the remaining projecting portion including the weld, spun over the adjacent end of the slug. Thus, each jacket completely encloses and seals the uranium preventing air from corroding the uranium and also reventing fission fragments created by nuclear fission at the surface of the uranium from entering the air stream.

The channels are loaded with uranium until the active portion is over critical size, for example, to a size where the reproduction ratio, with movable neutron absorbers removed, is about 1.005. This geometry provides, with a slug spacing of about seven inches, a volume ratio of about 47 C to 1 U, and the residual impurities, a K constant for the rod lattice of about 1.06. As the K constant of 1.06 is reduced to a reproduction ratio of 1.005 by the reduction in size of the reactor from infinity to the operating size, the reproduction ratio of 1.005 means that for every two hundred neutrons starting in each neutron generation about two hundred and one neutrons can be produced in the operating reactor over and above all losses. Under these conditions and taking into account the fact that about one percent of the neutrons of fission are delayed in their emission for a mean time of about 5 seconds the neutron density of the reactor will double every 8 to 15 seconds. With some part of the movable neutron absorbers inserted but with the insertion of less than the amount of neutron absorbers required to make the reproduction ratio unity, the rise is slower. When the movable neutron absorbers are almost, but not entirely inserted to the critical position, a single doubling of the neutron density may take several hours. When a desired density has been reached, the reproduction ratio can be reduced to unity so that the desired density is continuously maintained by the neutron absorption in the inserted neutron absorbing material.

As in other reactors described, the neutron absorbing material may be introduced into the reactor in the form of a control rod 241 as shown diagrammatically in Fig. 32. This control rod extends into the graphite cube, sliding in a channel therein and is operated from outside of side shield 228 as by rack and pinion 242. The rod is made from, or incorporates therein, an efficient neutron absorber such as cadmium or boron. Shim and safety rods 241a and 241b are provided.

During operation heat is released in the reactor in accordance with the neutron density therein as shown in Fig. 24. Most of the heat arises from the kinetic energy of the fission fragments and about 92 percent of the energy is released in the uranium. About 6 percent is released in the graphite due to neutron absorption and the slowing process therein and about 2 percent escapes from the reactor in the form of neutrons and gamma radiation. Consequently, the reactor can only be operated at a power dependent upon heat removal to the point where a stable temperature obtains. Otherwise, the reactor will accumulate heat to the point that the device may be damaged. This condition will be greatest in the center of the reactor as the heat generated is greatest there. Since aluminum melts at 658° C., stable temperatures below this value should be used although with jackets of other non-fissionable metals, such as beryllium, the stable temperature may be increased, although if the temperature should rise too high the uranium bodies might be damaged even when using beryllium jackets, as uranium of the type used in neutronic reactors melts at about 1100° C.

A stable temperature is obtained in the device by passing atmospheric air through the reactor, and in the specific example shown and described, the air is passed through the graphite channels and directly in contact with the aluminum jackets of the slugs, so that the center of the reactor is properly cooled. Under these circumstances the reactor can be operated continuously at 250 kilowatts electrical equivalent of heat by passing 32,000 cubic feet per minute through the reactor with a maximum temperature of the slugs of about 100° C., and at 500 kilowatts continuously with about 50,000 cubic feet per minute of air with a maximum metal temperature of 200° C. These heat maxima occur at the center of the reactor loaded as described, and total power output is determined by the maximum temperature permitted there. Higher temperature maxima may be used, but what these temperatures will be will depend upon the heat conductivity of the uranium, the jacket and the jacket-uranium interface, and the cooling efficincy. Such air cooled reactors have been operated continuously at 3000 kilowatts by increasing fan capacity.

To accomplish loading of the slugs 235 into the various air channels 212, the concrete of the inlet end shield 224 is pierced with a plurality of loading apertures 245, as shown in Figs. 31 and 35, each aperture being aligned with the axis of slug positions in the air channels 212. Normally, during operation of the reactor, each aperture 245 is closed by a removable lead plug 246 extending through the shield 224 only.

When it is desired to load a channel with new slugs, the lead plug 246 for that channel alone is removed, and a charging tube 247 inserted, extending through the inlet and shield 224, across the inlet chamber 225 and entering the corresponding air channel 212 as shown in Fig. 35. The outer end of charging tube 247 is provided with a flanged nipple 249 shaped to engage a nipple recess 250 of a plunger-operated loading mechanism indicated generally by numeral 251. It will be noted that the charging tube is smaller than the air channel 12 and that air can pass through the channel being unloaded. The air should circulate during unloading, although it may be at reduced velocity. Slugs are forced into the air channels by plunger 251a from loading mechanism 251, which, being no part of the present invention, will not be described in detail.

The loading mechanism 251 is mounted on an elevator platform 256 mounted to be raised and lowered in an elevator frame 257 capable of moving along the outside of inlet end shield 224 on elevator tracks 258 (Fig. 33). Base 259 of the elevator frame is provided with a platform 260 projecting outwardly on the same level as the top of a supply car 261 travelling on supply car tracks 262. Supply car 261 is used to bring a supply of slugs to the elevator for use in the loading mechanism 251.

In the initial loading of the graphite cube 210 when uniform loading is performed, loading is started with the more central air channels until 68 slugs have been placed in the guide tube 247 and connected channel. The loading mechanism is then operated to push the slugs into the channel until the outer end of the first slug is at the outlet face 215, leaving the outer end of the last slug about 16 inches from the inlet face 214, leaving 16 inches of graphite for reflecting purposes.

Proceeding outwardly and preferably concentrically, additional channels are loaded, meanwhile checking the neutronic activity of the reactor as previously described. As the activity increases as the loading approaches a critical size, as previously explained, that is, the size where the reproduction ratio will be exactly unity, the approach to critical size can be predicted by extrapolation of observed neutron density values with respect to the volume of the cube loaded with uranium.

As the critical size is approached, the control rod 241 is inserted deeply into the reactor to prevent a self-sustaining chain reaction; and loading is continued until the desired maximum reproduction ratio of, for example, from 1.005 to 1.006 is attained. This ratio can be checked by removal of the control rod and measuring the time taken by the reactor to double its neutron density. From this period, the reproduction ratio can be mathematically computed.

When the desired number of channels are loaded the active core of the reactor may contain from 34 to 50 tons of uranium, and will be ready for operation. Graphite plugs for the unused air channels may be loaded in a manner similar to that described for the uranium slugs.

It will be noted that on 4 sides of the graphite cube excess graphite will be present. On the fifth side, i. e., at the inlet face, graphite will also extend 16 inches beyond the uranium. On the remaining side, i. e., the outlet face, no graphite extends beyond the uranium. Thus 5 sides of the active portion (the uranium bearing portion) are surrounded by graphite. This graphite constitutes the reflector and reduces the amount of uranium required to reach critical size. In the present instance the reduction in size is only slightly less than the optimum, as 5 sides of the active portion are surrounded with the reflecting layer.

After the reactor is loaded to give the desired shape and size of the active portion, the fan is started and the control rod is withdrawn until a rise in neutron density to a desired power output where a stable temperature in the reactor is attained. The control rod is then progressed into the reactor until a neutron balance is obtained with the reproduction ratio at unity, thus maintaining the chain reaction at the desired operating power. Small variations from the unity reproduction ratio will occur during operation, due to temperature variations of the cooling air, and to change in barometric pressure and to minor variations in air pressure delivered by the fan. However, such variations are compensated by slight inward or outward corrective movements of the control rod, either by hand in response to indicated variations in neutron density, or automatically by direct linkage of the control rod to the output of the ionization chamber 280 and meter 281. However, such automatic control is no part of the present invention.

During operation of the reactor the air passing through the reactor becomes radioactive due to the fact that it is subjected to intense neutron irradiation. For that reason the air passing through the operating reactor is not delivered to the atmosphere at ground level but is exhausted at a substantial distance above ground such as, for example, from the top of a 200 foot stack.

After operation of the reactor for a sufficient length of time for an amount of $94^{239}$ to be created sufficient for chemical separation, such as, for example, 100 days at 500 kilowatts, the reactor is shut down by inserting the control rod fully into the reactor. After about one-half hour's wait, during which all delayed neutron emission will have ceased and the more highly radioactive materials decayed sufficiently, the reactor may be unloaded.

The unloading may be accomplished in two ways, either by using the mechanism 251 to push the slugs out of the channels so that they fall by gravity out of the outlet face 215, or by using the plunger to insert new slugs in the channels, each slug so inserted pushing an irradiated slug out of the outlet face 215. In the first instance the graphite cube will be left empty after unloading. In the second instance the insertion of new slugs is continued until all or a predetermined part of the irradiated slugs are out of the reactor, having been replaced by fresh material. Thus, the reactor is left ready for the next run. Under ordinary cicumstances the latter manner of unloading is preferred.

In either case, the slugs drop by gravity from the outlet face into outlet chamber 231, falling on to two angularly disposed pad plates 290 positioned to intersect the falling slugs, in the bottom half of outlet chamber 231 as shown in Figs. 31 and 32. The two plates slant to a centrally disposed outlet pipe 291 extending downwardly through foundation 211 and provided with spaced valves 292 and 294. The slugs fall by gravity into pipe 291 above valve 292.

Outlet pipe 291 opens into a lower coffin chamber 295 that in turn connects with a tunnel 296 carrying car tracksd 297 on which a coffin car 299 may be moved by means of cable 300. Coffin car 299 supports a plurality of slug coffins 301 in position to be successively positioned beneath the lower opening of pipe 291.

Valves 292 and 294 are operated by means of rods 302 and 304, respectively, from behind a heavy lead shield 305, as shown in Figs. 31 and 32. A crane 306 is used for placing coffin caps 307 on each coffin after it has been filled with irradiated slugs.

Before unloading is started, both valves 292 and 294 are closed, and the upper portion of pipe 291 is filled with water from water inlet pipe 309. A proper water level is maintained above valve 92 by water outlet pipe 310. The air circulation is maintained, although it may be reduced to about 25 per cent of the operating value. Slugs are then pushed out of the reactor to fall on to pad plates 290 and then roll by gravity into the water in the upper part of outlet pipe 291.

In order that there be no material damage to the jacketing of the slugs, plates 290 are preferably padded with a soft material that does not deteriorate under neutron irradiation, and that will be able to withstand the slug impacts. A satisfactory pad has been found to be ¼ inch cotton duck on felt laid on wood backed by steel. Combinations of various synthetic elastic materials have also been found satisfactory.

After a number of slugs have been collected above valve 292 sufficient to fill a coffin 301, unloading is stopped and valve 292 is opened, permitting the slugs and the water around them to drop through the valve and remain in the space between valves 292 and 294. Valve 292 is then closed, the water level re-established and unloading continued. In the meantime, valve 294 is opened permitting the slugs and water to fall into one of the coffins 301. The car is then moved to register the opening of the next coffin with the end of the outlet pipe and the first coffin is capped. The procedure is continued until all of the irradiated slugs it is desired to remove are in coffins. These coffins may then be taken to a soaking pit (not shown) to remain until the radioactivity has decayed to a point where the slugs can be submitted to chemical treatment for removal of the products formed therein by irradiation. After 100 days' operation the aging period may be about 30 days.

Removal of the irradiated slugs under the conditions specified is performed for two reasons. Firstly, the slugs are so highly radioactive that they cannot be safely approached by personnel without adequate shielding being interposed, and, secondly, for some time after removal from the reactor this radioactivity is so intense that self-absorption of the emitted radiations causes self-heating of the slugs. By unloading during maintenance of the air stream, by dropping the slugs at once into water, and by keeping the slugs in water until the radioactivity has subsided sufficiently, melting is prevented, as the slugs are cooled as they boil the water in which they are immersed. The slugs are then stored or aged under water until ready for chemical treatment, as for example, thirty days.

In this case, it will be clear that the losses added to the reactor are mostly those due to the absorption by the aluminum jackets on the slugs or rods, as the coolant can be passed directly through the moderator. There is also a small loss due to removal of moderator material to form the air channels. However, the K reduction for the air cooled or helium cooled system is not great, about .005 K, for example, in the system described.

However, when a liquid coolant is to be used, pipes usually are provided to prevent the coolant from entering the moderator and the coolant itself may have a high neutron absorption characteristic to be taken into account. A neutronic reactor employing a liquid coolant will next be described.

AN ILLUSTRATIVE LIQUID-COOLED NEUTRONIC REACTOR

For powers higher than 1–3000 kilowatts, for example, liquid coolants such as water or diphenyl can be used. Pipes for the coolant are used, with the jacketed uranium slugs or rods inserted in these pipes so that the coolant will flow around the jacketed slugs or rods.

Figure 37:
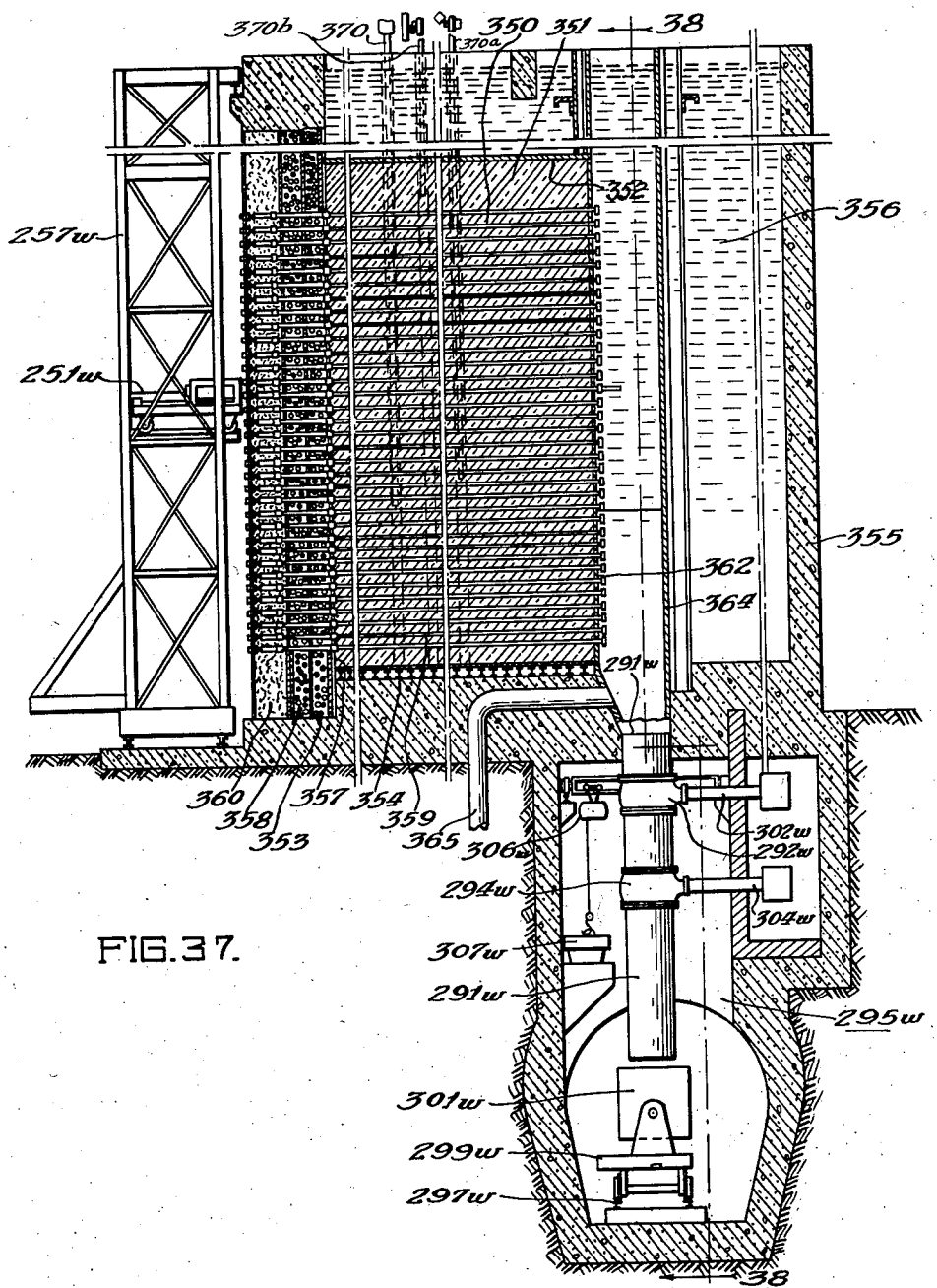
Fig. 37 is a vertical sectional view (partly in elevation) of a liquid cooled reactor.
Figure 38:
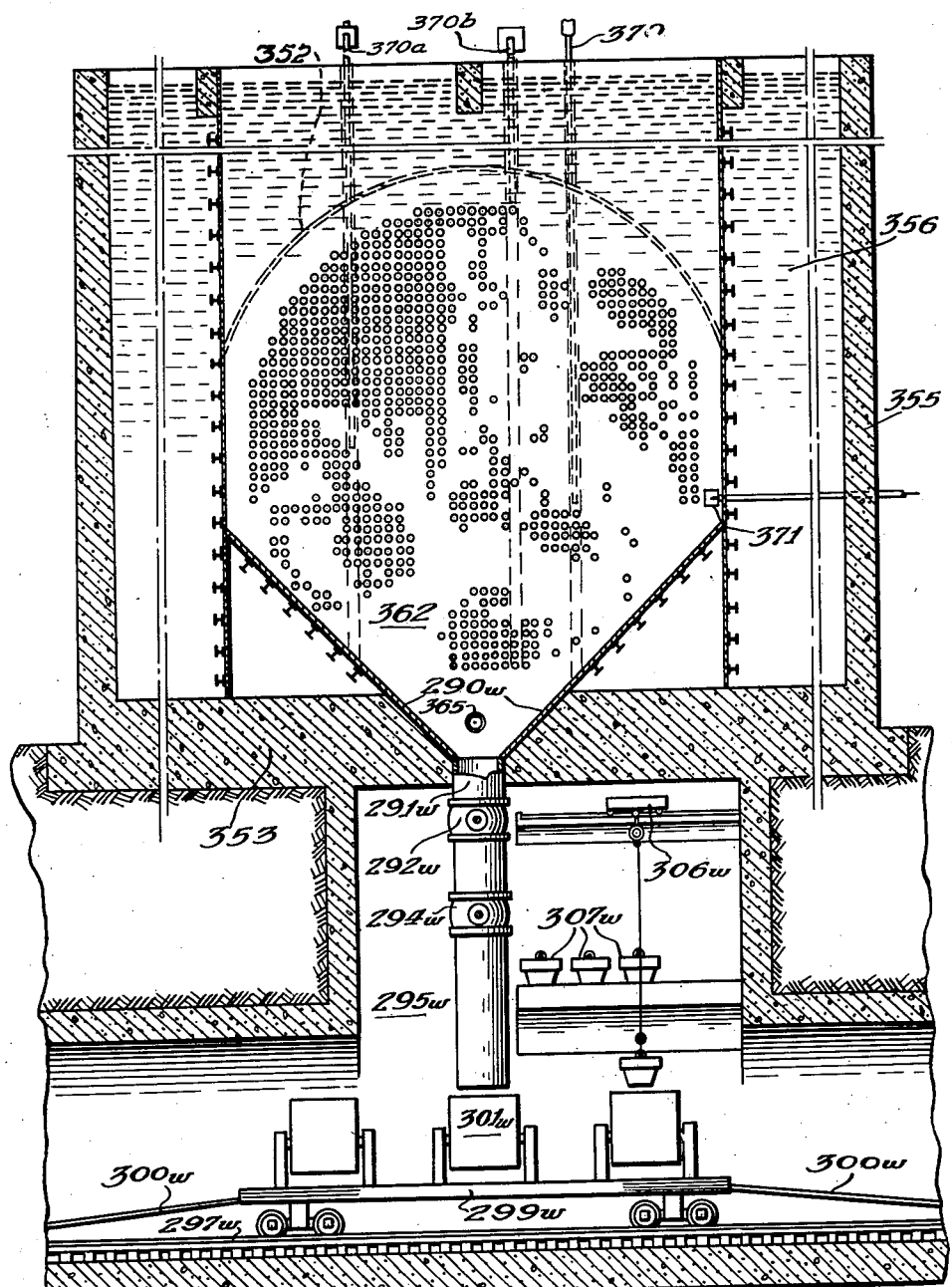
Fig. 38 is a vertical section view (partly in elevation) of the reactor shown in Fig. 37, and taken as indicated by the line 38—38 in Fig. 37.
Figure 39:
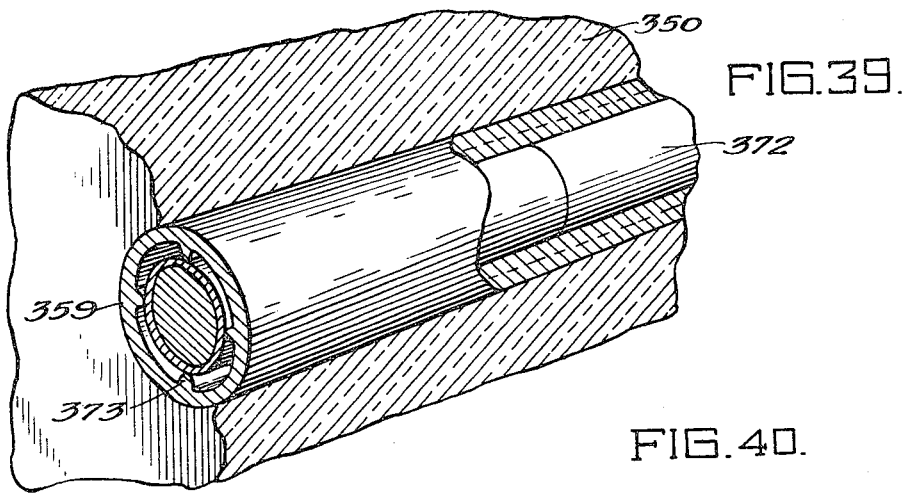
Fig. 39 is a diagrammatic perspective view of a uranium rod and associated coolant channel.

One representative structure embodying liquid cooling for high power outputs, up to 100,000 kilowatts for example is shown in Figs. 37, 38 and 39 and will next be only briefly described, as in many respects it is similar in design to the gas cooled reactor described previously. Specific features of this reactor are more fully described, and claimed in the application of Wigner et al. Serial No. 622,630, filed October 16, 1945.

The reactor proper 350 comprises a cylindrical structure built of graphite blocks as in the other graphite moderators described. The reactor is surrounded with a graphite reflector 351 forming an extension of the moderator and is enclosed by a fluid tight steel casing 352, supported on I beams 354 within a concrete tank 355, erected on foundation 353. Tank 355 is preferably filled with water 356 to act as a shield for neutrons and gamma radiation.

The encased reactor is surrounded on all sides except one by the water 356, and the side not surrounded, which is to be the charging face 357 of the reactor is provided with a shield tank 358 filled, for example, with lead shot and water. Coolant tubes 359 extend through the adjacent concrete wall 360, through shield tank 358, through the graphite moderator block 350 to an outlet face 362 of casing 352 to empty into water 356 in tank 355. Only a few tubes 359 are shown in Fig. 37 for sake of clarity of illustration. A backing wall 364 is placed in tank 355 spaced from outlet face 362. Coolant tubes 359 are preferably of aluminum.

On the outside of tank 355 where the coolant tubes enter the reactor, the ends of coolant tubes 359 are removably capped, and are supplied with coolant under pressure from conveniently positioned manifolds. Thus water can be passed through tubes 359 to be discharged at outlet face 362 into tank 355. Water, after having passed through the reactor is removed through outlet pipe 365.

The coolant tubes 359 may then be charged with aluminum jacketed uranium slugs 372, similar to those described in connection with the gas cooled reactor, by uncapping the tube to be loaded and pushing slugs into the tubes in end to end relationship. The reactor can then be loaded with sufficient uranium to make the reactor operative to produce high neutron densities, the heat being dissipated by the coolant circulation. This coolant may be water, for example, from a source such as a river, passed once through the reactor, and then discarded, or, the water may be cooled and recirculated in a closed system. If diphenyl is used a closed system is required.

Loading and unloading are performed as in the air cooled reactor, and the same slug loading and receiving structures are used. As these have been described for the gas cooled reactor they will not be described again but the parts have been given the same numbers with a $w$ subscript. Control is by a control rod 370 as in the other reactors described. Monitoring is by ionization chamber 371. Shim and safety rods 370a and 370b are also provided, shown diagrammatically.

Referring to Fig. 39, which shows diagrammatically the relation of the moderator coolant pipe and rod, it will be seen that slugs 372 forming the rods are positioned in the coolant tubes 359 on projections 373 providing a uniform annulus of coolant around the slugs.

In this case, the jackets, the coolant itself and the pipes introduce parasitic losses which, for one specific example of a liquid cooled uranium-graphite reactor have been evaluated for a water cooled reactor capable of continuous operation at about 100,000 kilowatts.

For such a reactor employing uranium rods disposed in graphite in accordance with near optimum geometry conditions and utilizing uranium metal and graphite of presently obtainable purity, the value of K would be about 1.07. The value of K for the structure is determined as follows:

| | | |
|---|---:|---:|
| K for uranium rods in graphite (including residual impurities) | | 1.07 |
| K reduction due to aluminum jackets and pipes | 0.013 | |
| K reduction due to coolant | 0.023 | |
| Total K reduction for cooling system | 0.036 | 0.036 |
| The value of K for the structure | | 1.034 |

The principal dimensions of the reactor are as follows, using the K constant set forth above:

Axial length of active cylinder of reactor = 7 meters
Radius of active cylinder of reactor = 4.94 meters
Total weight of uranium metal in rods = 200 metric tons
Weight of graphite in reactor = 850 metric tons
Radius of uranium metal rods = 1.7 centimeters
Thickness of aluminum jackets = 0.5 millimeter
Thickness of aluminum pipe = 1.5 millimeters
Thickness of liquid layer = 2.2 millimeters with water; 4 millimeters with diphenyl
Number of rods in reactor = 1695
Weight of aluminum in reactor = 8.7 metric tons
Rod spacing in square array = 21.3 centimeters It will be noticed from the above values that the coolant annulus can be thicker with diphenyl than with water as diphenyl has a smaller danger sum for a given volume than water. This fact, together with the fact that diphenyl has a higher boiling temperature than water, makes the use of diphenyl attractive for higher powers. However, such advantages must be balanced against the requirement of a closed circulation for diphenyl, and the fact that some polymerization may take place in diphenyl, thus requiring make-up in the system to prevent the coolant from becoming too viscous for proper circulation. Each coolant has advantages for particular reactors. Liquid coolants, however, are ideal for reactor outputs up to 500,000 kilowatts.

As the total $K-1$ available for uranium-graphite reactors is only about .1 it is obvious that the amount of coolant cannot be greatly increased over the values given above, as the K constant would be so reduced as to preclude the construction of a reactor of practical size. However, when $D_2O$ is used as a moderator, $K-1$ can be as high as about .3 when uranium rods are used. Consequently, a $D_2O$-uranium reactor can include a greater percentage of impurities than a uranium-graphite reactor. When $D_2O$ is used as a moderator in a uranium rod system to be fluid cooled, the piping and jacketing procedure may be the same as for the uranium-graphite reactor, except that the coolant annulus can be increased in size. $D_2O$-uranium reactors can therefore be designed to operate at still higher powers, even when light water is used for cooling. However, it should be pointed out that $D_2O$ itself can be used as a coolant, thus reducing the parasitic absorption, at least as far as the coolant alone is concerned.

It is thus apparent that by considering the coolant and the circulating elements required to be placed inside the reactor, as parasitic impurities, and then evaluating these impurities in terms of reduction in the K factor as taught herein, and then using the resultant K factor to determine the critical and operating sizes of a proposed reactor, that cooled reactors capable of operating at various desired powers can readily be designed.

USE OF DIFFERENT LATTICES IN THE SAME NEUTRONIC REACTOR

It will be noted that in the uranium-graphite reactor first described herein, that there were two different lattice zones incorporated in the complete reactor, and that the critical size of the reactor was computed for the average K ($\overline{K}$) of the device. In this case the difference in the zones was the use of uranium in two different forms—spacing remaining substantially the same. However, reactors can also be built where there are zones different in K even though these zones are composed of wholly different moderators. For example, when a liquid or solid moderator lattice has, for some reason a low K factor, a $D_2O$ moderated center portion might be used to bring up the $\overline{K}$ and thus reduce the composite reactor to a practical size. Such a reactor has been disclosed in the Anderson and Brown application, filed February 2, 1944, Serial No. 520,730. Furthermore a uranium $H_2O$ lattice can be used in a reactor when a uranium $D_2O$ lattice is used as a central zone, to give an overall K sufficiently greater than unity to enable an operating reactor to be built of practical size.

When reactors are constructed of concentric layers of materials, the average K can be calculated.

Figure 40:
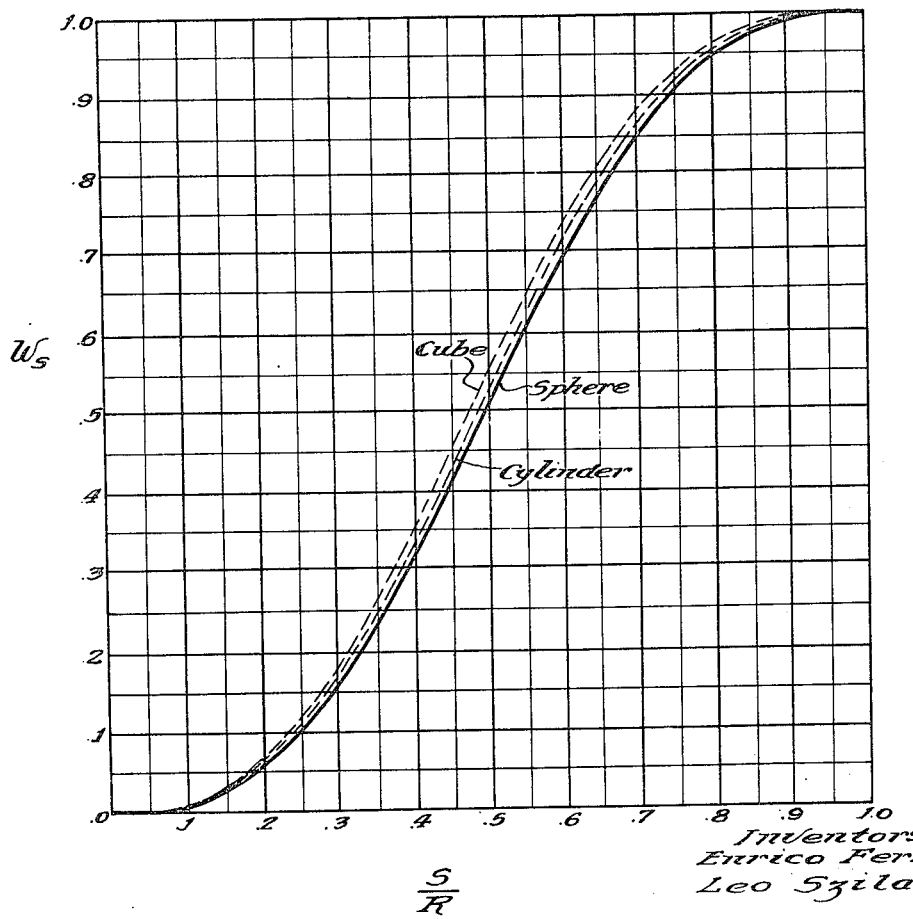
Fig. 40 is a diagram showing the statistical weight of concentric lattice portions of uniform K plotted against the extent of the same lattice portions within the structure.

Curves are shown in Fig. 40 and they are drawn in terms of statistical weight $w_s$ for a particular sub-side (or sub-radius) of a zone having a specific lattice therein plotted against $$\frac{S}{R}$$

where R is the side (or radius) of the entire composite active portion of the reactor, and S is the extent of the radius (or side) of the zone incorporating a specific lattice.

Statistical weight ($w_s$) may be defined as the value of a given mass of lattice weighted in accordance with its position in the reactor. Any given mass of lattice is worth more at the center of the reactor than at the edges because of the difference in neutron densities at the two positions. In general, it can be said that the effectiveness of a lattice varies in accordance with the square of the average neutron density to which it is exposed.

As the neutron density across the reactor varies, $w_s$ represents the weight of a zone evaluated in accordance with the square of the average neutron density across that portion of the radius R through which the zone extends when the center is evaluated at unity. The curves enable the calculation of the overall or average K for a reactor consisting of concentric layers of lattices having different K factors. The overall shapes considered are (1) the cube, (2) the sphere and (3) the cylinder, with the uranium contained in the form of rods.

In using the curves, assume a cylindrical active portion of total radius R. Then if a lattice with a reproduction factor $K_1$ and migration length $M_1$ is disposed as a central cylinder of radius $S_1$, a second lattice or different K, say $K_2$, and migration length $M_2$, is disposed around the central cylinder up to a cylinder of radius $S_2$, and a third lattice of reproduction factor $K_3$ and migration length $M_3$ is disposed still further outside in a concentric layer up to the edge of the cylinder where $S_3 = R$; then the average $$\frac{\overline{K-1}}{M^2}$$

is given by $$\frac{\overline{K-1}}{M^2} = w\left(\frac{S_1}{R}\right)\left(\frac{k_1-1}{M_1^2}\right) + \left[w\left(\frac{S_2}{R}\right) - w\left(\frac{S_1}{R}\right)\right]\left(\frac{k_2-1}{M_2^2}\right) + \left[w\left(\frac{S_3}{R}\right) - w\left(\frac{S_2}{R}\right)\right]\left(\frac{K_3-1}{M_3^2}\right) \quad (15)$$

In graphite-uranium reactors of the type herein described, the migration lengths can be assumed to be the same for all the concentric zones; in that case $M^2 = M_1^2 = M_2^2 = M_3^2$ and Formula 15 gives the average value of $K-1$ directly, in terms of the separate $K-1$ for each medium. When different moderators are used the appropriate value of $M^2$ is inserted.

Figure 41:
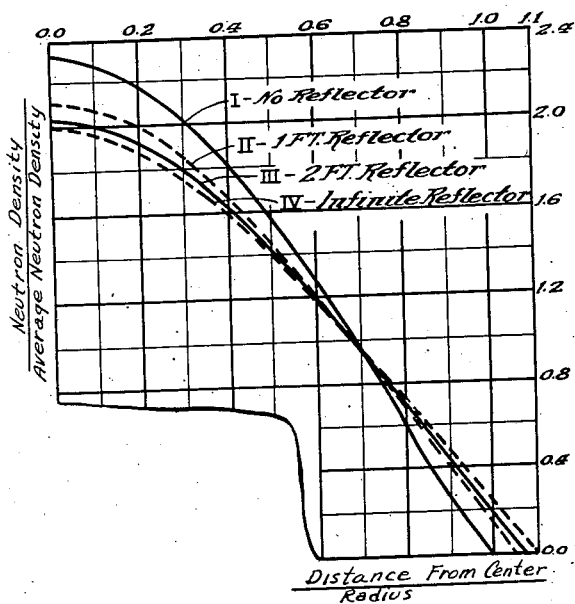
Fig. 41 is a diagram showing the effect of reflectors of various thickness on the size of the reactor.

As a specific example of the use of the curves of Fig. 41 as applied, for example to graphite-uranium reactors such as described herein, when the reactor is cylindrically loaded with rod geometry, if $$\frac{S}{R} = \frac{1}{2}$$

as shown in Fig. 41 when $K_1 = 1.05$ and $K_2 = 1.06$ then $$\overline{K-1} = w(\tfrac{1}{2})(K_1-1) + [1 - w(\tfrac{1}{2})](K_2-1) \quad (16)$$

Then with both migration lengths taken as beink equal, the curves show $$w(\tfrac{1}{2}) = 0.525, \quad 1 - w(\tfrac{1}{2}) = 0.475$$

hence $$\overline{K} = 1.0548$$

If $K_1 = 1.04$ and $K_2 = 1.06$, then under the same conditions $\overline{K} = 1.045$. When Formulas 1 and 2 are used for concentric cubical structures, the edge length of the cube can be used for R, with the edge lengths of the inner cubes as $S_1$, $S_2$, etc.

When the average K ($\overline{K}$) is found for the structure this value can be used to determine what the critical size of the structure will be, as brought out in the section on critical and operating sizes.

In this manner structures can be built to proper operating sizes even though part of the structure has a K constant approaching unity. A center portion having a relatively high K constant can be used to raise the average K to a value permitting a smaller reactor than would be possible with the use only of the lattice having the lower K constant. Similarly, a central portion with a lower K constant can be used to flatten the neutron density curve across the reactor.

CRITICAL AND OPERATING SIZES OF NEUTRONIC REACTORS

After all of the neutron losses that enter into the chain reaction have been evaluated for a specific lattice, with the exception of the loss by leakage from the exterior of the system, the size to which the system is to be built for proper operation has to be determined.

There are several ways by which critical and operating sizes are determined, and it is desirable that these sizes be found within a low margin of error so that auxiliary equipment such as shields, for example, can be constructed of proper size and not be too small to enclose the operating reactor.

One very satisfactory method of determining critical size particularly for low power reactors is to measure the value $\Delta$ in an exponential pile (referred to above) which is a structure similar in all respects but size to the structure contemplated, and then use this value to determine critical and operating sizes.

$\Delta$ may be evaluated by finding the relaxation distance $b$ as heretofore set forth. In case the reactor is to be built in the form of a large spherical structure, the critical radius (R) is given by $$R = \frac{\pi}{\sqrt{-\Delta}} \quad (17)$$

In case the structure is to be a rectangular parallelopiped with sides $a_1$, $a_2$ and $a_3$ the critical size is given by the formula $$-\Delta = \frac{\pi^2}{a_1^2} + \frac{\pi^2}{a_2^2} + \frac{\pi^2}{a_3^2} \quad (18)$$

In case the structure is to be built up as a cylinder of height H and radius R, the critical values of these quantities may be computed from the formula $$-\Delta = \frac{\pi^2}{H^2} + \frac{(2.405)^2}{R^2} \quad (19)$$

Thus, critical size can be determined directly from the measured values of $\Delta$ without determination of a numerical value for K, for a low power chain reacting structure and with any moderator.

However, when $M^2$ is known, K can be determined, and it may be convenient for design purposes to refer all computations to K as a base factor, as has been done herein. Then, as $$-\Delta = \frac{K-1}{M^2} \quad (9)$$

the value of K is found when $\Delta$ and $M^2$ are known, as pointed out above the value of K is then used to determine critical and operating sizes for the reactor and this method is adaptable for reactors of any power.

For example, in the case of a spherical structure employing uranium bodies imbedded in graphite in the geometrics disclosed herein and without an external reflector the following formula gives the critical overall radius (R) in feet:

$$K - r = \frac{C}{R^2} \quad (20)$$

when $r = 1$ by definition of critical size, and where C is a constant that varies slightly with geometry of the lattice and for normal uranium-graphite lattices may have a value close to 7.4.

For a rectangular parallelopiped structure rather than spherical, the critical size can be computed from the formula below when $r = 1$ $$K - r = C\left(\frac{1}{a^2} + \frac{1}{b^2} + \frac{1}{c^2}\right) \quad (21)$$

where $a$, $b$, and $c$ are the lengths of the sides in feet.

The critical size for a cylindrical structure of uranium and graphite is given by the formula, irrespective of the shape of the uranium bodies, when $r = 1$ $$K - r = C\left(\frac{1}{H^2} + \frac{0.59}{R^2}\right) \quad (22)$$

where cylinder height is H feet and radius is R feet.

However, when critical size is attained, by definition, no rise in neutron density with time can be expected, as the reproduction ratio is exactly unity. It is therefore necessary to increase the size of the structure beyond the critical size, but not to the extent that the period for doubling of the neutron density is too short, as otherwise the neutron density might rise to values where the device would be damaged.

It was formerly believed that the neutron reproduction cycle would be completed in about .0015 second. Under these circumstances any size or effective size of reactor giving a neutron reproduction ratio greater than unity would have to be provided with some exceedingly quick acting control device operating within a fraction of the reproduction cycle time. However, we have found that by taking advantage of the fact that there are delayed neutrons in the cycle, we can operate and control neutronic reactors with reproduction ratios substantially exceeding unity, without encountering high and dangerous rates of neutron density rise.

Figure 1:
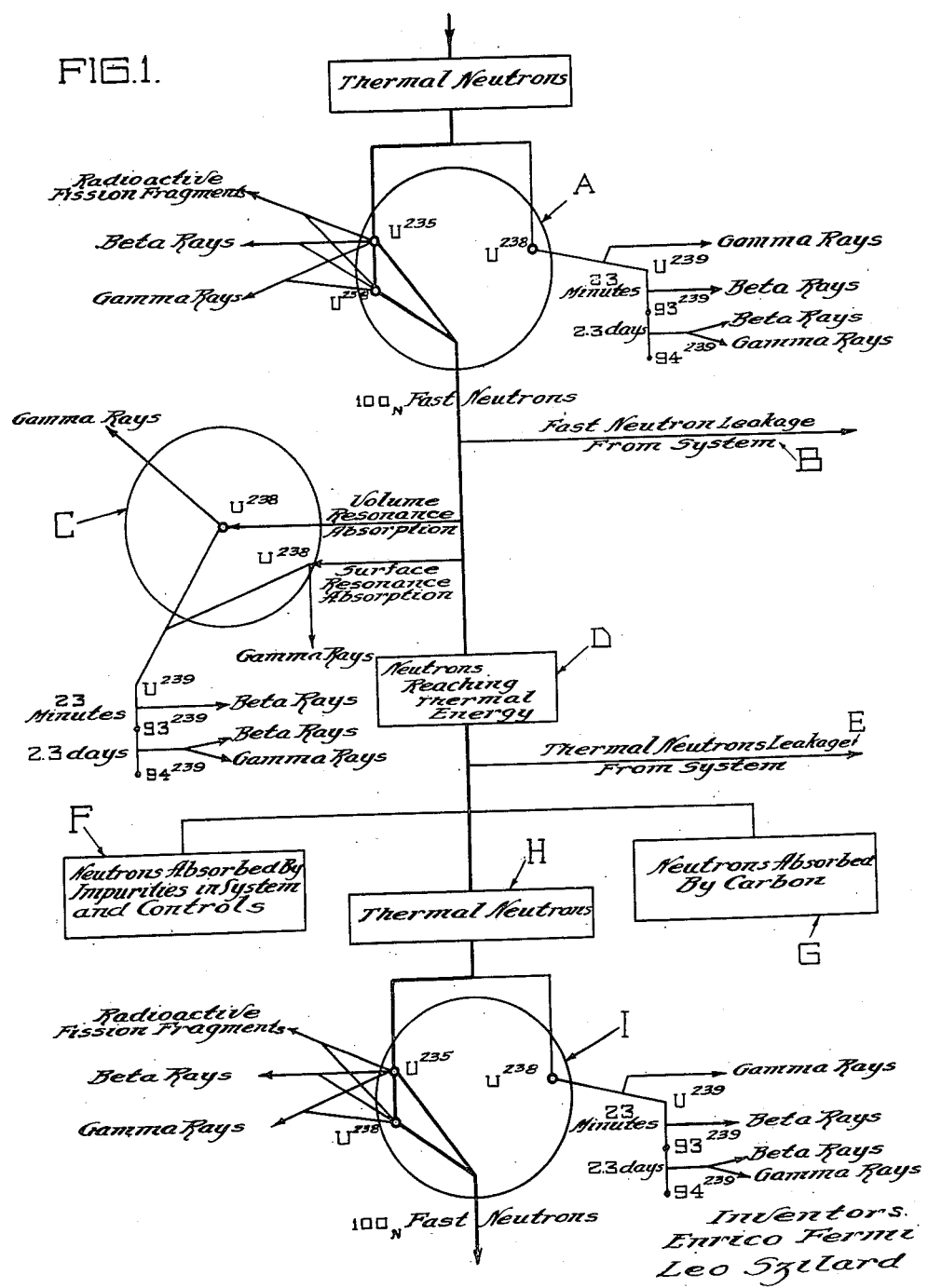
Fig. 1 is a diagram or chart illustrating the balanced condition of a chain reaction in a system of practical size employing natural uranium in graphite.

We have found that there is a substantial time factor in the rise of neutron density after a reproduction ratio of unity has been exceeded due to the fact that a substantial portion, generally about one percent, of neutrons generated in a neutronic reactor are "delayed neutrons." These delayed fast neutrons may appear at any time up to several minutes after the fission has occurred. Half these neutrons are emitted within six seconds and .9 within 45 seconds. The mean time of delayed emission is about 5 seconds. The cycle shown in Fig. 1 is completed by 99 percent of the neutrons in about .0015 second, but if the reproduction ratio of the reactor is near unity, the extra 1 percent may make all the difference between an increase or a decrease in the activity. The fact that the last neutron in the cycle is held back as it were, imparts a slowness of response to the reactor that would not be present if the $100n$ neutrons were all emitted instantaneously.

For cases in which the reproduction ratio $(r)$ differs from unity by (appreciably) less than 1 percent, the rise of neutron density, or more specifically the value N to which the number of neutrons has risen from an original value $N_0$, after a lapse of time of $t$ seconds during and before which the pile has operated at a fixed value of $r$ ($N_0$ being the number of neutrons at the beginning of $t$, i. e., after disappearance of transient effects due to any preceding change in $r$), is given by—

$$N = N_0 e^{wt}$$

where $$w = \frac{r-1}{\alpha - (r-1)} \cdot \frac{1}{T}$$

In this formula $\alpha$ is the fraction of the neutrons that are delayed, i. e., $\alpha = .0067$, and T is the mean time of delayed emission of the delayed neutrons (5 seconds). The above formula is only approximate because it uses an average delay time.

As an example, if $r$ is 1.001, and the system has settled down to a steady exponential rise in neutron density, then $$w = \frac{.001}{.0067 - .001} \cdot \frac{1}{5} = \frac{1}{28.5}$$

that is $$N/N_0 = 2.75 \text{ in } 28.5$$

seconds. Hence doubling of the neutron density occurs about every 20 seconds. The above formula thus indicates the rate of rise for relatively low values of $r$ and shows how the reduction of the rate of the delayed neutron effect is particularly significant in the stated lower range of $r$ values. Strictly speaking, the given equation holds only for the steady state, i. e., where $r$ has been held constant for some time; an additional transient term must be included to obtain an accurate representation of the neutron density during the first few seconds after a sudden change of $r$.

If $r$ were to be exactly 1.01, a more detailed theory shows that the neutron density would be more than tripled per second. However, if the reproduction ratio $r$ is several percent greater than unity, so that the one percent delayed neutrons are unimportant compared with $r - 1$, the density increases at a much more rapid rate as given approximately by $r^{t/l}$ where $l$ is .0015 second, the normal time to complete a cycle. If $r$ were 1.02 and 1.03, the factor by which the neutron density would be multiplied per second would be 1100 and 700,000 respectively. If $r$ were to be made 1.04, the neutron density would increase in 1.5 seconds by a factor of approximately $10^{17}$ over its original level.

It is thus apparent that the operating conditions, must always be such that the neutron reproduction ratio does not materially exceed 1.01 as the rate of rise of neutron density could then be so fast as to be uncontrollable.

There are several ways by which such operating conditions can be met. One of the simplest is to make the actual operating size of the structure such that a reproduction ratio of 1.01 cannot be attained when all control absorbers are removed. A safe value for the maximum attainable reproduction ratio is about 1.005 at the temperature and power of operation and low power reactors can be built so that size alone limits the reproduction factor below 1.01. The size at which reproduction ratios greater than unity can be obtained, may be computed from modifications of the above formulae, when K is corrected by a poisoning factor due to operation, later to be discussed. This factor only becomes important when operating a reactor at relatively high neutron densities. For example, for active spherical structures the formula $$K - 1.005 = \frac{C}{R^2} \quad (23)$$

may be used to find the operating radius R when K is known and r is 1.005. The same formula will, of course, give r for given structures for which K and R are known.

In the case of spherical structure employing uranium bodies of any shape or size imbedded in a heavy water ($D_2O$) moderator, the following formula gives the critical or operating overall radius, in accordance with the value of r.

$$R = \frac{56.5}{\sqrt{K-r}} \quad (24)$$

where R is the radius in centimeters and r for critical size equals one.

For a parallelopiped structure rather than spherical, using a heavy water moderator, the critical and operating sizes can be computed from the formula:

$$K - r = 323\pi^2 \left(\frac{1}{a^2} + \frac{1}{b^2} + \frac{1}{c^2}\right) \quad (25)$$

where a, b, and c are the lengths of the sides in centimeters.

The critical size for a cylindrical structure using a heavy water moderator is given, irrespective of the shape of the uranium bodies by the formula:

$$K - r = \frac{323\pi^2}{H^2} + \frac{1868}{R^2} \quad (26)$$

where H is the height in centimeters and R is the radius in centimeters, operating sizes are also determinable from these formulae by inserting the operating value of r desired.

Figure 30:
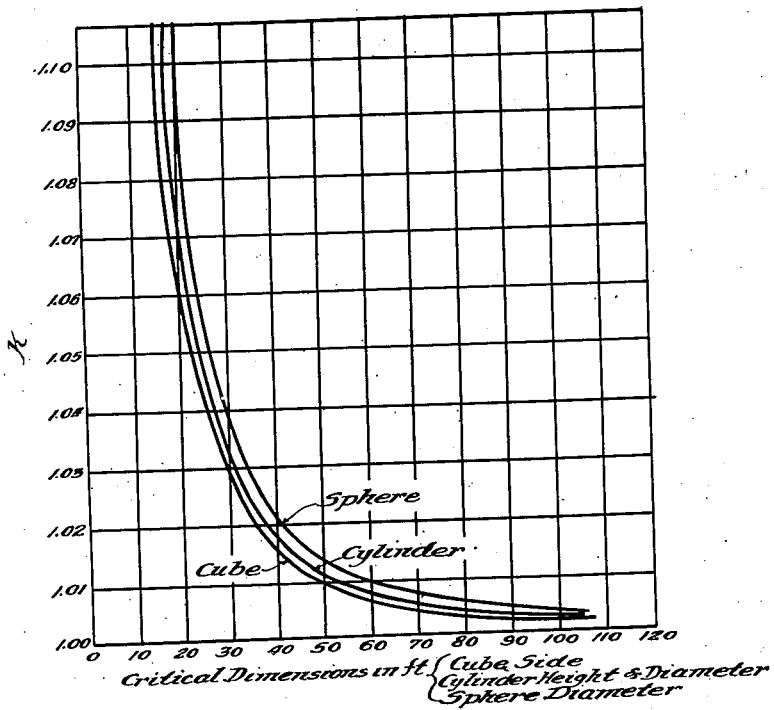
Fig. 30 is a diagram showing change of critical size in U-C reactors with change in K.

The curves in Fig. 30 show approximate critical sizes for operative low power reactors or spherical, cubical and cylindrical shape utilizing graphite. When higher power is required, the sizes have to be revised upwardly to compensate for operational poisoning.

In Fig. 30 the vertical ordinates of the curves represent the different values of K for the critical size dimensions in feet plotted as the horizontal abscissae. The curves are labeled to show the values for the cube, the cylinder and the sphere. The cylinder, for each value, has its height equal to its diameter.

The following table will show the approximate critical sizes for operative low power reactors utilizing $D_2O$, for different values of K where K is changed due to change in geometry. In evaluating the values given in the curves and table it must be kept in mind that the critical size is that size where the chain reaction just will become self-sustaining (r=1).

| U Metal—heavy water K−1 | Sphere radius | Critical Sizes in Feet Cube side |
|---|---|---|
| .01 | 18.5 | 32 |
| .02 | 12.3 | 21.5 |
| .05 | 7.7 | 13.4 |
| .1 | 5.45 | 9.45 |
| .2 | 3.84 | 6.65 |
| .3 | 3.14 | 5.45 |

The use of a reflector, through the action of scattering neutrons back into the reactor, raises the density of thermal neutrons throughout the reactor and this, in turn, increases the reproduction ratio of the reactor. Thus critical size (r=1) with a reflector is smaller than without a reflector. Consequently the use of a reflector permits a smaller reactor to be constructed for the same K factor.

If a reactor be considered as being surrounded by a vacuum or by cadmium, the density of the neutrons on the outside surface of the reactor can be taken to be zero. This comes about because any neutron which passes the exterior surface of the reactor will either fly off into space, or be absorbed in the cadmium and consequently lost to the chain reaction within the reactor.

If the reactor is immersed in air, the same assumption can be made, but it is only approximately true, because the air itself will scatter some of the neutrons which emerge back into the reactor. As another possibility, the reactor can be surrounded by some substance like graphite which will scatter most of the neutrons and absorb relatively few. In this case, neutrons emerging from the surface of the reactor will be scattered in all directions by the reflector and some of them will reenter the reactor, thereby raising the neutron density at the edge of the reactor.

The simplest discussion of the theory of a reactor reflector involves a reactor of thickness $2l$ in one direction and infinite in extent in the other two. This reduces the mathematical complexity to a problem involving a single variable. Further simplification may be obtained by assuming all the neutrons entering the reflector are thermal. Under these conditions the reactor equation may be written $$\frac{d^2 n_i}{dx^2} + \frac{K-1}{M_i^2} n_i = 0 \quad (27)$$

where $x$ is the distance from the center of the reactor measured in the direction of $2l$, $n_i$ is the number of neutrons per cubic centimeter, K is the reproduction constant and $M_i^2$ is the migration area.

This equation must be solved, subject to the restriction that at the outer surfaces of the reactor, the neutron density $n_i$ must be zero. The solution then becomes $$n_i = A \cos \sqrt{\frac{K-1}{M_i}} x \quad (28)$$

This in turn means that $2l$ must be adjusted so that $$2l = \frac{M_i}{\sqrt{K-1}} \quad (29)$$

in order for the reactor to maintain a chain reaction.

If, now, the reactor is surrounded by a reflector of thickness T with migration length $M_e$ and neutron density $n_e$, we may derive a diffusion equation for the reflector. This equation will be the same as 25 but with K replaced by zero as there is no neutron multiplication in the reflector. Therefore $$\frac{d^2 n_e}{dx^2} - \frac{1}{M_e^2} n_e = 0 \quad (30)$$

In this case, the solutions of 25 do not go to zero at the outer surfaces of the reactor (active portion) but this condition is replaced by the requirement that $n_e$ should be zero at the outer surfaces of the reflector, i. e., a distance $T+l$ from the center of the reactor. At the boundary of the active region, however, the solutions from (25) and (28) must give the same values of neutron density close to the boundary, and furthermore, the neutrons flowing across the boundary in one direction must be the same as those flowing in the opposite direction. Mathematically, this means that, if $l'$ is the "new" thickness of the reactor with the reflector and $\tau_i$ and $\tau_e$ are the "mean free" paths inside the reactor and externally in the reflector respectively, then $$n_e(l') = n_i(l')$$

$$\tau_e \frac{dn_e}{dx} = \tau_i \frac{dn_i}{dx} \text{ at } x = l' \quad (31)$$

By carrying through the mathematical processes of solution the following expression will ultimately be obtained for determining $l'$ $$l' = \frac{M_i}{\sqrt{K-1}} \cot^{-1} \left[ \sqrt{K-1} \frac{M_e \tau_i}{M_i \tau_e} \tan h\left(\frac{T}{M_e}\right) \right] \quad (32)$$

and thus gives a new thickness for the pile (if K is the same, etc.) which is less than that obtained formerly without a reflector.

While the discussion above has been concerned with a "sandwich" pile, the same general type of treatment may be applied to any shape as cylinders or spheres. The mathematical complexity increases rapidly, and in the case of an infinite cylinder, the final expression for $l'$ is given by exactly the same expression in first approximation, and very little quantitative change in higher approximations.

So far it has been considered that all the neutrons escape as thermal neutrons and move with the same speed. However, in a reactor, when a thermal neutron is captured by a $U^{235}$ nucleus, the resulting fission will generate neutrons which are moving with high speed. These fast neutrons will, in general, be slowed down in the moderator until they become thermal. However, some of these fast neutrons that are produced close to the outer surface of the reactor will be projected into the reflector. In the simplified picture just above, these neutrons were assumed absent; actually they were looked on as lost. Some of them, however, will be slowed down in the reflector material in exactly the same way as in the moderator, and may become thermal in the reflector. Some of them may then diffuse back into the reactor in the usual way.

A fast neutron will generally not go far before becoming slowed down to thermal velocities and consequently only those produced fairly close to the edge of the reactor will be slowed down in the moderator and ultimately scattered back into the reactor. For this reason the thermal neutron density near the edge of the reactor and in the reflector will be increased over what it would have been if the fast neutrons had leaked completely out of the reactor.

In Fig. 41, characteristic curves are shown relating to a graphite-uranium reactor, plotting the neutron density values along the radius for different points along the radius. The ordinates are $$\frac{\text{Neutron density}}{\text{Average neutron density}}$$

and the abscissae are given as percent radius. The curves show the effect of the reflector in increasing the effective size of the reactor, a reflector of infinite thickness increasing the eefftcive radius by about 10 percent, with a 2 ft. reflector increasing the radius about 8 percent. Accordingly, the critical radius of the active portion of the reactor may be reduced by approximately the same percentage when a reflector is used.

While the theories and allocations outlined above are only approximations, due to the fact that neutrons of all energies between that of fission and thermal energy are entering the reflector, the theories provide for sufficiently accurate design so that reactors can be, and have been built and operated, with reflectors and with proper operating characteristics as outlined herein.

A second means and method of preventing the maximum reproduction ratio from rising over about 1.01 in a neutronic reaction, during operation, is by the use of "shim" or limiting rods inserted in the reactor, when the actual size of the reactor is large enough to result in a reproduction ratio of over 1.01 under some operating conditions. The use of such rods to keep the reproduction ratio at a safe value will be described in the following section on control.

CONTROL OF THE NEUTRONIC REACTION BY VARIATION OF NEUTRON LOSSES IN OR FROM THE NEUTRONIC REACTOR

Because of the fact that a reproduction ratio of unity in a neutronic reactor means, by definition, that no rise in neutron density will take place, some means must be provided in a neutronic reactor whereby the neutron density can be allowed to rise to a desired value, and then act to stabilize the reaction at that value.

Again, by definition, a reproduction ratio greater than unity means that the neutron density will rise until stopped. In consequence, proper control requires the use of a means and method whereby the reproduction ratio can be controlled from unity (or less than unity) to the maximum reproduction ratio permitted.

Such control is readily feasible by controlling one or more of the losses in or from the reactor as built. Actual size can be changed, for example, especially when $D_2O$ reactors are used, as the amount of $D_2O$ wetting the uranium can readily be changed to provide a critical size where the reproduction ratio is unity, or a larger operating size where the reproduction ratio is greater than unity. Then when a desired neutron density has been obtained, some of the $D_2O$ can be removed to again make the reproduction ratio unity thereby maintaining the reaction at the neutron density attained. This is called leakage factor control and is described in conjunction with the uranium $D_2O$ reactor.

However, neutron losses due to neutron absorbers deliberately inserted into a reactor are of outstanding importance since these losses readily lend themselves to variation in any type of reactor. Cadmium and boron, for example, having high neutron absorption capabilities, are commonly used in the form of the control rods, that can be inserted in a reactor between the uranium bodies in greater or lesser amount, as set forth above in the description of the various reactors.

As pointed out in the section on critical and operating sizes of neutronic reactors, low power reactors are generally constructed of sufficient effective size to have a maximum reproduction ratio somewhat less than 1.01, which means that exterior leakage losses are not quite sufficient to reduce the reproduction ratio to unity. Under these conditions, interior neutron losses are introduced by the control rod, these rods absorbing sufficient neutrons to reduce the average reproduction ratio in the reactor to unity and below. The control rod is then made movable so that the reproduction ratio can be made well below unity when fully inserted, thus stopping the reaction; unity when partially inserted; and the maximum reproduction ratio permitted, when wholly removed from the reactor. By varying the depth of insertion of the control rod, any desired condition of the reactor can be obtained from complete shutdown to maximum rate of neutron density rise, with an intermediate position of the rod where the reproduction ratio of unity is maintained. This unity position of the rod is known as the critical position, and would always be the same except for variations in atmospheric pressure (when the reactor is open to the atmosphere): for the effect of temperature (as the neutron density rise heats the reactor), and for the effect of neutron absorbers formed in the uranium during operation, as will later be pointed out.

In a reactor of low power, using the rod type of control, the neutron density of the reactor is monitored, as by the ionization chambers and indicators previously described. This monitoring can take place in a representative portion of the system such as the outer periphery, or even exteriorly of the outer walls. From a knowledge of the neutron density distribution within the reactor (see Fig. 24) the neutron density in any part of the system is readily determined.

With the control rod fully inserted, the neutron density in the reactor may be about 100 times the normal natural neutron background of uranium, due to action of convergent chains in the lattice. These background neutrons provide the starting neutrons for the chains, which change to be divergent when the rod is retracted from the reactor to a point where the reproduction ratio is over unity. The neutron density will then increase, with a doubling time as determined by the effect of the delayed neutrons on the reproduction ratio, as pointed out in the preceding section on critical and operating sizes.

When a desired neutron density is reached, the rod is inserted to the position where the reproduction ratio is unity, and thereafter the attained neutron density is maintained. To reduce the neutron density the rod is inserted further into the reactor and the reaction decays. As it decays to a lower density, the rod can again be placed at the unity position to maintain the lower density. Thus the rod can be varied in position to obtain and maintain any desired neutron density with power production in the form of heat, as determined by the heat dissipation capability of the reactor.

The effect of the delayed neutrons is, of course, extremely valuable in obtaining ease and flexibility of control by the control rod. Movements of the rod only slightly outwardly from the critical position will permit a rise in neutron density for example, where minutes, hours, or even days can elapse for one doubling of the density, as desired. Such close control enables the control rod to be moved manually for example, although the rod is preferably driven by reversible electric motors, for example, under manual control of the motors by an operator watching the neutron density values.

However, with any control system there is always the possibility of accident in moving the control rod, as, for example, if motors driving the control rod should respond improperly and drive the control rod completely out of the reactor and for some reason (such as power line failure) refuse to return the rod. To take care of such an emergency safety devices are often provided such as, for example, neutron absorbing safety rods, which are normally held completely out of the reactor while the reactor is operating, but which can be manually or automatically released at a predetermined neutron density to enter the reactor rapidly, to absorb enough neutrons to stop the reaction. Such rods are shown in Figs. 1, 25, 31, and 38, numerals 40, 112, 241b and 370b respectively. To prevent power supply failure from affecting operation of these safety rods, they are usually arranged to drop, or be pulled, by gravity into the reactor when released at a predetermined neutron density.

The use of such safety rods again brings out the importance of not permitting the reproduction ratio to greatly exceed 1.01 in an operating reactor at any time. With reactors operating at high power such as, for example, the water cooled reactor described herein, even a single doubling of the operating neutron density might be disastrous, and the safety rods must be tripped to enter into the reactor before such doubling takes place. At $r=1.01$ the neutron density will double in about ⅓ of a second. If the time of doubling became too short, the safety rods could not arrive in place before the neutron density reached undesired values. However, with minimum doubling times of several seconds, for example, the safety rods can readily operate to prevent abnormal neutron densities from being reached after the rods are tripped.

It has been pointed out above that K can change slightly because of temperature changes and because of changes in atmospheric pressure when reactors are open to the atmosphere. Such changes in K are usually small and therefore change critical and operating sizes very slightly. The resultant changes in reproduction ratio are correspondingly small and may be compensated for by relatively short movements of the control rod.

However, K may change for other reasons during operation, and in high power reactors may change by such a large amount that if not properly compensated, the reproduction ratio may fall below unity during operation. These changes in K are believed to be due to the formation of reaction by-products in the reactor, either radioactive or stable. As the production of both radioactive and stable reaction products is a function of rate of irradiation of the uranium, the effect of these by-products on neutron reproduction becomes most important in reactors operating at high neutron densities.

Several relatively long term changes in K may be expected. Isotope $94^{239}$ is known to produce, on the average, a fraction more neutrons per fission than $U^{235}$. Consequently, as $U^{235}$ is used up by fission, and $U^{238}$ is converted into $94^{239}$, the K constant may be expected to rise. To offset this rise in K there is an accumulation of long lived or stable fission products in the uranium that are the ends of fission fragment decay chains.

In reactors operating at high neutron densities, however, radioactive elements of exceedingly high capture cross section may be formed relatively quickly in the uranium as an intermediate element in the decay chains of the fission fragments and this formation can change K during operation. One of the most important of these decay chains is believed to be the 135 fission chain starting with Te.

(short)$\rightarrow$I(6.6 hr.)$\rightarrow$Xe(9.4 hr.)$\rightarrow$Cs(20–30 yr.)$\rightarrow$barium the parenthetical times indicating half lives. The neutron absorption of tellurium, iodine, caesium and barium is relatively unimportant, but the neutron capture cross section of radioactive xenon$^{135}$ has been measured to be about $2,500,000 \times 10^{-24}$ cm.², many times larger than that of stable gadolinium for example, the cross section of which is about $30,000 \times 10^{-24}$ cm.². Upon absorption of a neutron, xenon$^{135}$ shifts to xenon$^{136}$ an element of relatively small capture cross section. The change in K corresponds in period, to the xenon$^{135}$ appearance, and decay.

The rate of production of the Te is a function of the neutron density in which the uranium is immersed, and therefore dependent upon the power at which reactors of given type are operated. The radioactive xenon$^{135}$ is produced with a noticeable effect on the reaction a few hours after the reaction is started and the effect is, of course, greater as the neutron density is increased and maintained. The xenon$^{135}$ effect in high power reactors can be summarized as follows.

The reaction is started by withdrawing the control rod. The neutron density rises at a rate determined by the reproduction ratio and the effect of the delayed neutrons, until some predetermined neutron density is attained. The control rod is then placed in the unity reproduction ratio position and the reaction is stabilized at the power desired. During this time radioactive iodine is formed, decaying to xenon$^{135}$. As more and more iodine decays, more and more xenon$^{135}$ is formed, this xenon$^{135}$ absorbing sufficient neutrons to reduce the reproduction ratio below unity. This absorption also converts the xenon$^{135}$ to xenon$^{136}$ which has no excessive capture cross section. The neutron density drops. If no compensation were made for this drop by the rod the density might drop until background conditions prevailed, and then the reaction might automatically start up as the xenon$^{135}$ decayed. Normally the neutron density drop is compensated for by removal of the control or equivalent rod to a new position where the reproduction ratio is again above unity. A neutron density rise occurs, bringing the density back to its former level. Again, more xenon$^{135}$ is formed and the process is repeated until an equilibrium condition is reached where the xenon$^{135}$ formed is transmuted by neutron absorption and by decay into isotopes of lower capture cross section, as fast as it is being formed. In the meantime, the control rod (or equivalent) has to be withdrawn by an amount thereby removing from the reactor neutron absorbers at least equal in effect to the absorption caused by the xenon$^{135}$.

It should also be pointed out that this xenon$^{135}$ effect will be present when shifting from a power where the effect is stabilized, to a higher power. The shift can be made and the reaction stabilized at the new power for a time, because the iodine formed from the new fissions has not had time to produce a significant amount of additional xenon$^{135}$. As the new xenon$^{135}$ is formed from the decay of the newly formed iodine, the reproduction ratio will again drop and must again be increased by withdrawal of absorbers from the reactor.

However, the reduction in K due to the xenon$^{135}$ equilibrium amount present when the neutron density is theoretically infinity in the reactor, is believed to be about .03, which means that to obtain a rise in neutron density to any desired density up to infinity, the rod would have to be eventually removed by an amount corresponding to an increase in the reproduction ratio of about .03, and somewhat less than .03 when finite densities are to be obtained, in accordance with the density desired the size of the reactor would have to be big enough to provide the increase. For example, in a continuously operated water cooled U-graphite reactor such as herein described, the reproduction ratio decreases due to xenon$^{135}$ at equilibrium is about .0012 at 10,000 kilowatts; .009 at 100,000 kilowatts and would be about .013 and .020 at 200,000 kilowatts and 500,000 kilowatts respectively. As before stated reactors ordinarily are not built sufficiently large in size to provide maximum reproduction ratios of over 1.01 with all rods removed. However, if power outputs over 100,000 kilowatts are desired, the reactor must have its critical and operating sizes calculated as set forth herein using a final K constant decreased by the xenon$^{135}$ factor for the power desired even though the amount of reduction is over .01. In other words a significant impurity will be added during operation at high powers.

This may lead to the requirement for a reactor of such size that, if it did not acquire xenon$^{135}$ during operation, could attain a maximum reproduction ratio of over 1.01 with all rods removed, and which, before a substantial amount of the iodine produced from fission decayed into xenon$^{135}$, could in consequence attain a dangerous neutron density if all rods were removed.

Such a reactor can be adequately safeguarded by the use of "shim" or limiting rods inserted in the reactor preferably to depths that will not permit a reproduction ratio of about 1.01 to be attained at any time during the operation of the reactor, even when the control rod is completely removed. Then, if a reproduction ratio of more than unity cannot be attained by outward movement of the control rod alone, due to the build-up of the xenon$^{135}$ effect, the shim rod can be withdrawn to compensate for the xenon$^{135}$ effect, but still be left in a position where the reproduction ratio cannot exceed 1.01, when the control rod is completely removed. Such shim rods are shown in Figs. 7, 25, 31 and 37, numerals 30, 150, 241a and 370a respectively.

It can thus be seen that compensation for the xenon$^{135}$ effect is obtained, first by considering the xenon$^{135}$ impurity factor for the power desired, as a reduction in K to determine a proper operating size, for a desired power, and second, by initially providing in the reactors, impurities that can be removed by amounts compensating for the xenon$^{135}$ equilibrium amount acquired at a given power output.

Care must be taken, when shutting down a high power reactor operating with a xenon$^{135}$ equilibrium, that sufficient neutron absorbers are inserted to prevent automatic start-up of the reaction after the xenon$^{135}$ has decayed to the point where it does not materially affect the operation of the system. As a practical matter, shut down should include the full insertion of all control, shim and safety rods into the reactor.

Reactors operating at a few hundred watts, and operated intermittently, as when for example, the reactors are shut down at night, are not significantly affected by xenon$^{135}$ poisoning. Such a reactor is exemplified by the reactor first described herein. Even in the air cooled reactor described herein, operating at from 500 to a few thousand kilowatts output, the xenon$^{135}$ effect is on the order of the temperature and pressure effects. However, in the D$_2$O reactor and in the water cooled reactor described herein, the effect is more pronounced and is compensated for as described.

Because of the fact that the xenon$^{135}$ effect does not become important for several hours, reactors having an operating size too small to provide full compensation for the xenon effect at elevated neutron densities when continuously operated, nevertheless can be operated intermittently to attain such elevated densities or even higher densities for short periods until the xenon$^{135}$ effect prevents further operation at those densities. As the xenon$^{135}$ effect enters the reaction and stops the reaction, the density will drop. However, by waiting until the xenon$^{135}$ decays to the point where the neutron reproduction ratio can again be made greater than unity, the reactor can again attain the desired neutron density level. Thus reactors with a small maximum reproduction ratio can be operated intermittently to attain for short periods, neutron densities far greater than could be continuously maintained.

However, the control rod can be calibrated in several ways for steady state conditions and the calibration is adequate. As the effect per inch movement of control rod is greater for the portion of the control rod nearer the center of the reactor than it is for the portion near the edge (because of the larger neutron density at the center), a unit may be chosen so that for movement of the control rod, one of said units will always have the same effect on the reproduction ratio of the reactor without regard to the actual depth of said rod in the reactor. Such a unit is based on the conventional inch, and is sometimes called a "cinch." Any movement of the control rod the distance of one cinch has the same effect on the reproduction ratio of the reactor as a movement of the control rod one inch from the critical position.

The control rod can also be calibrated in terms of a unit known as the "inhour." One inhour is the distance that the control rod must be moved from the critical or balanced position to give the reactor a period of one hour. The period of a neutronic reactor is, by definition, the time necessary for the neutron intensity to increase by a factor of "e" (e 2.718).

In measuring the period of the reactor, a correction is made for any change in atmospheric pressure if the reactor is open to the atmosphere. An increase in atmospheric pressure will cause an increase in the weight of air inside the reactor. Oxygen has a small danger coefficient and, therefore, does not absorb neutrons in great quantities, but nitrogen on the other hand, has larger danger coefficient and so the great quantity of nitrogen present in the reactor has a distinct effect on the reproduction ratio $r$. It has been found that a change in atmospheric pressure on the reactor first described herein, is equal to 0.323 inhour for a change of one millimeter of mercury from the standard atmospheric pressure of 760 millimeters of mercury. At higher powers, a factor corresponding to the changes in operating density must be taken into account in calibration if measurements are made after the xenon effect appears.

USES OF NEUTRONIC REACTORS

In the descriptions of the various neutronic reactors, given herein, only a little has been said regarding the uses of the reactors. As such uses are many, only a few of the most important will be mentioned here.

All of the reactors described herein are primarily extremely powerful neutron and gamma ray sources. When used as neutron sources, materials to be made radioactive can be placed in or close to the periphery of the reactors, and radioactive isotopes produced, for example, in large quantities, as the materials are there exposed to the entire energy spectrum of the neutrons in or escaping from the reactor. As the leakage from the D$_2$O-uranium reactor is even larger than the neutron leakage from the graphite-uranium reactors, a relatively larger neutron flux can be intercepted on the exterior of this type of reactor.

One example of isotope production by exposure to reactor generated neutrons, followed by transmutation, is the manufacture of $U^{233}$ from the thorium 232, for which process thorium 233 can first be produced from thorium 232, the extent of the reaction being dependent upon the product of the slow neutron density and the time of exposure. Thorium 233 then decays to form protoactinium 233 and thence to uranium $92^{233}$ which is valuable as a fissionable material similar in its action to $U^{235}$ and $94^{239}$. The reaction is as follows:

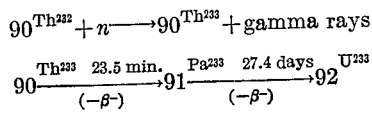

As a further example of transmutation, radioactive carbon may be produced by allowing the neutrons leaving the reactor to react with nitrogen in compound form. This reaction gives rise to carbon of mass 14 which is radioactive, and can be separated chemically from the nitrogenous compounds. Such radioactive carbon is suitable for medical and physiological uses as it may be incorporated in organic compounds and used as tracers in living organisms. Well 21 can also be filled with graphite blocks and the resultant pier projected upwardly through the top. The top of this graphite pier provides a strong thermal neutron source and such a pier is known as a thermal neutron column.

It can thus be seen that the neutrons normally escaping from the reactors need not be lost, but can be put to work, and the neutrons escaping from the reactors can be utilized to produce transmutations or isotopes from elements placed in, or surrounding all parts of the active portion of the reactor. For example, the number of neutrons radiated from the external surface of a uranium-graphite reactor when operating at ten thousand kilowatts power output in the form of heat, is approximately $1.8 \times 10^{16}$ neutrons per second.

In utilizing the output of reactors, internal shafts such as shaft 26 and tube 109b play an important role. They extend to the vicinity of the center of the reactors where the highest neutron densities exist, and intense neutron bombardment of materials inserted into the bottom of these shafts will take place, particularly at high reactor powers. Furthermore, the shafts act to collimate the fast neutrons released inside of the reactors and a high density collimated beam of neutrons emerges through the external aperture, projected outwardly. Such a collimated beam, having a far greater fast neutron density than any neutron beam heretofore produced, can be utilized outside of the pile for nuclear research in all of its aspects. The number of neutrons escaping from these shafts is several times the number escaping over an area of the external surface of the reactors equal to the cross section of the shafts.

In addition, extremely high energy gamma rays are emitted during nuclear fission. These rays also escape through the shafts to the exterior of the reactors and can there be used for taking radiographs through large castings, for example, with relatively short exposures, during high power operation of the reactors. The neutrons coming from the reactors can be screened out of the gamma ray beam by the use of relatively thin sheets of materials having high neutron absorption cross sections without substantially reducing the gamma ray intensity. In addition, a bismuth filter has been found to effectively reduce the gamma rays, without substantial interference with the neutron beam. Thus shaft 26 and tube 109b can be used either to produce a high intensity collimated neutron beam, or to produce a high energy beam of gamma rays, as desired, both for use outside the reactors.

In addition, all of the reactors described are also extremely useful in testing materials for neutron absorption and neutron production. Using one or more of the removable stringers 36a for example, in the uncooled graphite-uranium reactor the reactor can be balanced at a given neutron density with uranium bodies of known constants in the stringer. The stringer is then withdrawn and new uranium bodies substituted for those withdrawn. The stringer is reinserted into the pile, and the neutron intensity brought to the original value. The change in position of the control rod for the balance condition, when corrected for atmospheric pressure and temperature, will at once tell whether or not the newly inserted bodies are better or worse when used as elements in the system, than those removed. From the results obtained, calculations can be made as to systems incorporating the new bodies. The effect of changes in size, impurities, coatings, and temperature on the chain reaction, can similarly be determined. In the latter case, uranium lumps can be heated and inserted to determine the effect of temperature on the reaction as measured by change in the position of the control rod. However, the stringer method of determining the effect of changes in pile construction is no part of the present invention. Similarly, materials can be tested by insertion in tube 109b in the $D_2O$ reactor or in the coolant channels in the other reactors.

The reactors described herein, in addition to being high power neutron generators, are capable of producing the products of the neutronic reaction in quantities related to the power at which they are operated, in that at least a portion of the uranium bodies are removable from the reactors after exposure to the reaction for varying periods of time. By proper chemical treatment the $94^{239}$ and fission products can be recovered from the removed irradiated uranium bodies and thereafter utilized as desired.

With modifications, the reactors herein described can also be used as sources of power in useful form. The $D_2O$ moderated reactors can be operated under pressure at an elevated temperature, with continuous removal of the heated $D_2O$ for flashing into $D_2O$ steam for operation of low pressure turbines. Enriched uranium with a light water moderator can be operated in the same manner. The gas cooled reactors, when cooled with helium under pressure, for example, can be used to produce steam by passing the heated helium through heat exchangers. Diphenyl when used as a coolant in the liquid cooled reactor can be heated above the boiling point of water and then used in heat exchangers to produce steam. With proper design, neutronic reactors can also be operated to produce steam directly in tubes passing through the reactor, utilizing the heat of vaporization for cooling the reactor, and the resultant steam for power.

This application is a division of application Serial No. 568,904, filed December 19, 1944, issued into U. S. Patent No. 2,708,656 on May 17, 1955.

While the theory of the nuclear chain fission mechanism in uranium set forth herein is based on the best presently known experimental evidence, we do not wish to be bound thereby, as additional experimental data later discovered may modify the theory disclosed.

What is claimed is:

A method of operating a neutronic reactor including an active portion having a neutron reproduction ratio substantially in excess of unity in the absence of high neutron absorbing bodies, said method comprising the steps of inserting in the active portion a shim member consisting essentially of a high neutron absorbing body in an amount to reduce the neutron reproduction ratio to a value slightly higher than unity to prevent a dangerous reactivity level, controlling the reaction by moving a control member consisting essentially of a second high neutron absorbing body inwardly and outwardly in response to variations in neutron density, to maintain the neutron reproduction ratio substantially at unity, and withdrawing successive portions of the shim member to the extent necessary to enable the reactor to be controlled by movement of the control member after the neutron reproduction value has been lowered to the point where the outward movement of the control member is insufficient to maintain the neutron reproduction ratio at the desired point, and thus to maintain the range of control effected by such movement of the control member substantially constant despite diminution of neutron reproduction ratio caused by operation of the reactor, the active portion being substantially free of high neutron absorber other than the control member and the shim member.

References Cited in the file of this patent

UNITED STATES PATENTS

| | | |
|---|---|---|
| 2,708,656 | Fermi et al. | May 17, 1955 |

FOREIGN PATENTS

| | | |
|---|---|---|
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |
| 648,293 | Great Britain | Jan. 3, 1951 |

OTHER REFERENCES

Naturwissenschaften: vol. 27 (1939), pages 402–410 (an article by Flugge).